(12) United States Patent
Showers et al.

(10) Patent No.: US 9,595,049 B2
(45) Date of Patent: Mar. 14, 2017

(54) CROSS-DEVICE GEOLOCATION SENSING TO GEOTARGET OFFERS

(71) Applicant: RetailMeNot, Inc., Austin, TX (US)

(72) Inventors: Brian Keith Showers, Austin, TX (US); Eithan Zilkha, Austin, TX (US)

(73) Assignee: RetailMeNot, Inc., Austin, TX (US)

( * ) Notice: Subject to any disclaimer, the term of this patent is extended or adjusted under 35 U.S.C. 154(b) by 374 days.

(21) Appl. No.: 14/467,590

(22) Filed: Aug. 25, 2014

(65) Prior Publication Data

US 2014/0365304 A1    Dec. 11, 2014

Related U.S. Application Data

(63) Continuation-in-part of application No. 14/060,550, filed on Oct. 22, 2013, which is a continuation-in-part of application No. PCT/US2013/045186, filed on Jun. 11, 2013.

(60) Provisional application No. 61/658,387, filed on Jun. 11, 2012, provisional application No. 62/016,295, filed on Jun. 24, 2014.

(51) Int. Cl.
  *G06Q 30/02*    (2012.01)
  *G01S 5/02*    (2010.01)

(52) U.S. Cl.
  CPC ........ *G06Q 30/0261* (2013.01); *G01S 5/0252* (2013.01); *G06Q 30/02* (2013.01); *G06Q 30/0239* (2013.01); *G06Q 30/0242* (2013.01); *G06Q 30/0255* (2013.01); *G06Q 30/0256* (2013.01); *G06Q 30/0257* (2013.01); *G06Q 30/0267* (2013.01); *G06Q 30/0269* (2013.01)

(58) Field of Classification Search
  CPC ............... G06Q 30/0261; G06Q 30/02; G06Q 30/0239; G06Q 30/0242
  See application file for complete search history.

(56) References Cited

U.S. PATENT DOCUMENTS

| | | | |
|---|---|---|---|
| 6,826,481 B2 | 11/2004 | Root et al. | |
| 6,980,909 B2 | 12/2005 | Root et al. | |
| 7,979,350 B1 | 7/2011 | Carion | |
| 8,009,619 B1 | 8/2011 | Clavel et al. | |
| 8,060,594 B1 | 11/2011 | Clavel et al. | |
| 8,103,865 B2 | 1/2012 | Carion et al. | |

(Continued)

OTHER PUBLICATIONS

International Search Report and Written Opinion for Related PCT Application PCT/US2015/037310, issued Sep. 30, 2015, pp. 1-12.

*Primary Examiner* — Namrata Boveja
*Assistant Examiner* — Robert C Johnson
(74) *Attorney, Agent, or Firm* — Pillsbury Winthrop Shaw Pittman LLP

(57) ABSTRACT

Provided is a process of distributing offers to non-location-sensing devices based on a geolocation sensed by another device, the process comprising: obtaining a geolocation of a user from a mobile device of the user; associating the geolocation of the user with an identifier of the user in an offers engine; receiving a request for an offer from another computing device of the user, the request including or prompting obtaining data from the other computing device sufficient to identify the user; retrieving the geolocation of the user obtained from the mobile device by identifying the user with the data from the other computing device sufficient to identify the user account; selecting, with the offers engine, a responsive offer based on the geolocation of the user obtained from the mobile device; and sending the responsive offer to the other computing device of the user.

30 Claims, 25 Drawing Sheets

(56) References Cited

U.S. PATENT DOCUMENTS

| | | |
|---|---|---|
| 8,229,467 B2 | 7/2012 | Root et al. |
| 8,271,579 B2 | 9/2012 | Clavel |
| 8,478,245 B2 | 7/2013 | Carion et al. |
| 8,560,601 B2 | 10/2013 | Clavel |
| 8,611,927 B2 | 12/2013 | Root et al. |
| 8,634,814 B2 | 1/2014 | Root et al. |
| 8,732,619 B2 | 5/2014 | Knitowski et al. |
| 8,788,358 B2 | 7/2014 | Knitowski et al. |
| 8,812,024 B2 | 8/2014 | Obermeyer et al. |
| 8,909,679 B2 | 12/2014 | Root et al. |
| 9,015,692 B1 | 4/2015 | Clavel |
| 2008/0140520 A1 | 6/2008 | Hyder et al. |
| 2008/0274752 A1 | 11/2008 | Houri |
| 2008/0278309 A1 | 11/2008 | Troxler |
| 2009/0170528 A1 | 7/2009 | Bull et al. |
| 2009/0204885 A1 | 8/2009 | Ellsworth et al. |
| 2009/0248548 A1 | 10/2009 | Obermeyer |
| 2009/0307067 A1 | 12/2009 | Obermeyer |
| 2010/0279706 A1 | 11/2010 | Dicke |
| 2011/0238476 A1 | 9/2011 | Carr et al. |
| 2012/0122487 A1 | 5/2012 | Holm et al. |
| 2012/0232974 A1 | 9/2012 | Castiglione |
| 2013/0041756 A1 | 2/2013 | Carion et al. |
| 2013/0268353 A1 | 10/2013 | Zeto, III et al. |
| 2014/0006129 A1 | 1/2014 | Heath |
| 2014/0337123 A1 | 11/2014 | Nuernberg et al. |

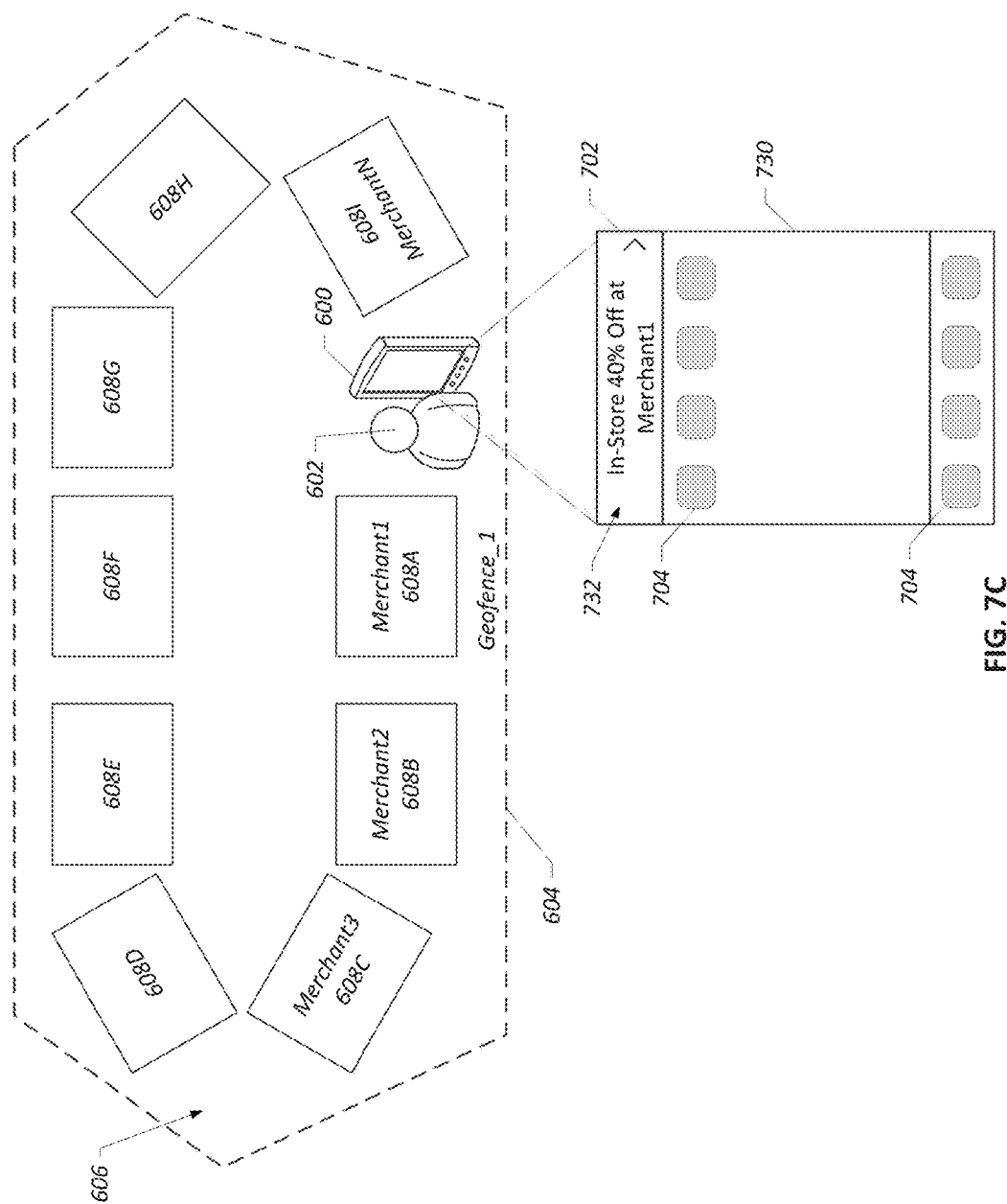

CROSS-DEVICE GEOLOCATION SENSING TO GEOTARGET OFFERS

CROSS-REFERENCE TO RELATED APPLICATIONS

The present application claims the benefit of U.S. Provisional Patent Application 62/016,295 filed 24 Jun. 2014. The present application is also a continuation-in-part of U.S. patent application Ser. No. 14/060,550 filed 22 Oct. 2013, which is a continuation-in-part of PCT Patent Application PCT/US13/45186 filed 11 Jun. 2013, which claims the benefit of U.S. Provisional Patent Application 61/658,387, filed 11 Jun. 2012. Each of these parent patent applications is incorporated by reference in its entirety for all purposes.

BACKGROUND OF THE INVENTION

1. Field of the Invention

The present invention relates generally to merchant offers and, more specifically, to offer-discovery systems.

2. Description of the Related Art

Offer-discovery systems provide a service by which merchants inform customers of offers, for example, deals (e.g., discounts, favorable shipping terms, or rebates) or coupons (e.g., printable coupons for in-store use or coupon codes for use online). Typically, these systems store information about offers from a relatively large number of merchants and provide an interface by which customers can identify offers in which the customer is likely to be interested. Merchants have found the offer-discovery systems to be a relatively effective form of marketing, as cost-sensitive consumers are drawn to such systems due to their relatively comprehensive listings of offers, and as a result, the number of offers listed on such systems has increased in recent years. One consequence of this increase is that users (e.g., prospective customers of the merchants) face an increasingly complex task of identifying relevant offers on offer-discovery systems and recalling information about the offer when making a purchase. Moreover, such tasks are especially challenging for in-store offers that may depend on a user's proximity to a merchant's facility for relevancy and use.

A related problem faced by consumers is remembering to use offers that they (or others) have identified in the past, whether redeemable online or in-store. For example, often a consumer will browse or search for offers using their cell phone or other mobile device when the user has a few free minutes, for instance, while waiting for an appointment. The user may identify offers that they or others might find useful, but often the user does not wish to redeem the offer at that time on their mobile device, typically for any of a number of reasons. It is frequently easier to redeem offers on devices with larger display screens and, in some cases, physical keyboards relative to the ease with which offers can be redeemed on mobile devices. Or an offer may have geographic-use restrictions or be an in-store only offers redeemable at a merchant's physical site.

Frequently, however, users forget to redeem offers, when at the store, or near their home or work desktop or laptop computer. Moreover, the challenge of remembering offers is expected to increase as consumers add more and different types of devices to the lives upon which they may discover offers in other locations, and as merchants issue increasing numbers of offers with increasingly complex sets of redemption constraints.

Another issue faced by operators of offer-discovery systems is that, as such entities continue the newly developing trend to increase their base of local and location-relevant content (e.g., offers for local stores, such as stores within a threshold distance, like within 25 or 50 miles for users that are likely driving or within one mile for users that are likely walking), it is becoming more important to get relatively fine grained location information (e.g., within 100 meters approximately of their location when providing offers to which the user might walk) about where a consumer is located. In a mobile application, that signal can be received through GPS, WiFi™, Bluetooth™ beacon identifiers associated in memory with a geolocations (e.g., in a key-value store that can be queried) and other techniques. However, for users of desktop (or other non-mobile) user interfaces, location data is often much more difficult to get at a sufficiently granular level. In some cases, operators are forced to rely on less reliable signals, like IP address, which often only provide low-resolution geolocation information (e.g., at the level of zip code or city).

SUMMARY OF SOME ASPECTS OF THE INVENTIONS

The following is a non-exhaustive listing of some aspects of the present techniques. These and other aspects are described in the following disclosure.

In some embodiments, a computer-implemented method for determining relevant offers for a geofenced geographic area is provided. The method includes receiving, over a network from a mobile user device, a request for offers, the request comprising a geofence identifier associated with a geofence, the geofence defining a perimeter around a geographic area comprising one or more retail stores and identifying, via a processor, one or more merchants associated with the geofence. Additionally, the method includes identifying, via a processor, one or more candidate offers associated with the one or more merchants and ranking, via a processor, the one or more candidate offers based on ranking criteria. The method also includes transmitting, via a processor, the one or more ranked candidate offers to the mobile user device.

Some embodiments provide a computer implemented process of distributing coupons or other offers to non-location-sensing devices based on a geolocation sensed by another device, the process including: obtaining a geolocation of a user from a mobile device of the user, the geolocation being sensed with the mobile device of the user; associating the geolocation of the user with an identifier of the user in an offers engine, the user having a user account in the offers engine associated with the identifier of the user; receiving a request for an offer from another computing device of the user, the other computing device of the user being a different device from the mobile device of the user, the request including or prompting obtaining data from the other computing device sufficient to identify the user account; retrieving the geolocation of the user obtained from the mobile device by identifying the user account with the data from the other computing device sufficient to identify the user account; selecting, with the offers engine, a responsive offer based on the geolocation of the user obtained from the mobile device; and sending the responsive offer to the other computing device of the user.

Some aspects include a tangible, non-transitory, machine-readable medium storing instructions that when executed by a data processing apparatus effectuate the above processes.

Some aspects include a system including one or more processors and memory storing instructions that when executed by at least some of the processors effectuate the above processes.

BRIEF DESCRIPTION OF THE DRAWINGS

The above-mentioned aspects and other aspects of the present techniques will be better understood when the present application is read in view of the following figures in which like numbers indicate similar or identical elements:

FIGS. 7A-7D are schematic diagrams that depict screens of a mobile user device illustrating display of the candidate offers in accordance with some embodiments;

Figure 1:
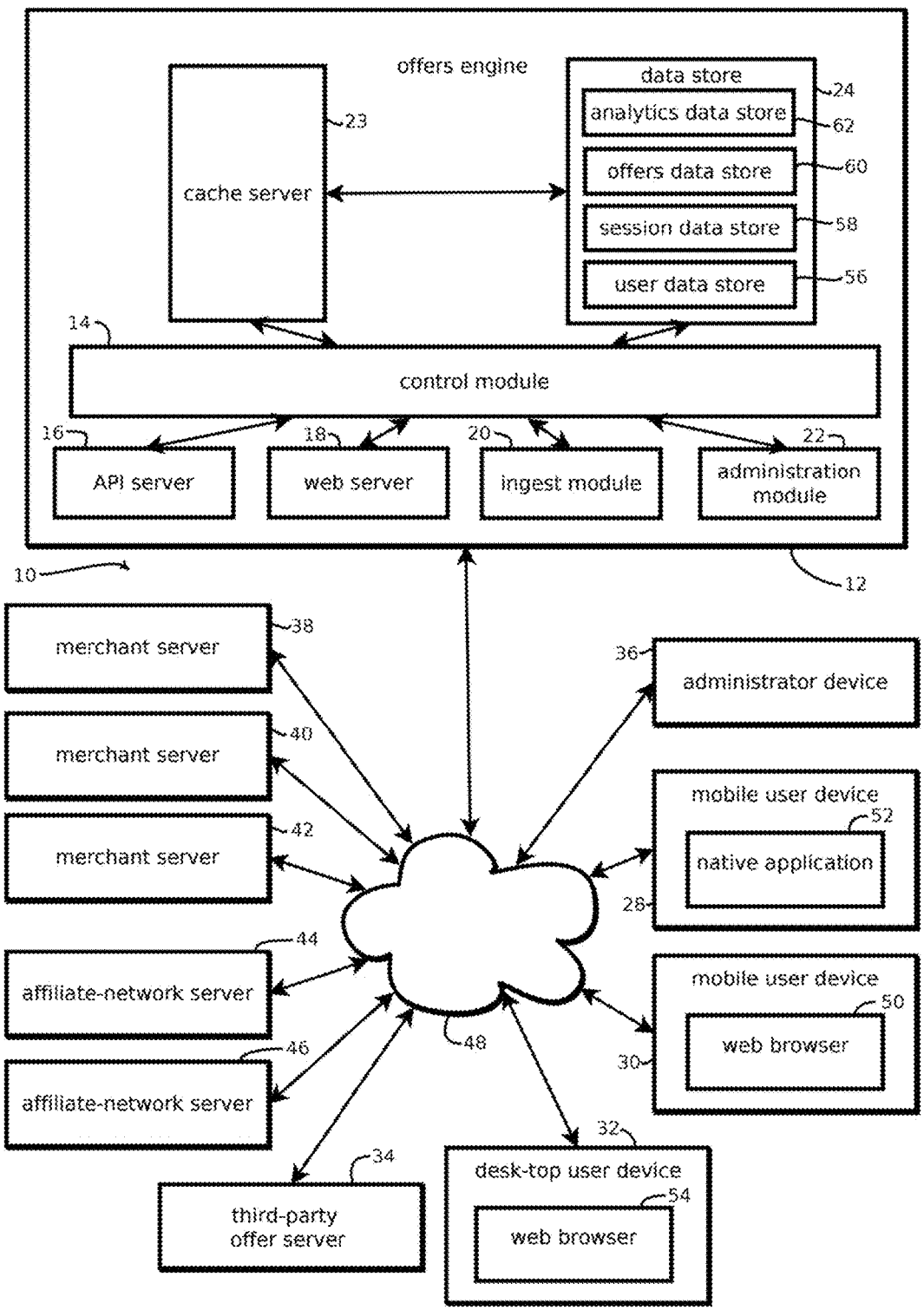
FIG. 1 illustrates an example of an offer-discovery system in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

FIG. 1-9 relate generally to alerting users to offers based on geographic location, and FIGS. 9-19 relate, in some applications, to reminding users of offers for which a reminder was requested, in some cases based on geographic location. The features described with reference to both sets of figures may be combined in some embodiments, or those features, like others described below, may be implemented independently.

FIG. 1 shows an embodiment of an offer-discovery system 10. The exemplary system 10 includes an offers engine 12 that, in some embodiments, is capable of reducing the burden on users attempting to identify offers relevant to them from among a relatively large pool of offers (e.g., more than 100, more than 1,000, or more than 10,000). To this end and others, the offers engine 12 maintains device-independent user profiles (or portions of user profiles) by which offers interfaces may be relatively consistently configured across multiple user devices with which the user interacts with the offers engine 12. Further, the offers engine 12, in some embodiments, includes a number of features expected to facilitate relatively quick identification of relevant offers by a user, features that include cached storage of data related to likely relevant offers, faceted presentation of offers by which users can select among offers within various categories, and a number of other techniques described below for assisting with offer identification. The offers engine 12 is also expected to facilitate relatively low operating costs by, in some embodiments, automating parts of the process by which offer related data is acquired from sources, such as affiliate networks merchants, administrators, or users, and automating parts of the process by which transaction data indicative of acceptance, settlement, or clearing of offers is obtained and processed.

These and other benefits are described in greater detail below, after introducing the components of the system 10 and describing their operation. To mitigate the problems described herein, the applicants had to both invent solutions and, in some cases just as importantly, recognize problems overlooked (or not yet foreseen) by others in the field. Indeed, applicants wish to emphasize the difficulty of recognizing those problems that are nascent and will become much more apparent in the future should trends in the affiliate-networking industry continue as applicants expect. Further, because multiple problems are addressed, it should be understood that some embodiments are problem-specific, and not all embodiments address every problem with traditional systems described herein or provide every benefit described herein. That said, solutions to many of these problems are described with reference to FIG. 1.

In the illustrated embodiment, the offers engine 12 includes a control module 14, an application program interface (API) server 16, a web server 18, an ingest module 20, an administration module 22, a data store 24, and a cache server 23. These components, in some embodiments, communicate with one another in order to provide the functionality of the offers engine 12 described herein. As described in greater detail below, in some embodiments, the data store 24 may store data about offers and users' interactions with those offers; the cache server 23 may expedite access to this data by storing likely relevant data in relatively high-speed memory, for example, in random-access memory or a solid-state drive; the web server 20 may serve webpages having offers interfaces by which users discover relevant offers; the API server 16 may serve data to various applications that process data related to offers; the ingest module 20 may facilitate the intake of data related to offers from affiliate networks, users, administrators, and merchants; and the administration module 22 may facilitate curation of offers presented by the API server 16 and the web server 18. The operation of these components 16, 18, 20, 22, 24, and 23 may be coordinated by the control module 14, which may bidirectionally communicate with each of these components or direct the components to communicate with one another. Communication may occur by transmitting data between separate computing devices (e.g., via transmission control protocol/internet protocol (TCP/IP) communication over a network), by transmitting data between separate applications or processes on one computing device; or by passing values to and from functions, modules, or objects within an application or process, e.g., by reference or by value.

Among other operations, the offers engine 12 of this embodiment presents offers to users; receives data from users about their interaction with the offers (for example, the user's favorite offers or offer attributes; statistics about the offers the user has identified, accepted, or otherwise provided data about; or the identity of other users with whom the user communicates about offers and the content of those communications; provided that users opt to have such data obtained); customizes the presentation of offers based on this received data; and facilitates the processing of compensation from merchants (either directly or through affiliate networks) as a result of users accepting (or taking a specific action, like clicking or viewing, in some embodiments or use cases) offers. This interaction with users may occur via a website viewed on a desktop computer, tablet, or a laptop of the user. And in some cases, such interaction occurs via a mobile website viewed on a smart phone, tablet, or other mobile user device, or via a special-purpose native application executing on a smart phone, tablet, or other mobile user device. Presenting and facilitating interaction with offers across a variety of devices is expected to make it easier for users to identify and recall relevant offers at the time the user is interested in those offers, which is often different from the time at which the user first discovers the offers. In particular, some embodiments allow users to store data indicative of offers relevant to that user using one device, such as a desktop computer in the user's home, and then view those offers at a later time, such as on a native mobile application when in a retail store.

To illustrate an example of the environment in which the offers engine 12 operates, the illustrated embodiment of FIG. 1 includes a number of components with which the offers engine 12 communicates: mobile user devices 28 and 30; a desk-top user device 32; a third party server 34; an administrator device 36; merchant servers 38, 40, and 42; and affiliate-network servers 44 and 46. Each of these devices communicates with the offers engine 12 via a network 48, such as the Internet or the Internet in combination with various other networks, like local area networks, cellular networks, or personal area networks.

The mobile user devices 28 and 30 may be smart phones, tablets, gaming devices, or other hand-held networked computing devices having a display, a user input device (e.g., buttons, keys, voice recognition, or a single or multi-touch touchscreen), memory (such as a tangible, machine-readable, non-transitory memory), a network interface, a portable energy source (e.g., a battery), and a processor (a term which, as used herein, includes one or more processors) coupled to each of these components. The memory of the mobile user devices 28 and 30 may store instructions that when executed by the associated processor provide an operating system and various applications, including a web browser 50 or a native mobile application 52. The native application 52, in some embodiments, is operative to provide an offers interface that communicates with the offers engine 12 and facilitates user interaction with data from the offers engine 12. Similarly, the web browser 50 may be configured to receive a website from the offers engine 12 having data related to deals and instructions (for example, instructions expressed in JavaScript) that when executed by the browser (which is executed by the processor) cause the mobile user device to communicate with the offers engine 12 and facilitate user interaction with data from the offers engine 12. The native application 52 and the web browser 50, upon rendering a webpage from the offers engine 12, may generally be referred to as client applications of the offers engine 12, which in some embodiments may be referred to as a server. Embodiments, however, are not limited to client/server architectures, and the offers engine 12, as illustrated, may include a variety of components other than those functioning primarily as a server.

The desk-top user device 32 may also include a web browser 54 that serves the same or similar role as the web browser 50 in the mobile user device 30. In addition, the desk-top user device 32 may include a monitor; a keyboard; a mouse; memory; a processor; and a tangible, non-transitory, machine-readable memory storing instructions that when executed by the processor provide an operating system and the web browser.

Third-party offer server 34 may be configured to embed data from the offers engine 12 in websites or other services provided by the third-party offer server 34. For example, third-party offer server 34 may be a server of a social networking service upon which users post comments or statistics about offers with which the user has interacted, or the users may use the offer server 34 to recommend offers to others or identify offers to avoid. In another example, third-party offer server 34 may include various services for publishing content to the Web, such as blogs, tweets, likes, dislikes, ratings, and the like. In another example, third-party offer server 34 provides services by which third-parties curate offers hosted by the offers engine 12.

Merchant servers 38, 40, and 42 host websites or other user accessible content interfaces by which users can accept offers hosted by the offers engine 12. In some embodiments, and in some use cases, the merchant servers 38, 40, and 42 host retail websites that present a plurality of items for sale by the merchant, a subset of which may include items to which offers apply, thereby generally making the item for sale more desirable to cost-sensitive consumers than under the terms presented by the merchant in the absence of the offer. For example, the offers may include free or discounted shipping, a discounted price, a bulk discount, a rebate, a referral award, or a coupon, such as a coupon acceptable by presenting a coupon code during checkout on the merchant website, or a printable or displayable coupon (e.g., on the screen of a mobile device) for in-store use, the printable or otherwise displayable coupon having, in some cases, a machine readable code (e.g., a bar code or QR code for display and scanning, or a code passed via near-field communication or Bluetooth™). In some embodiments, the merchant website includes a checkout webpage having an interface for the user to enter payment information and a coupon code, and the merchant website (either with logic on the client side or the server-side) may validate the coupon code entered by the user and, upon determining that the coupon code is valid, adjust the terms presented to the user for acceptance in accordance with the offer.

Some merchants may limit the number of uses of a given coupon, limit the duration over which the coupon is valid, or apply other conditions to use of the coupon, each of which may add to the burden faced by users seeking to find valid coupons applicable to an item the user wishes to purchase. As noted above, some embodiments of the offers engine 12 are expected to mitigate this burden.

Further, in some embodiments, the merchant servers 38, 40, and 42 provide data about offers to the offers engine 12 or (i.e., and/or, as used herein, unless otherwise indicated) data about transactions involving offers. In use cases in which the operator of the offers engine 12 has a direct affiliate-marketing relationship with one of the merchants of the merchant servers 38, 40, or 42, the transaction data may provide the basis for payments by the merchant directly to the operator of the offers engine 12. For example, payments may be based on a percentage of transactions to which offers were applied, a number of sales to which offers were applied, or a number of users who viewed or selected or otherwise interacted with an offer by the merchant.

Affiliate-network servers 44 and 46, in some embodiments and some use cases, are engaged when the entity operating the offers engine 12 does not have a direct affiliate-marketing relationship with the merchant making a given offer. In many affiliate marketing programs, merchants compensate outside entities, such as third-party publishers, for certain activities related to sales by that merchant and spurred by the outside entity. For example, in some affiliate marketing programs, merchants compensate an affiliate, such as the entity operating the offers engine 12, in cases in which it can be shown that the affiliate provided a given coupon code to a given user who then used that coupon code in a transaction with the merchant. Demonstrating this connection to the merchant is one of the functions of the affiliate-networks.

Affiliate-networks are used, in some use cases, because many coupon codes are not affiliate specific and are shared across multiple affiliates, as the merchant often desires the widest distribution of a relatively easily remembered coupon code. Accordingly, in some use cases, the merchant, affiliate network, and affiliate cooperate to use client-side storage to indicate the identity of the affiliate that provided a given coupon code to a user. To this end, in some embodiments, when a webpage offers interface is presented by the offers engine 12 in the web browsers 50 or 54, that webpage is configured by the offers engine 12 to include instructions to engage the affiliate network server 44 or 46 when a user selects an offer, for example, by clicking on, touching, or otherwise registering a selection of an offer. The website provided by the offers engine 12 responds to such a selection by, in some embodiments, transmitting a request to the appropriate affiliate-network server 44 or 46 (as identified by, for example, an associated uniform resource locator (URL) in the webpage) for a webpage or portion of a webpage (e.g., browser-executable content). The request to the affiliate-network server may include (e.g., as parameters of the URL) an identifier of the affiliate, the offer, and the merchant, and the returned content from the affiliate-network server may include instructions for the web browser 50 or 54 to store in memory (e.g., in a cookie, or other form of browser-accessible memory, such as a SQLite database or in a localStorage object via a localStorage.setItem command) an identifier of the affiliate that provided the offer that was selected.

The webpage from the offers engine 12 (or the content returned by the affiliate network server 44 or 46) may further include browser instructions to navigate to the website served by the merchant server 38, 40, or 42 of the merchant associated with the offer selected by the user, and in some cases to the webpage of the item or service associated with the offer selected by the user. When a user applies the offer, for example by purchasing the item or service or purchasing the item or service with the coupon code, the merchant server 38, 40, or 42 may transmit to the user device upon which the item was purchased browser instructions to request content from the affiliate network server 44 or 46, and this requested content may retrieve from the client-side memory the identifier of the affiliate, such as the operator of the offers engine 12, who provided the information about the offer to the user. The affiliate network may then report to the merchant the identity of the affiliate who should be credited with the transaction, and the merchant may compensate the affiliate (or the affiliate network may bill the merchant, and the affiliate network may compensate the affiliate), such as the operator of the offers engine 12. Thus, the affiliate network in this example acts as an intermediary, potentially avoiding the need for cross-domain access to browser memory on the client device, a feature which is generally not supported by web browsers for security reasons. (Some embodiments may, however, store in client-side browser-accessible memory an identifier of the affiliate upon user selection of the offer, with this value designated as being accessible via the merchant's domain, and provide the value to the merchant upon a merchant request following acceptance of the offer, without passing the identifier through an affiliate network, using a browser plug-in for providing cross-domain access to browser memory or a browser otherwise configured to provide such access.)

A similar mechanism may be used by the native application 52 for obtaining compensation from merchants. In some embodiments, the native application 52 includes or is capable of instantiating a web browser, like the web browser 50, in response to a user selecting an offer presented by the native application 52. The web browser instantiated by the native application 52 may be initialized by submitting the above-mentioned request for content to the affiliate-network server 44 or 46, thereby storing an identifier of the affiliate (i.e., the entity operating the offers engine 12 in this example) in client-side storage (e.g., in a cookie, localStorage object, or a database) of the mobile user device 28, and thereby navigating that browser to the merchant website. In other use cases, the operator of the offers engine 12 has a direct relationship with the merchant issuing the offer, and the selection of an offer within the native application 52 or the desktop or mobile website of the offers engine 12 (generally referred to herein as examples of an offer interface) may cause the user device to request a website from the associated merchant with an identifier of the affiliate included in the request, for example as a parameter of a URL transmitted in a GET request to the merchant server 38, 40, or 42 for the merchant's website.

Administrator device 36 may be a special-purpose application or a web-based application operable to administer operation of the offers engine 12, e.g., during use by employees or agents of the entity operating the offers engine 12. In some embodiments, the administration module 22 may communicate with the administrator device 36 to present an administration interface at the administrator device 36 by which an administrator may configure offers interfaces presented to users by the offers engine 12. In some embodiments, the administrator may enter offers into the offers engine 12; delete offers from the offers engine 12; identify offers for prominent placement within the offers interface (e.g., for initial presentation prior to user interaction); moderate comments on offers; view statistics on offers, merchants, or users; add content to enhance the presentation of offers; or categorize offers.

Thus, the offers engine 12, in some embodiments, operates in the illustrated environment by communicating with a number of different devices and transmitting instructions to various devices to communicate with one another. The number of illustrated merchant servers, affiliate network servers, third-party servers, user devices, and administrator devices is selected for explanatory purposes only, and embodiments are not limited to the specific number of any such devices illustrated by FIG. 1.

The offers engine 12 of some embodiments includes a number of components introduced above that facilitate the discovery of offers by users. For example, the illustrated API server 16 may be configured to communicate data about offers via an offers protocol, such as a representational-state-transfer (REST)-based API protocol over hypertext transfer protocol (HTTP). Examples of services that may be exposed by the API server 18 include requests to modify, add, or retrieve portions or all of user profiles, offers, or comments about offers. API requests may identify which data is to be modified, added, or retrieved by specifying criteria for identifying records, such as queries for retrieving or processing information about particular categories of offers, offers from particular merchants, or data about particular users. In some embodiments, the API server 16 communicates with the native application 52 of the mobile user device 28 or the third-party offer server 34.

The illustrated web server 18 may be configured to receive requests for offers interfaces encoded in a webpage (e.g. a collection of resources to be rendered by the browser and associated plug-ins, including execution of scripts, such as JavaScript™, invoked by the webpage). In some embodiments, the offers interface may include inputs by which the user may request additional data, such as clickable or touchable display regions or display regions for text input. Such inputs may prompt the browser to request additional data from the web server 18 or transmit data to the web server 18, and the web server 18 may respond to such requests by obtaining the requested data and returning it to the user device or acting upon the transmitted data (e.g., storing posted data or executing posted commands). In some embodiments, the requests are for a new webpage or for data upon which client-side scripts will base changes in the webpage, such as XMLHttpRequest requests for data in a serialized format, e.g. JavaScript™ object notation (JSON) or extensible markup language (XML). The web server 18 may communicate with web browsers, such as the web browser 50 or 54 executed by user devices 30 or 32. In some embodiments, the webpage is modified by the web server 18 based on the type of user device, e.g., with a mobile webpage having fewer and smaller images and a narrower width being presented to the mobile user device 30, and a larger, more content rich webpage being presented to the desk-top user device 32. An identifier of the type of user device, either mobile or non-mobile, for example, may be encoded in the request for the webpage by the web browser (e.g., as a user agent type in an HTTP header associated with a GET request), and the web server 18 may select the appropriate offers interface based on this embedded identifier, thereby providing an offers interface appropriately configured for the specific user device in use.

The illustrated ingest module 20 may be configured to receive data about new offers (e.g., offers that are potentially not presently stored in the data store 24), such as data feeds from the affiliate network servers 44 and 46, identifications of offers from user devices 28, 30, or 32, offers identified by third-party offer server 34, offers identified by merchant servers 38, 40, or 42, or offers entered by an administrator via the administrator device 36. In some embodiments, the ingest module 20 may respond to receipt of a record identifying a potentially new offer by querying the data store 24 to determine whether the offer is presently stored. Upon determining that the offer is not presently stored by the data store 24, the ingest module 20 may transmit a request to the data store 24 to store the record. In some cases, the data about new offers may be an affiliate data-feed from an affiliate network containing a plurality of offer records (e.g., more than 100), each record identifying offer terms, a merchant, a URL of the merchant associated with the offer, a product description, and an offer identifier. The ingest module 22 may periodically query such data-feeds from the affiliate-network servers 44 or 46, parse the data-feeds, and iterate through (or map each entry to one of a plurality of processes operating in parallel) the records in the data-feeds. Bulk, automated processing of such data-feeds is expected to lower operating costs of the offers engine 12.

The administration module 22 may provide an interface by which an administrator operating the administrator device 36 curates and contextualizes offers. For example, the administration module 22 may receive instructions from administrator that identify offers to be presented in the offer interface prior to user interaction with the offer interface, or offers to be presented in this initialized offers interface for certain categories of users, such as users having certain attributes within their user profile. Further, in some embodiments, the administration module 22 may receive data descriptive of offers from the administrator, such as URLs of images relevant to the offer, categorizations of the offer, normalized data about the offer, and the like.

The illustrated data store 24, in some embodiments, stores data about offers and user interactions with those offers. The data store 24 may include various types of data stores, including relational or non-relational databases, document collections, hierarchical key-value pairs, or memory images, for example. In this embodiment, the data store 24 includes a user data store 56, a session data store 58, an offers data store 60, and an analytics data store 62. These data stores 56, 58, 60, and 62 may be stored in a single database, document, or the like, or may be stored in separate data structures.

In this embodiment, the illustrated user data store 56 includes a plurality of records, each record being a user profile and having a user identifier, a list of offers (e.g., identifiers of offers) identified by the user as favorites, a list of categories of offers identified by the user as favorites, a list of merchants identified by the user as favorites, account information for interfacing with other services to which the user subscribes (e.g., a plurality of access records, each record including an identifier of a service, a URL of the service, a user identifier for the service, an OAuth access token credential issued by the service at the user's request, and an expiration time of the credential), a user password for the offers engine 12, a location of the user device or the user (e.g., a zip code of the user), and a gender of the user. In some embodiments, each user profile includes a list of other users identified by the user of the user profile as being people in whose commentary on, or curation of, offers the user is interested, thereby forming an offers-interest graph. In some embodiments, users have control of their data, including what is stored and who can view the data, and can choose to opt-in to the collection and storage of such user data to improve their experience with the offers engine 12.

In this embodiment, the session data store 58 stores a plurality of session records, each record including information about a session a given user is having or has had with the offers engine 12. The session records may specify a session identifier, a user identifier, and state data about the session, including which requests have been received from the user and what data has been transmitted to the user. Session records may also indicate the IP address of the user device, timestamps of exchanges with the user device, and a location of the user device (e.g., retail store or aisle in a retail store in which the user device is located).

The illustrated offers data store 60, in some embodiments, includes a plurality of offer records, each offer record may identify a merchant, offers by that merchant, and attributes of the relationship with the merchant, e.g., whether there is a direct relationship with the merchant by which the merchant directly compensates the operator of the offers engine 12 or whether the merchant compensates the operator of the offers engine 12 via an affiliate network and which affiliate network. The offers by each merchant may be stored in a plurality of merchant-offer records, each merchant-offer record may specify applicable terms and conditions of the offer, e.g., whether the offer is a discount, includes free or discounted shipping, requires purchase of a certain number of items, is a rebate, or is a coupon (which is not to suggest that these designations are mutually exclusive). In records in which the offer is a coupon, the record may further indicate whether the coupon is for in-store use (e.g. whether the coupon is associated with a printable image for presentation at a point-of-sale terminal, a mobile device-displayable image, or other mediums) or whether the coupon is for online use and has a coupon code, in which case the coupon code is also part of the merchant-offer record. The merchant-offer records may also include an expiration date of the offer, comments on the offer, rankings of the offer by users, a time at which the offer was first issued or entered into the offers engine 12, and values (e.g., binary values) indicating whether users found the offer to be effective, with each value or ranking being associated with a timestamp, in some embodiments. The values and rankings may be used to calculate statistics indicative of the desirability of the offer and likely success of accepting the offer. The timestamps associated with the values, rankings, and time of issuance or entry into the offers engine 12 may also be used to weight rankings of the offer, with older values being assigned less weight than newer values and older offers being ranked lower than newer offers, all other things being equal, as many offers expire or have a limited number of uses.

The illustrated analytics data store 62 may store a plurality of records about historical interactions with the offers engine 12, such as aggregate statistics about the performance of various offers. In some embodiments, the analytics data store 62 stores a plurality of transaction records, each transaction record identifying an offer that was accepted by a user at a merchant, the merchant, the time of presentation of the offer to the user, and an indicator of whether the merchant has compensated the entity operating the offers engine 12 for presentation of the offer to the user. Storing and auditing these transaction records is expected to facilitate relatively accurate collection of payments owed by merchants and identification of future offers likely to lead to a relatively high rates of compensation for prominent presentation based on past performance of offers having similar attributes.

The cache server 23 stores a subset of the data in the data store 24 that is among the more likely data to be accessed in the near future. To facilitate relatively fast access, the cache server 23 may store cached data in relatively high speed memory, such as random access memory or a solid-state drive. The cached data may include offers entered into the offers engine 12 within a threshold period of time, such as offers that are newer than one day. In another example, the cache data may include offers that are accessed with greater than a threshold frequency, such as offers that are accessed more than once a day, or offers accessed within the threshold, such as offers accessed within the previous day. Caching such offer data is expected to facilitate faster access to offer data than systems that do not cache offer data.

The illustrated control module 14, in some embodiments, controls the operation of the other components of the offers engine 12, receiving requests for data or requests to add or modify data from the API server 16, the web server 18, the ingest module 20, and the administration module 22, and instructing the data store 24 to modify, retrieve, or add data in accordance with the request. The control module 14 may further instruct the cache server 23 to modify data mirrored in the cache server 23. In some embodiments, the cache server 23 may be updated hourly, and inconsistent data may potentially be maintained in the cache server 23 in order to conserve computing resources.

The illustrated components of the offers engine 12 are depicted as discrete functional blocks, but embodiments are not limited to systems in which the functionality described herein is organized as illustrated by FIG. 1. The functionality provided by each of the components of the offers engine 12 may be provided by software or hardware modules that are differently organized than is presently depicted, for example such software or hardware may be intermingled, broken up, distributed (e.g. within a data center or geographically), or otherwise differently organized. The functionality described herein may be provided by one or more processors of one or more computers executing code stored on a tangible, non-transitory, machine readable medium.

Figure 2:
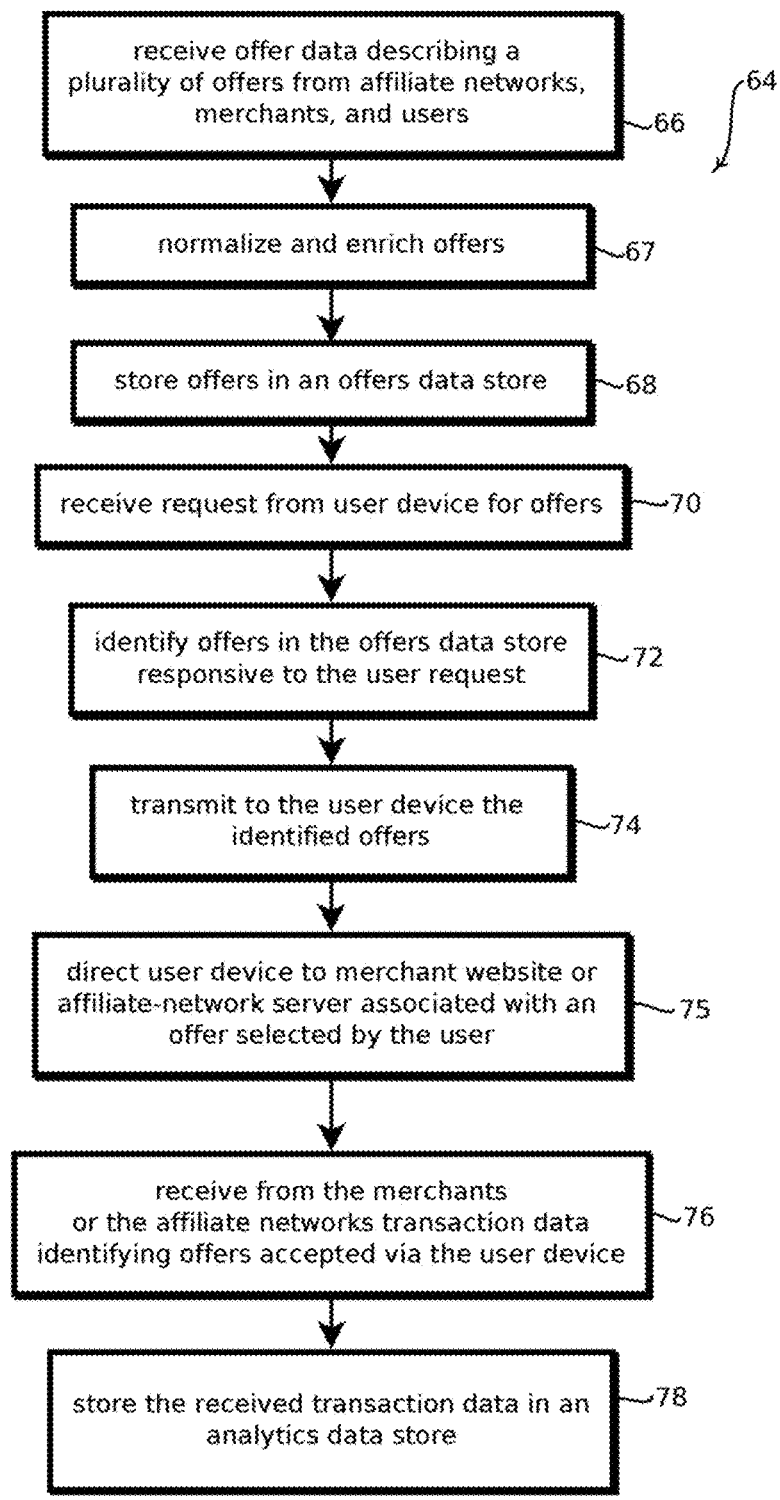
FIG. 2 illustrates an example of a process by which an offers engine in the offer-discovery system of FIG. 1, in some embodiments, obtains and processes data related to offers.

FIG. 2 is a flowchart of a process 64 for acquiring data related to offers within some embodiments of the offer engine 12 discussed above. In this embodiment, the process 64 begins with receiving offer data describing a plurality of offers from affiliate networks, merchants, and users, as illustrated by block 66. This step may be performed by the above-mentioned ingest module 20. As noted above, the received offer data may be received from one or all of these sources. The received offer data may be received via an offer interface by which users associated with these sources enter data about offers, or the received offer data may be received in a predefined format, such as a serialized data format, in an automatic data feed pushed or pulled periodically or in response to the availability of new data from affiliate networks or merchants. Receiving the offer data may include determining whether the offer data is redundant to offer data already received and normalizing the offer data.

The process 64, in some embodiments, includes normalizing and enriching the offer data. Normalizing may include normalizing field names of the data and normalizing the way in which dates are expressed, for example. Enriching may include associating images with the offers for presentation with the offers and adding metadata to the offers to assist users searching for offers.

Next, in the present embodiment, the received offer data is stored in an offer data store, as indicated by block 68. Storing the offer data in the offer data store may include identifying a merchant to which the offer pertains and storing the offer in a merchant-offer record associated with that merchant. Further, some embodiments may include inserting the offer in order in a sorted list of offers for relatively fast retrieval of offers using a binary search algorithm or other techniques to facilitate relatively quick access to data that has been preprocessed (e.g., using a prefix trie). In some embodiments, storing the received offer may further include updating hash tables by which the offer may be retrieved according to various parameters, each hash table being associated with one parameter and including a hash key value calculated based on the parameter and paired with an address of the offer. Such hash tables are expected to facilitate relatively fast access to a given offer as the need to iterate through potentially all offers meeting certain criteria may be potentially avoided.

In some embodiments, the process 64 further includes receiving a request from a user device for offers, as indicated by block 70. The request may specify criteria for identifying offers, such as categories of offers, search terms for offers, or requests for offers designated as favorites.

Next, the present embodiment includes identifying offers in the offer data store responsive to the user request, as indicated by block 72. Identifying offers in the offer data store may be performed by the above-mentioned controller 14 (FIG. 1) by constructing a query to the offer data store 60 based on a request received from the web server 18 or the API server 16. The query may be transmitted to the offer data store 60, or to the cache server 23, each of which may return responsive records.

Next, the identified offers are transmitted to the user device, as indicated by block 74. Transmitting the identified offers may include transmitting the identified offers in an offer interface, such as a webpage, or an API transmission to a native mobile application, for example by the web server 18, or the API server 16 of FIG. 1, respectively.

The device receiving the identified offers may, in response, perform a process described below with reference to FIG. 3 by which additional offers are requested or an offer is selected and a purchase is executed. This process of FIG. 3 and steps 70 through 74 of FIG. 2 may be repeated numerous times, in some use cases, before advancing to the next steps. Further, the steps 66 through 68 may be repeated numerous times independently of (e.g., concurrent with) the performance of steps 70 through 74 of FIG. 2 (which is not to suggest that other steps described herein may not also be executed independently). That is, the process 64 may undergo step 66 through 68, for example, 50 times within a given time, while performing steps 70 through 74 500 times within that given time, and performing the remaining steps of process 64 a single time.

Figure 3:
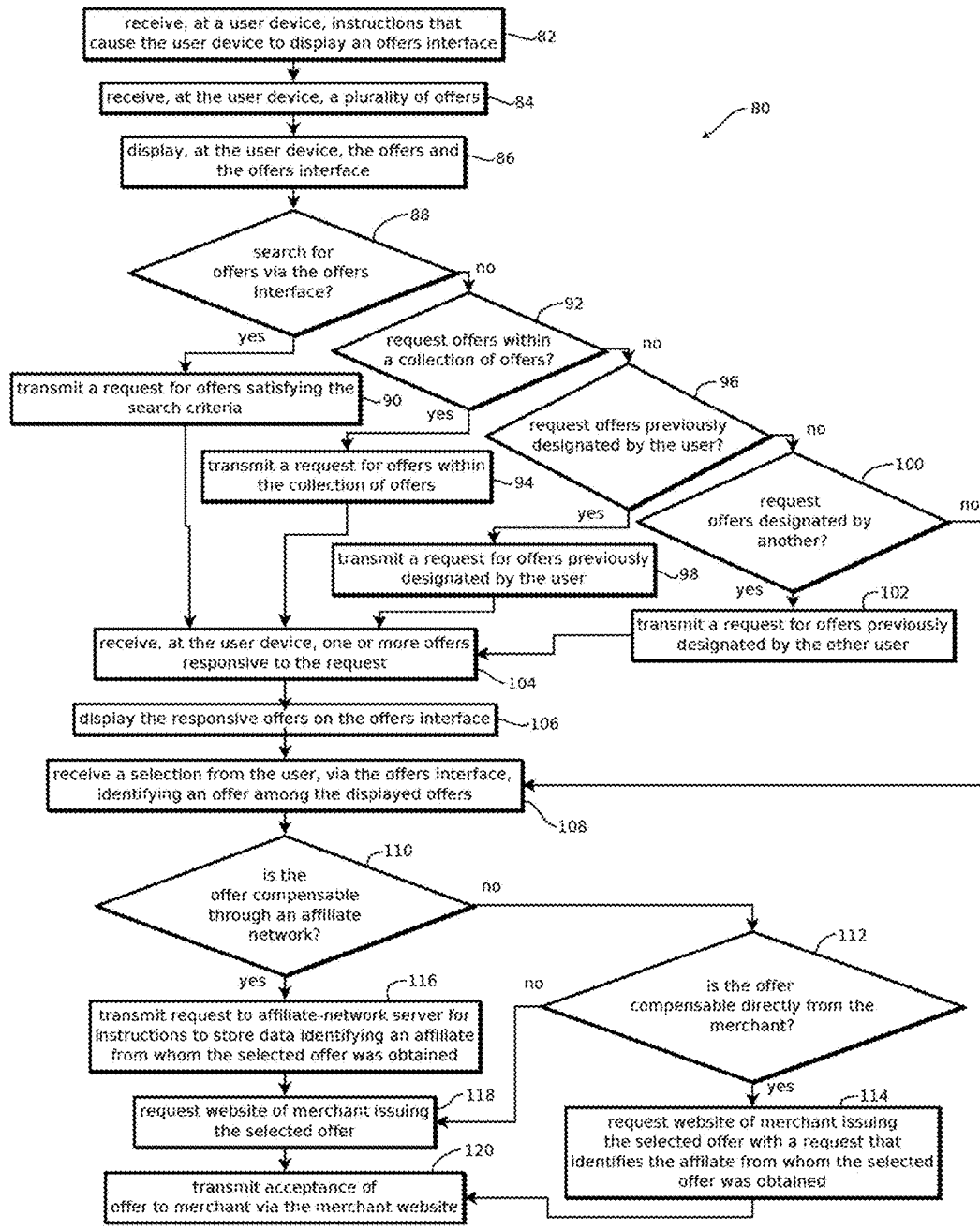
FIG. 3 illustrates an example of a process by which a user device in the offer-discovery system of FIG. 1, in some embodiments, obtains and presents to users data related to offers.

In some embodiments, a user device undergoing the process of FIG. 3 may indicate to an offers engine that the user has selected an offer (e.g., by clicking on or touching a selectable element in an offers interface associated with the offer). In response, the offers engine may direct the user device to an affiliate-network server or a merchant server associated with the offer, as illustrated by block 75.

Next, this embodiment of the process 64 includes receiving from merchants or affiliate networks transaction data identifying offers accepted via the user device, as illustrated by block 76. The transaction data may be pulled from these sources, for example, by the ingest module 20 of FIG. 1, periodically, or in response to some threshold number of transactions having occurred.

Next, in this embodiment, the receipt transaction data may be stored in an analytics data store, as indicated by block 78. In some embodiments, this data may be stored in the analytics data store 62 of FIG. 1. Storing the transaction data is expected to facilitate the identification of attributes of relatively profitable offers, as the transaction data indicates which offers historically yielded compensable transactions. Further, storing the transaction data is expected to facilitate relatively accurate auditing of payments from merchants or affiliate networks.

FIG. 3 is a flowchart of an embodiment of a process 80 that provides an example of an offer interface at a user device. The process 80 may be performed by the above-mentioned native application 52 or web browser 50 or 54 in cooperation with the offers engine 12.

Some embodiments of process 80 begin with receiving, at a user device, instructions that cause the user device to display an offers interface, as indicated by block 82. The received instructions may be in the form of a downloaded native application, such as one downloaded from an application store hosted by a provider of mobile devices, or the received instructions may be in the form of a website received from the offers engine 12 and rendered in a browser of the user device.

In some embodiments, the process 80 further includes receiving, at the user device, a plurality of offers, as indicated by block 84, and displaying, at the user device, the offers in the offer interface, as indicated by block 86. The offers may be received at approximately the same time the instructions of step 82 are received, for example along with a webpage, or the offers may be received at a later date, for example during a session subsequent to downloading the native application.

The offers interface may include inputs by which the user may search, filter, or otherwise browse offers having various attributes. Some of these interfaces are described below with reference to steps performed to determine whether the user has engaged these inputs. In some embodiments, determining whether the user has engaged these inputs may be performed by an event handler executed by the user device, the event handler causing the user device to perform the corresponding, below-described requests to the offers engine 12 based on the type of event, e.g., whether the user touched, clicked, or otherwise selected a particular button on the offers interface.

Illustrated process 80 includes determining whether the user is searching for offers, as indicated by block 88. With the offers interface, the user may express their intention to search for offers by entering search terms in a text entry box and selecting a button to request a search in accordance with the entered search term. Upon selecting this button, the user device may transmit a request for offers satisfying the entered search criteria, as indicated by block 90. The transmitted request may be in the form of a GET request or an API call to the web server 18 or the API server 16 of the offers engine 12 of FIG. 1.

In some embodiments, the process 80 further includes determining whether the user requests offers within a collection of offers, as indicated by block 92. The offers interface may include selectable inputs that identify the collections, such as clickable collection names, collection selection buttons, or collection selection tabs. Examples of collections include categories of goods or services, such as sporting goods, house-wares, groceries, and the like; collections of modes of coupon redemption, such as in-store coupon redemption and online coupon redemption; collections based on offer statistics, such as newest offers, most popular offers, highest ranked offers; collections of offers designated by a user or other users; or collections based the value conferred by the offer, such as discounts, free shipping, rebates, and referral fees. Upon determining that the user has requested offers within a collection, the user device may transmit a request for offers within the collection to the offers engine 12, as indicated by block 94, which may return data responsive to the request.

In some embodiments, the process 80 includes determining whether the user requests offers previously designated by the user, as indicated by block 96. In some embodiments, the offers interface may include an input by which a user can designate an offer, such as designating offers as being a user favorite, designating offers as being ranked in a particular fashion, or designating offers as likely being of interest to some other user, such as users adjacent one another in a social graph. The offers interface may include an input for a user to make designations, such as a user selectable input labeled "add to my favorites," or "add to my wallet," and an input for a user to request offers having a designation, such as a user selectable input labeled "view my favorites." or "view my wallet." Upon determining that the user made such a request, the process 80 includes transmitting a request for the offers previously designated by the user, as indicated by block 88. The transmission may be made to the offers engine 12, to the API server 16 or the web server 18, as described above with reference to FIG. 1, and may include an identification of the designation and the user.

The process 80, in some embodiments, further includes determining whether the user requests offers previously designated by another user, as indicated by block 100. The offers interface, in some embodiments, may include an input by which a user makes such a request, such as a user selectable input labeled "offers recommended by my friends." Upon determining that the user has made such a request, the process 80 transmits a request for offers previously designated by the other user (or users), as indicated by block 102. Again, the transmission may be to the offers engine 12 of FIG. 1, which may store or otherwise have access to offers designated by other users and a social graph of the user by which responsive offers are identified. Further, the offers interface may include an input by which the user may view identifiers of other users and add the other users to an offer-interest graph of the user. This offer interest graph may be referenced by the offers engine 12 to identify offers in response to the request of step 102.

The process 80 further includes, in some embodiments, receiving, at the user device, one or more offers responsive to the request, as indicated by block 104, and displaying the responsive offers on the offers interface, as indicated by block 106.

In some embodiments and some use cases, a selection from the user is received via the offers interface, thereby identifying an offer among the displayed offers, as indicated by block 108. In some embodiments, each of the offers may be displayed with an associated input by which the user selects the offer, such as a touchable or clickable button, region, or text. The selection, in some embodiments, may cause the offers interface to request additional data from the offers engine, such as instructions from the offers engine to navigate to an affiliate-network server associated with the offer or to navigate to a merchant server associated with the offer. In other embodiments, such instructions may be present within the offers interface, e.g., in the form of URLs linking to these servers.

The process 80 further includes determining whether the selected offer is compensable through an affiliate network, as indicated by block 110. This determination may be made by the offers engine 12, in some embodiments, for each of the offers being displayed prior to transmission of the offers to the user device. For example, each offer may be associated with a designation indicating whether the offer is compensable in this fashion, and the designation may be transmitted along with the offer, for instance, by associating the offer with HTML or JavaScript™ that so designate the offer, or by including a field including the designation in a response to an API call for each offer. The user device, in some embodiments, may take different actions depending on the designation associated with the selected offer.

Upon determining that the selected offer is not compensable through an affiliate network, the process 80 of this embodiment includes determining whether the selected offer is compensable directly from the merchant associated with the offer, as indicated by block 112. Again, the determination of block 112 may be performed, in some embodiments, by the offers engine 12 for each of the offers being displayed prior to transmission of the displayed offers, and each displayed offer may be associated with a designation based on the results of the determination, such as different HTML or JavaScript™ or a different field value in an API response. The user device may take different actions depending on this designation.

Upon determining that the selected offer is not compensable directly from the merchant, the process 80 may proceed to block 118 described below. Upon determining that the selected offer is compensable, the process 80, in this embodiment, may proceed to request the website of the merchant issuing the selected offer with a request that identifies the affiliate from whom the selected offer was obtained, as indicated by block 114. The request may be in the form of a URL having as a parameter an identifier of the entity operating the offer engine 12, thereby indicating to the merchant that the affiliate should be compensated in accordance with an arrangement between the merchant and the affiliate. Upon performance of step 114, the process 80 of the present embodiment proceeds to step 120 described below.

As indicated by block 110, upon determining that the selected offer is compensable through an affiliate network, the process 80 proceeds to transmit a request to the affiliate-network server for instructions to store data identifying an affiliate from whom the selected offer was obtained, as indicated by block 116. This request may be a request for content from the affiliate-network server that is not displayed to the user, or is not displayed to the user for an appreciable amount of time (e.g., less than 500 ms), and the request may include an identifier of the affiliate, the merchant, and the offer. The requested content may cause the user device to store in persistent memory of the browser of the user device (e.g., memory that lasts between sessions, such as a cookie or a database of the browser) an identifier of the affiliate operating the offers engine 12. This value may be retrieved later by the affiliate-network at the instruction of the merchant upon the user accepting the offer, for example by the user using a coupon code associated with the offer at the merchant, thereby allowing the merchant (or the affiliate network) to identify the appropriate party to compensate for the sale.

Upon transmitting the request the affiliate network server, the process 80 further includes requesting the website of the merchant issuing the selected offer, as indicated by block 118, and transmitting acceptance of the offer to the merchant via the merchant's website, as indicated by block 120. Accepting the offer, as noted above, may cause the merchant to compensate the affiliate operating the offers engine 12.

The process 80 of FIG. 3 is expected to facilitate relatively fast access to offers that are likely to be relevant to a user, as each of the determinations of step 88, 92, 96, and 100 provide different paths by which the user can specify offers in which the user is likely to be interested. Further, the determinations of step 110 and 112 provide dual mechanisms by which the operator of the offers engine 12 can be compensated, thereby potentially increasing revenue.

As mentioned above, offers may include offers redeemable at a merchant facility (e.g., a retail store) and may be referred to as "in-store offers." In some embodiments, the offers engine 12 may provide such offers to a user in response to a user's traversal of a geofence. As used herein, the term "geofence" refers to a virtual perimeter for a real-world geographic area. As described further below, when a user crosses a geofence, offers relevant to merchant facilities within the geographic area of the geofenced perimeter are provided to the user via a user device. The geographic area may include, for example, an indoor shopping mall, an outdoor shopping mall, a shopping district, an airport, or any other suitable geographic area having merchant facilities.

Figure 4:
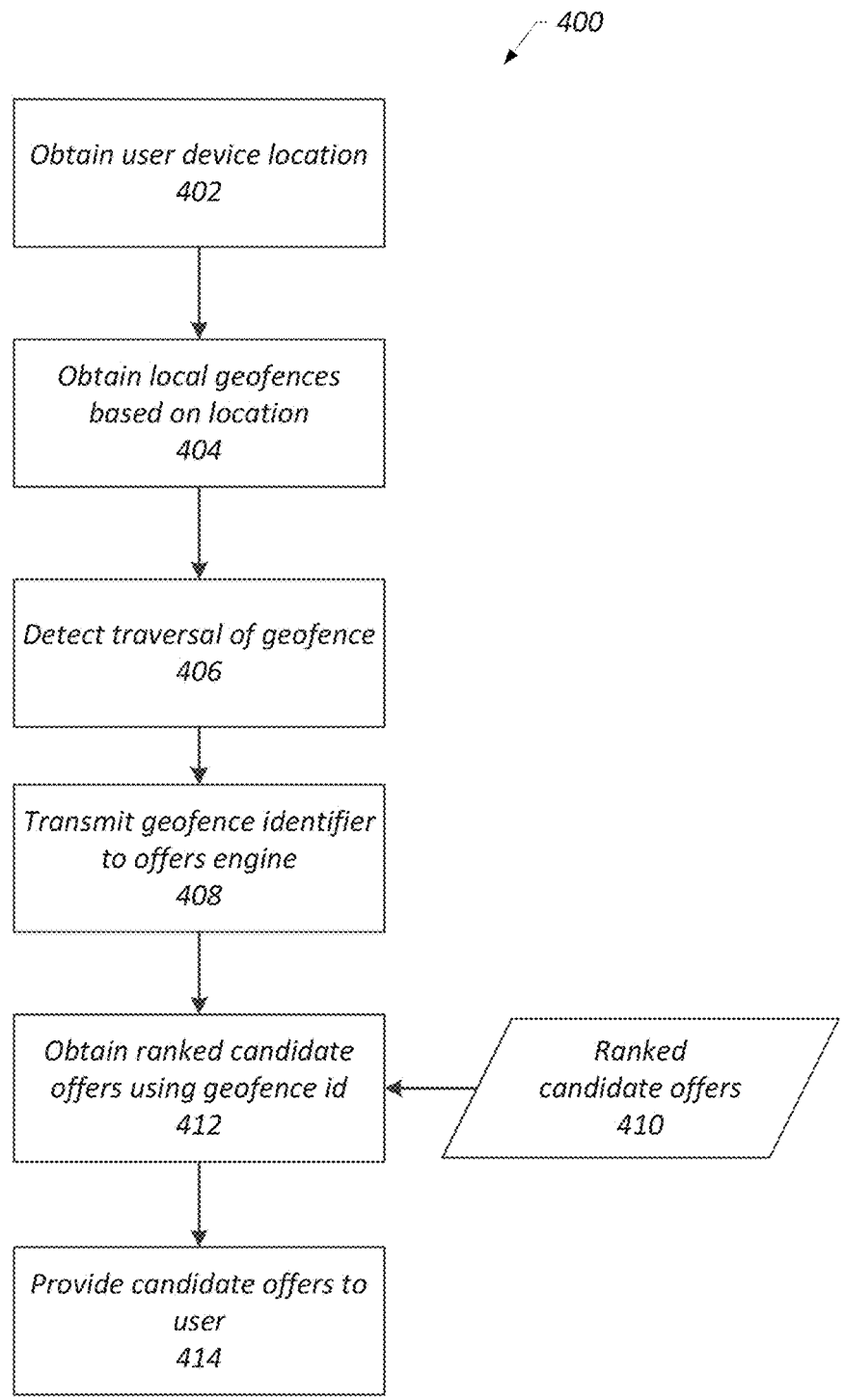
FIG. 4 is a block diagram of a process for obtaining offers in response to traversal of a geofence in accordance with some embodiments.

FIG. 4 depicts a process 400 for obtaining offers in response to traversal of a geofence in accordance with an embodiment of the present invention. The process 400 may be executed by, for example, a user device such as the mobile user device 28. In such embodiments, some or all steps of the process 400 may be implemented via the native application 52 executed by the mobile user device 28. Initially, the current user device location is obtained (block 402). As will be appreciated, in some embodiments the current user device location is obtained via communication with a satellite-based positioning system (e.g., GPS). In some embodiments, other suitable locating techniques, such as Wi-Fi based locating, IP address geolocation, or other techniques may be used alone or in combination with other locating techniques.

Next, local geofences are obtained based on the user device location (block 404). The local geofences may be obtained from the offers engine 12 and may be stored (e.g., cached) in a memory of the user device. The local geofences may be selected from a database of geofences based on the proximity of the user location to each of the geofence locations. The proximity for selecting the local geofences may vary based on factors such as the user's location at a given point in time or the user's location over a set of points in time. In some embodiments, a geofence may defined by a polygon enclosing an area. The polygons may be defined via coordinates, such as latitude and longitude coordinates. In other embodiments, a geofence may be defined by a center point and a radius. Thus, in some embodiments, a geofence may be stored by storing the coordinates or center point and radius that define the geofence.

The offers engine 12 may store defined geofences (e.g., polygons, center points and radii, etc.) for providing to a user device. Each geofence may be assigned a unique geofence identifier. Additionally, the offers engine 12 may store additional data associated with a geofence. In some embodiments, the additional data may include a list of merchants associated with the geofence. For example, if the geofence corresponds to real-world shopping mall, the list of merchants associated with the geofence may correspond to the some or all of the stores in the shopping mall. In some embodiments, the obtained geofences and geofence identifiers may be stored (e.g., cached) on the user device. In some embodiments, only the geofence, geofence identifiers may be stored on the user device, such that the additional data associated with a geofence is not stored on the user device, thus minimizing memory usage of the cached geofences.

Next, the traversal of a geofence is detected (block 406). For example, after a user carrying a mobile user device crosses a geofence, the crossing is detected and used in the processing described further below. In some embodiments, the mobile user device may include a program (e.g., a native service or application) that monitors the location of the mobile user device and determines traversal of a geofence. In some embodiments, a program of the mobile user device may monitor the geofences stored (e.g., cached) on the mobile user device and detect traversal of a stored geofence. In some embodiments, an operating system of the mobile user device may provide a framework, advanced programming interface (API) or other components (e.g., the Core-Location Framework provided by Apple, Inc., of Cupertino, Calif.) for determining the location of a mobile user device. In some embodiments for example, the mobile user device may use a service provided by Localpoint® Platform provided by 30 Second Software, Inc. d/b/a Digby of Austin, Tex. or the Gimbal® Platform by Qualcomm Labs, Inc. It should be appreciated that such services may be event-based and may detect generation of an event when the location of the mobile user device changes, such as when the location changes by greater than a threshold amount, changes with respect to detected wireless networks, changes with respect to cellular network towers, and so on. Moreover, it should be appreciated that such services may be selected and implemented with the desire to limit power consumption and maximize battery life of a mobile user device.

After traversal of a geofence, the geofence identifier is transmitted to the offers engine 12 for a determination of relevant candidate offers (block 408). As illustrated in FIG. 4 and described further below, the offers engine 12 may determine candidate offers for the merchants associated with the transmitted geofence identifier. Next, ranked candidate offers 410 are obtained from the offers engine 12 (block 412). In some embodiments, the candidate offers data (e.g., images, text, and other data) is transmitted to and stored (e.g., cached) on the mobile user device. As mentioned above, the candidate offers 410 are determined to be relevant to the merchants associated with the geofence identifier, e.g., the retail stores in a shopping mall within a traversed geofence. Thus, after a user enters a shopping mall or other geofenced geographic area, the user's mobile user device may receive and have access to relevant offers.

Next, the candidate offers are provided to the user via the mobile user device (block 414). In some embodiments, as described below, a notification may be displayed in a user interface of the mobile user device that indicates that offers for the geographic area are available. A user may select the notification to view some or all of the candidate offers. In some embodiments, the candidate offers are provided using a candidate offer flow that is a sequence of candidate offers provided to the user based on flow criteria. As will be appreciated, the candidate offers may be displayed on a display of a mobile user device. In such embodiments, a candidate offer may be displayed in a notification bar or other area of a user interface of a mobile user device. The user may access the relevant offers and purchase goods or services from a merchant after receiving a relevant offer. The flow criteria may include a time period between offers, a score threshold for each candidate offer, a maximum number of candidate offers in a time period, or any combination thereof. For example, the flow criteria may specific a time period between candidate offers, so that the next candidate offer is only displayed after the first candidate offer has been displayed for the time period. In another example, a score threshold may be required for a candidate offer to be provided to a user in the candidate offer flow. In another example, a maximum number of candidate offers in a time period, such that if the maximum number of candidate offers is reached within the time period, no further candidate offers are display until the time period has elapsed.

Figure 5:
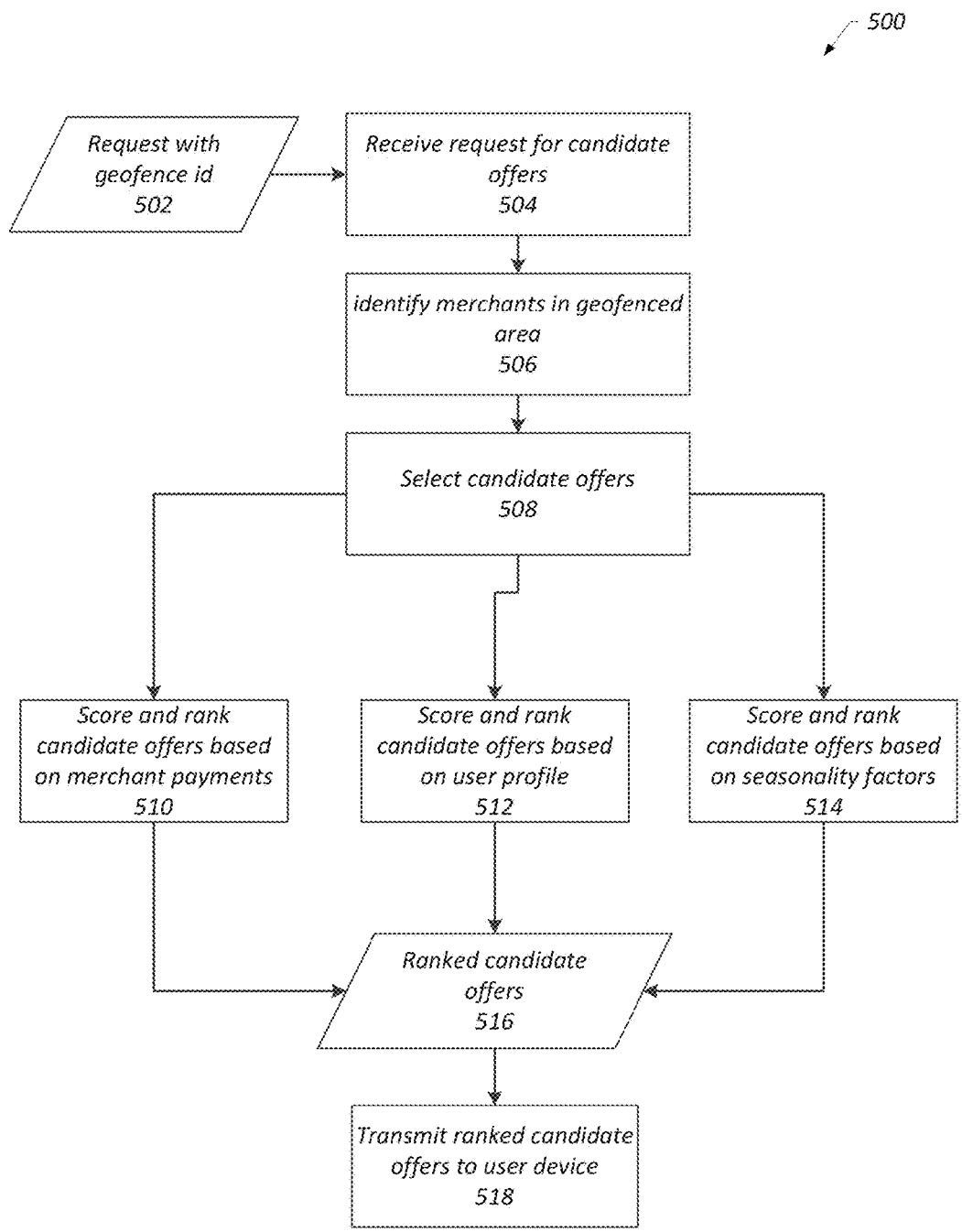
FIG. 5 is a block diagram of a process for determining candidate offers in accordance with some embodiments.

FIG. 5 depicts a process 500 for determining candidate offers in accordance with an embodiment of the present invention. The process 500 may be performed by the offers engine 12 in response to a request received from a mobile user device, e.g. mobile user device 28. Initially, a request 502 for candidate offers that has a geofence identifier is received from a mobile user device (block 504). Using the geofence identifier, merchants within the geofenced geographic area are identified (block 506). As described above, geofences stored by the offers engine 12 may be associated with additional data, such as a list of merchants. Thus, after receiving a geofence identifier, the offers engine may identify the list of merchants associated with the geofence identified by the geofence identifier. Next, candidate offers associated with the identified merchants are selected (block 508). As described above, merchant servers provided data to the offers engine 12 regarding offers, and each merchant-offer record may specify applicable terms and conditions of the offers. Thus, when selecting candidate offers, any of the applicable terms and conditions may be used as selection criteria. For example, when providing offers based on a geofenced real-world location, only in-store offers of identified merchants may be selected. Additionally, offers may include offers data about the offer, such as an image of a machine-readable code (e.g., a bar code) to enable redemption an offer.

Next, as described further below, the selected candidate offers may be scored and ranked to produce ranked candidate offers. In some embodiments, only one of the described scorings and associated rankings may be used. In other embodiments, composite scores and rankings using some or all of the described scorings and rankings may be used. Moreover, it should be appreciated that other types of scorings and rankings may be used in addition to as an alternative to the rankings described herein. Moreover, it should be appreciated that a merchant may have one or more candidate offers. In some embodiments, merchants may be sorted by alphabetical order and the candidate offers within each merchant may be ranked according to any one of or combination of the rankings described herein.

In some embodiments, the candidate offers are scored and ranked based on merchant payments for use of the offers (block 510). For example, a first merchant may pay a first payment amount for a first candidate offer, and a second merchant may pay a lower payment amount for a second candidate offer. The first candidate offer of the first merchant associated with the higher payment amount may be scored higher and ranked above the second candidate offer for the second merchant. In some embodiments, candidate offers are scored and ranked based on the likelihood of the user using the offer (block 512), as determined from a user profile associated with the user. For example, the user profile may include previously selected offers, merchants, categories, or any combination thereof, previously ranked offers, merchants, categories, or any combination thereof, and previously shared offers, merchants, categories, or any combination thereof. The user profile may also include the redemption rate of offers and statistics from other similar users. Additionally, in some embodiments the user profile may include the merchants, geofences, or combination thereof frequented by the user. For example, if a user frequents a golf store merchant, golf-related candidate offers may be ranked higher. In another example, if a user is within a geofence for a threshold time period, some candidate offers may be scored and ranked higher.

In some embodiments, the candidate offers are scored and ranked based on seasonality factors (block 514). In such embodiments, some candidate offers may be associated with specific seasons, and such candidate offers may be scored and ranked higher if the associated season matches the current season. For example, is a candidate offer is for sporting goods equipment, the candidate offer may be associated with a summer season and may be ranked higher if the current season is the summer season. Moreover, in some embodiments the candidate offers may be ranked based on time of day (e.g., at 12:00 pm for candidate offers related to lunches), day of the week (e.g., weekends for candidate offers related to weekend services or products) and so on. As mentioned above, any one of or combination of the scorings and rankings may be used to produce ranked candidate offers 516. In some embodiments, the candidate offers are scored and ranked based on their popularity, e.g., the number of users who select a candidate offer, the number of users who redeem a candidate offer, or other suitable popularity metrics. Additionally, in some embodiments curated offers (i.e., "hand-picked" offers) may be scored and ranked higher than other candidate offers. After determining the ranked candidate offers, the ranked candidate offers 516 are transmitted to the user device that send the initial request (block 518). For example, the ranked candidate offers may be transmitted from the offers engine 12 to the mobile user device 28 via the network 48.

Figure 6A:
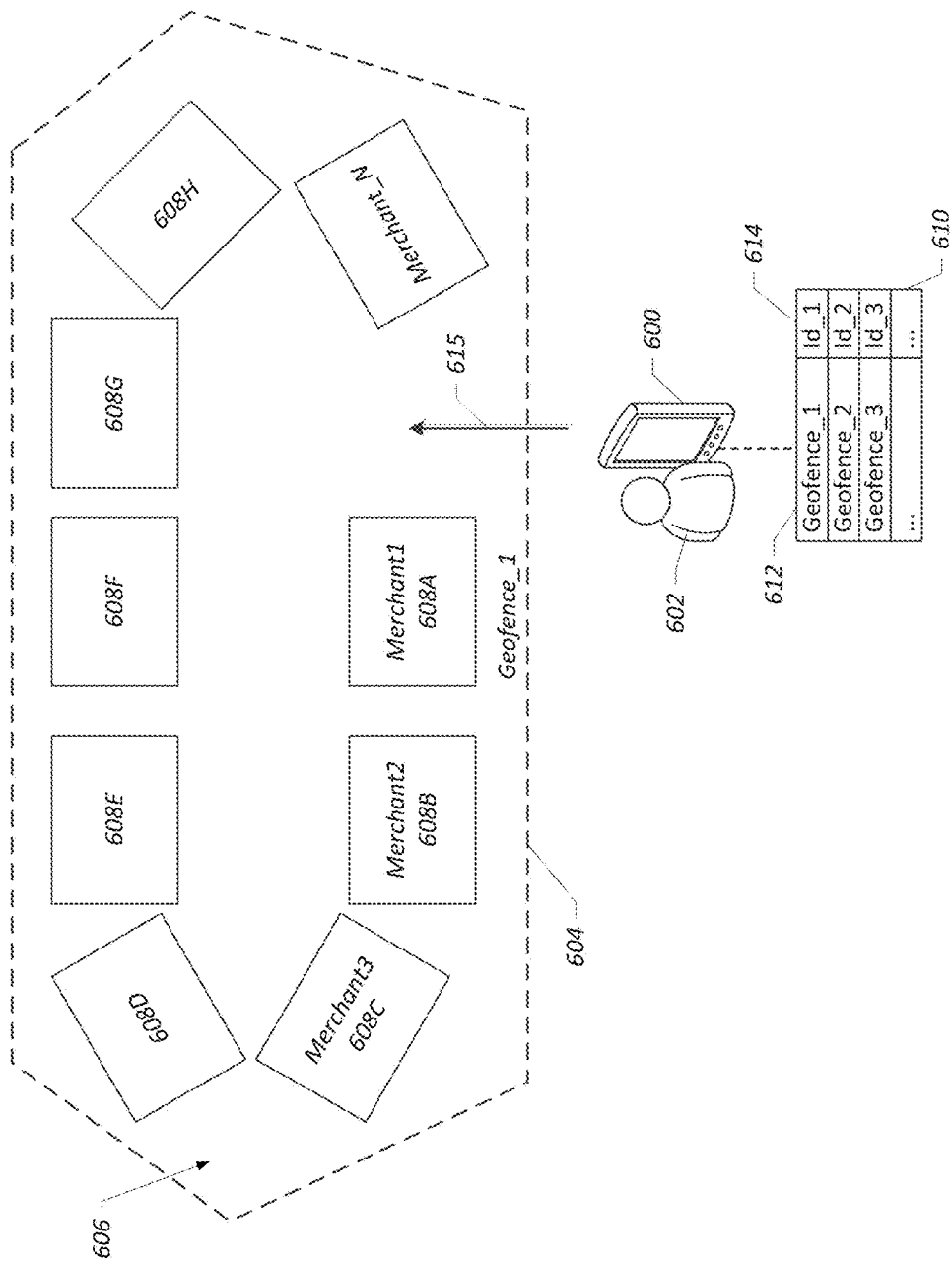
FIGS. 6A and 6B are schematic diagrams that depict a mobile user device of a user interacting with a geofence 604 that encloses a geographic area in accordance with some embodiments.
Figure 6B:
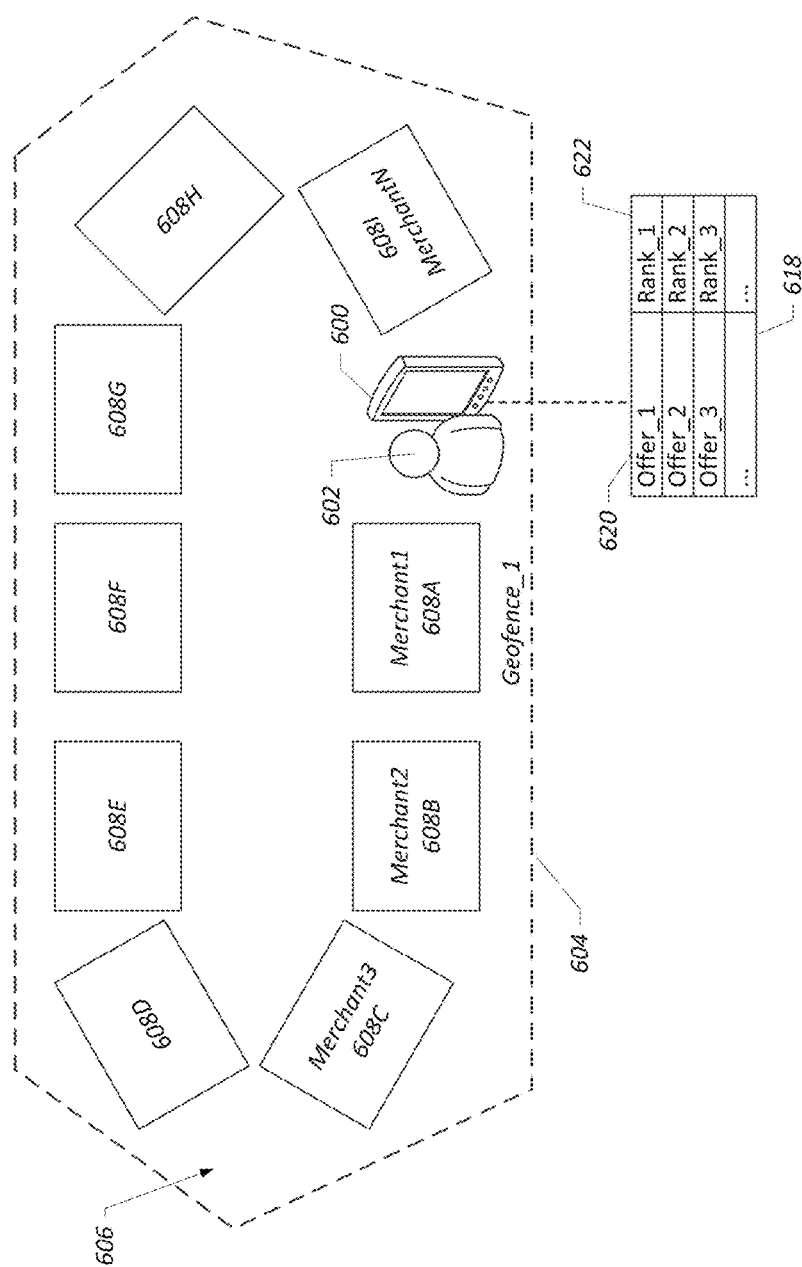

FIGS. 6A and 6B depict a mobile user device 600 of a user 602 interacting with a geofence 604 (Geofence_1) that encloses a geographic area 606 (e.g., a shopping mall) in accordance with an embodiment of the present invention. As shown in FIGS. 6A and 6B, the area 606 may include a number of retail stores 608 associated with various merchants. FIG. 6A also depicts a portion 610 of a memory of a mobile user device. As discussed above, when the mobile user device 600 is in a location, the mobile user device 600 may obtain geofences within a specific proximity of the location. The memory portion 610 may store (e.g., cache) obtained local geofence data. For example, as shown in FIG. 6A, the local geofence data may include a number of geofences 612 and associated geofence identifiers 614. The geofences 612 thus include, for example, geofence 606 (Geofence_1) and its associated identifier Id_1, Geofence_2 and its associated identifier Id_2, and Geofence_3 and its associated identifier Id_3.

Next, as shown in FIGS. 6A and 6B, the user 602 and mobile user device 600 may traverse the geofence 604 (as indicated by movement arrow 615). As mentioned above, the traversal of the geofence 604 may be detected by the mobile user device 600. After detection of the traversal of the geofence 604, candidate offers are obtained from the offers engine 12 in the manner described above. FIG. 6B depicts another memory portion 616 of the mobile user device 600 illustrating storage of the candidate offers. As shown in FIG. 6B, the memory portion 616 stores candidate offer data. The candidate offer data may include candidate offer identifiers 620 and associated offers data. As also mentioned above, the candidate offers may include rankings 622 used to rank the candidate offers. As will be appreciated, the stored geofences illustrated in FIG. 6A may remain stored on the mobile user device 602 for use after the user leaves the geofenced geographic area 606.

Figure 7A:
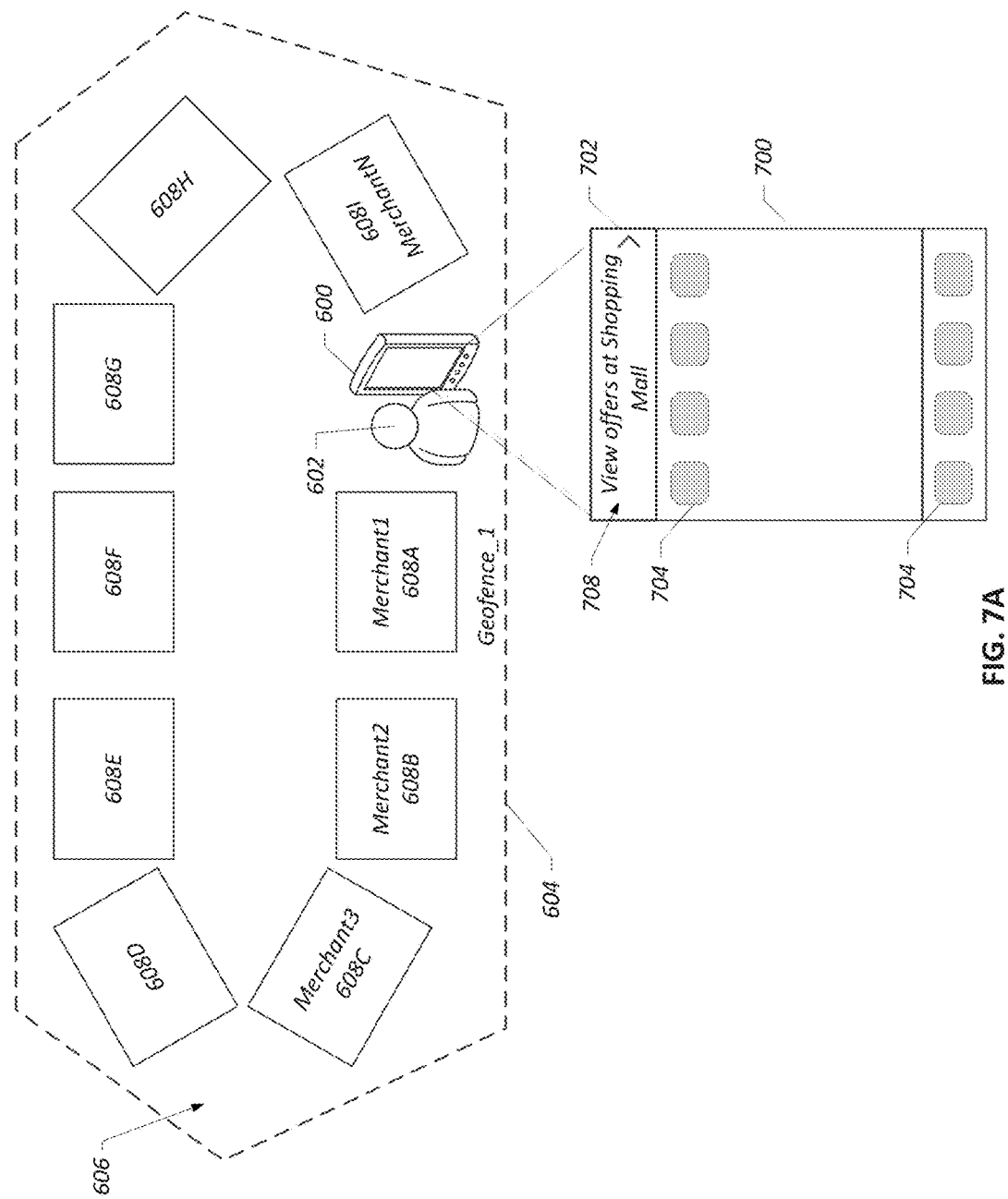

FIGS. 7A-7D depict screens of the mobile user device 600 illustrating display of the candidate offers in accordance with an embodiment of the present invention. The screens of the mobile user device 600 are described with reference to the geofence 604 and geographic area 606 described above and having stores 608 of various merchants. FIG. 7A depicts a screen 700 of the mobile user device 600, such as, for example, a home screen of a user interface. As will be appreciated, the screen 700 and other screens described below may be presented in a user interface of the mobile user device that may receive inputs from a user and provide outputs on a display. In some embodiments, the user interface may include a touchscreen, software modules, or any combination thereof. In such embodiments, inputs may be received as touches on the touchscreen, such as from a digit of a user, a stylus, etc. The screen 700 may include various user interface elements to display information to a user, and in some instances, receive user input. The screen 700 depicts a notification area 702 that displays notifications such as received text messages, received emails, application notifications, and so on. As will be appreciated, however, that the notifications described herein may be displayed in other screens of the user interface, in other areas or components of the user interface (e.g., a pop-up notification) and may be displayed independent of any particular screen or application executed by the mobile user device 600. The notification area 702 may display other information, such as status icons (e.g., battery life, network signal strength), date, time, and so on. As will be appreciated, the screen 700 also depicts user-selectable icons 704 that cause execution of various programs (e.g., application) of the mobile user device 602.

As described above, after the user 602 has traversed the geofence 604 and entered the geographic area 606, the mobile user device 600 may obtain candidate offers associated with the merchants of the retail stores 608. In some embodiments an offers notification 708 may be generated and displayed in the notification area 702 of the screen 700. As shown in FIG. 7A, the offers notification 708 may include notification text ("View offers at Shopping Mall") that may describe the availability of the candidate offers and the specific geographic area ("Shopping Mall") that the user entered when crossing the geofence 604.

Figure 7B:
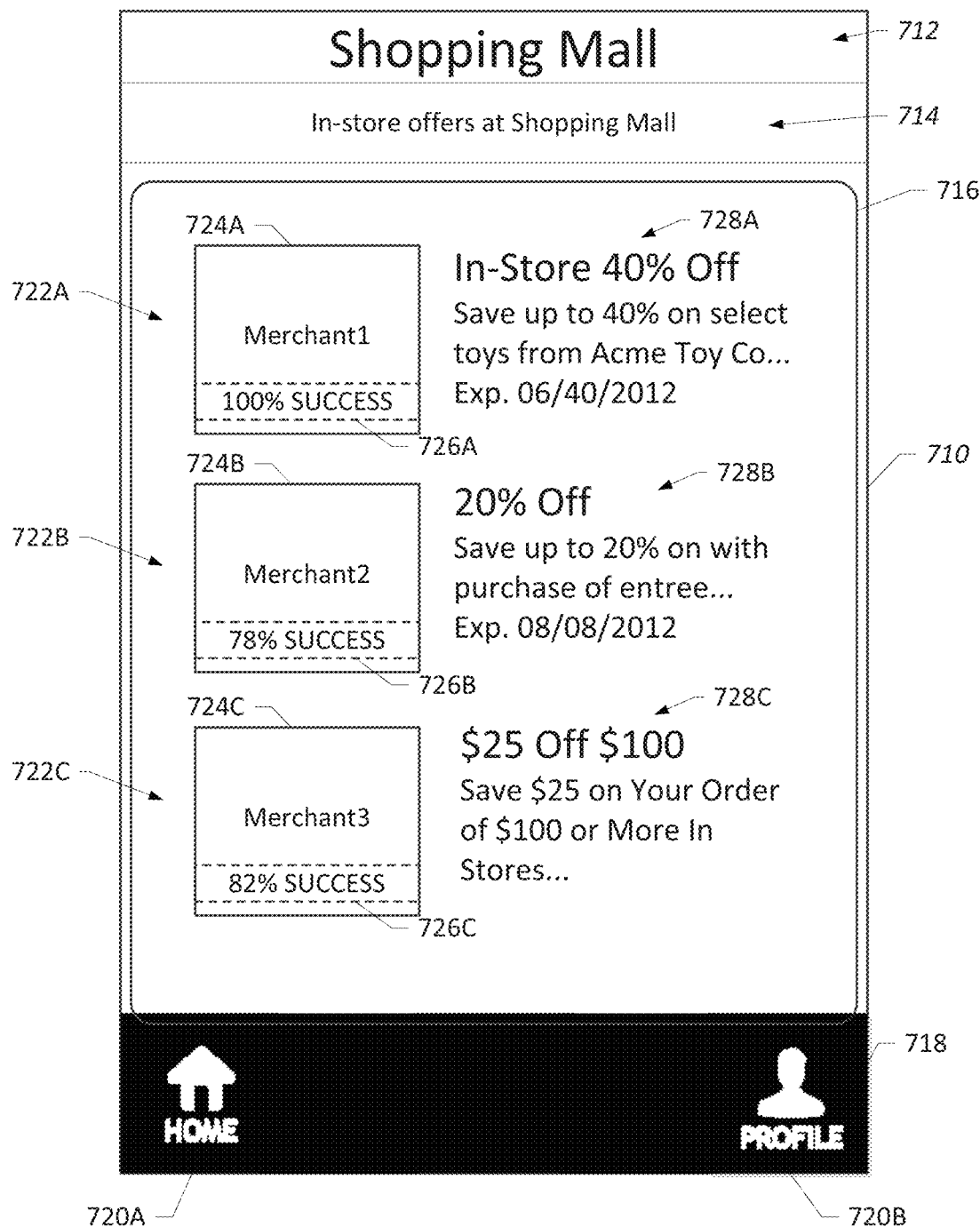

In some embodiments, the notification 708 is a user-selectable notification that enables further display of the candidate offers to the user. FIG. 7B depicts a screen 710 of the mobile user device 600 that may be displayed after a user selects the offers notification 708 described above. In some embodiments, the screen 710 may be a screen of a native application (e.g., native application 52) of the mobile user device 600.

Here again, the screen 710 may include various user interface elements to display information to a user, and in some instances, receive user input. For example, the screen 710 may include a header portion 712, a coupon type title 714, an offer display area 716, and a navigation bar 718. As shown in FIG. 7B, the header portion 712 may be located at the top portion of the screen 710 (e.g., above the coupon type title 714 and the offer display area 716). Similarly, in some embodiments the navigation bar 718 may be displayed below the offer display area 716. In other embodiments, the information in the header portion 712 may be displayed in other areas, such as a footer portion, and the navigation bar 718 may be located in other areas of the application, such as a header portion. In some embodiments, as described below, the notification 708 may consist of a specific candidate offer. In some embodiments, the notification 708 may consist of a specific candidate offer that is user selectable.

The header portion 712 may display a title indicating the contents of the screen 700 presented to the user, as selected by the coupon type title 714. For example, the header portion 712 includes the text "Shopping Mall" to indicate to a user that offers for the Shopping Mall are currently being presented. The coupon type title 714 may include text describing the type of offers displayed in the offer display area 716. For example, as the user is viewing offers for the real-world geographic area ("Shopping Mall"), the coupon type title 714 includes the text "In-store offers at Shopping Mall." The navigation bar 718 may include navigation controls, e.g., buttons 720, such as a "Home" button 720A and a "Profile" button 720B. For example, by selecting the "Home" button 720A, a user may return to a home screen of a native application. Similarly, the selection of the "Profile" button 720B enables a user to access a user profile, such as a user profile associated with the native application.

The offers display area 716 may present offers, e.g., in-store coupons 722, for viewing and selection by a user. For example, as indicated by the coupon type title 714 ("In-store offers at Shopping Mall"), the in-store coupons 714 may be coupons usable at the stores of the identified Shopping Mall. The in-store coupons 722 may include any number of coupons associated with merchants providing goods, services, or a combination thereof. As mentioned above, the in-store coupons may be ranked and presented to the user in the ranked order, as described above. In some embodiments, as mentioned above, a curated in-store coupon may be ranked higher than other in-store coupons and may thus be presented at the top of the offer display area.

Each electronic coupon 722 may be presented with information describing the coupon, such as a merchant graphic 724, a success rate banner 726, and a coupon summary 728. The merchant graphic 724 may include a text, image (e.g., a merchant logo), or combination thereof identifying the merchant associated with the coupon. The success rate banner 726 may indicate a success rate for a coupon that indicates the percentage of instances in which the coupon was successfully used. In some embodiments, for example, the success rate may be determined based on user feedback on coupon usage. The coupon summary 728 may include information about the coupon, such as the goods, services, or both associated with the coupon, the discount or other offer provided by the coupon, the expiration date, or any other suitable information or combination thereof.

For example, as shown in FIG. 7B, a first in-store coupon 722A may be presented with a merchant graphic 724A ("Merchant1") and may include a success rate banner 726A indicating the success rate of the coupon ("100% success"). The coupon 722A may be presented with a coupon summary 728A summarizing the discount provided by the coupon ("40% Off Save up to 40% on select toys from Acme Co . . . "). Additionally, the coupon summary 728A may include the expiration date of the coupon ("Exp. Jun. 4, 2012"). The other coupons 722B and 722C illustrated in FIG. 7B may include similar information, such as merchant graphic 724B, success rate banner 726B, coupon summary 728B, and so on. Additionally, the coupons 722 may include coupons for any type of offer, such as offers for discounts on goods, services or both, and free goods, services, or both. As shown in FIG. 7B, each coupon 722A corresponds to a merchant having a retail store 608 in the geographic area 606 (the identified "Shopping Mall"). For example, coupon 722A is associated with "Merchant1" of retail store 608A, coupon 722B, is associated with Merchant2 of retail store 608B, and so on. However, as will be appreciated, not all merchants in a geographic area may have candidate offers to provide to a user, and some merchants may have multiple candidate offers. In some embodiments, a user may search the in-store coupons 722, such as by keyword or merchant name, in order to identify particular subsets of the in-store coupons 72.

To use a coupon, a user may select (e.g., touch) one of the in-store coupons 722, For example, a user may select any portion of the coupon 722A, such as the merchant graphic 724A, the coupon summary 728A, etc. Upon selection of a coupon, details about the coupon may be presented to enable a user to use the coupon (i.e., redeem the coupon) with a transaction with a merchant. In some embodiments, after selecting a coupon for redemption, a bar code or machine-readable code may be displayed on a display of the mobile user device 600. The user may present the display of the mobile user device 600 to a clerk of the retail store, and the clerk may scan the bar code or other machine-readable code at the point of sale to complete redemption of the coupon.

Figure 7D:
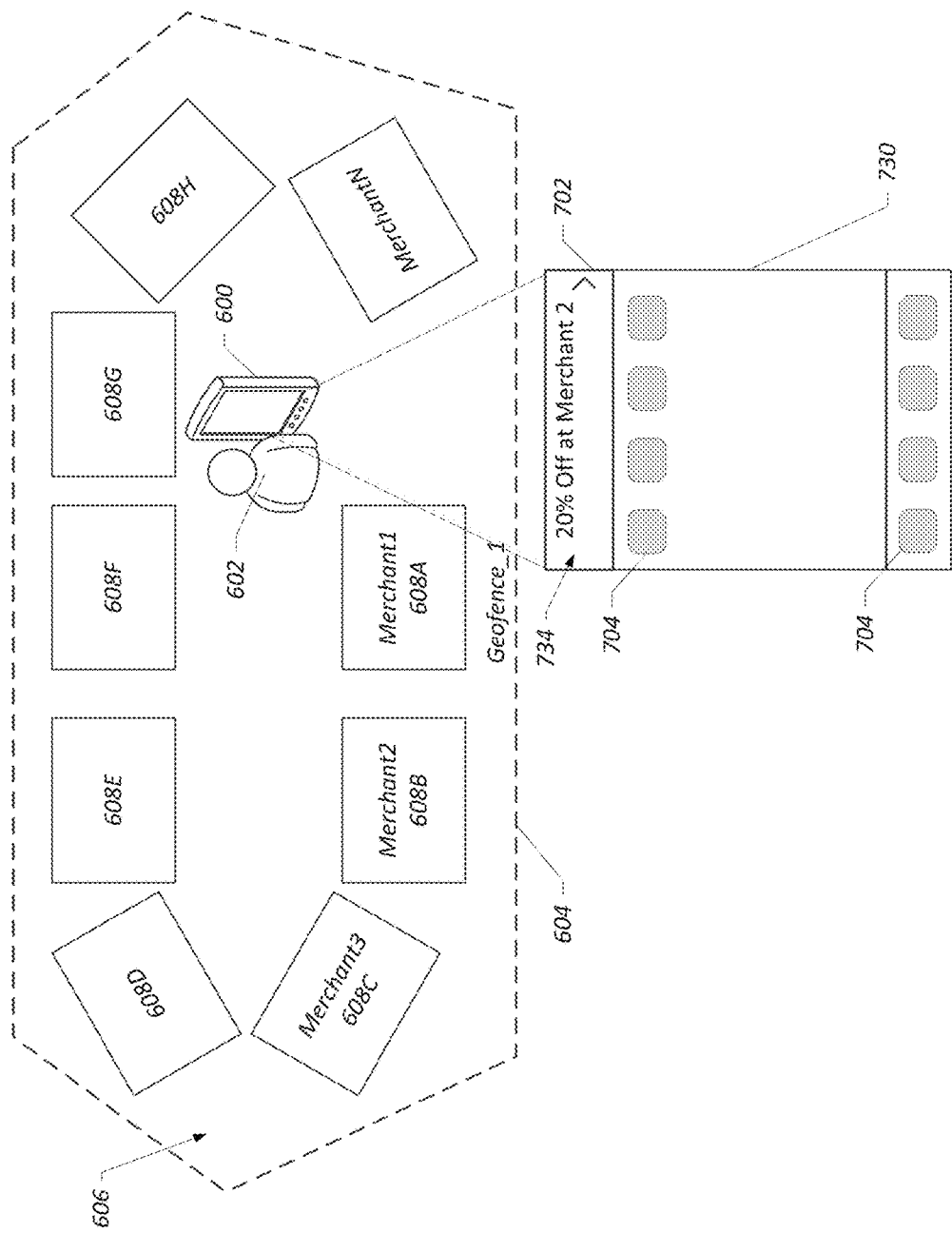

In other embodiments, an offer may be displayed directly in the notification area of a screen of a mobile user device. FIGS. 7C and 7D depict the display of offers in the notification area 702 of the mobile user device 600 in accordance with an embodiment of the present invention. FIG. 7C depicts a screen 730 of the mobile user device 600 as, for example, a home screen of a user interface. In some embodiments, after the user enters the geofenced geographic area 606, a first candidate offer 732 ("In-Store 40% at Merchant1") associated with the merchant of retail store 608A ("Merchant1") may be displayed in the notification area 702. As will be appreciated, the user interface of the mobile user device 600 may enable a user to select the candidate offer 732 from the notification area 702 to see more detail about the offer. After selecting the offer, the user may then choose to redeem the offer at the retail store 608A. As mentioned above, after selecting a coupon for redemption, a bar code or machine-readable representation may be displayed on a display of the mobile user device for presentation at the retail store 608A.

Next, as shown in FIG. 7D, as the user 602 remains in the geographic area 606, a second candidate offer 734 may be displayed in the notification area 702. The second candidate offer 734 may be displayed in response to an evaluation of the candidate offer flow criteria described above. For example, after the first candidate offer 732 has been displayed for a time period, the second candidate offer 734 may be displayed in the notification area 702. The second candidate offer 734 ("20% Off at Merchant 2") may be associated with a merchant of a second retail store 608B ("Merchant2"). Thus, as the user remains in the geographic area 606, the user may be presented with a sequence of candidate offers. As mentioned above, the candidate offers may be presented to the user 602 according to their rankings. Thus, in some embodiments, the first candidate offer 732 displayed in the notification area 702 may have a higher ranking than the second candidate offer 734 subsequently displayed in the notification area 702.

After the user 602 is no longer located in the geographic area 606, the traversal of the geofence 604 may again be detected. After the second traversal of the geofence 604 is detected, the mobile user device 600 may stop providing notifications of candidate offers. For example, the cache of candidate offers may be deleted and the candidate offer flow process may be terminated.

Figure 8:
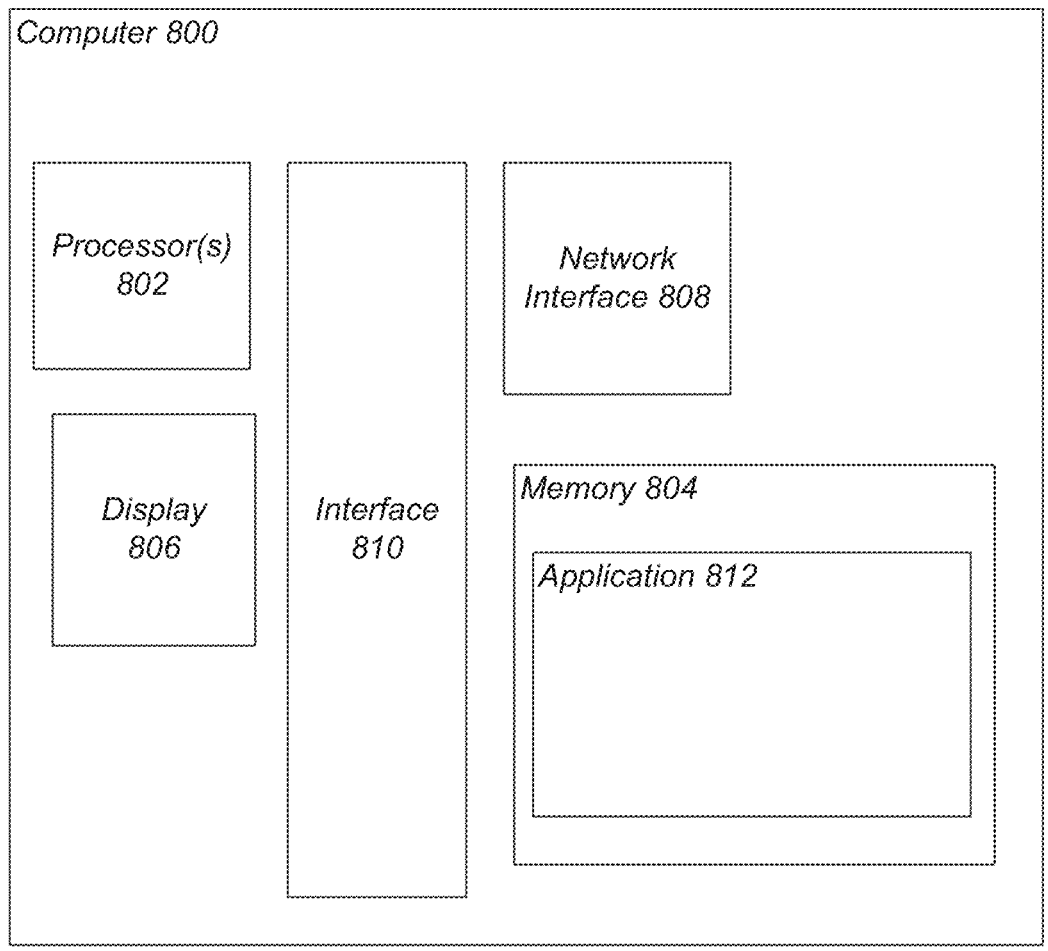
FIG. 8 is a block diagram of a computer in accordance with some embodiments.

FIG. 8 depicts of a computer 800 in accordance with an embodiment of the present invention. Various sections of systems and computer-implemented methods described herein, may include or be executed on one or more computers similar to computer 800. Further, processes and modules described herein may be executed by one or more processing systems similar to that of computer 800. The computer 800 may include various internal and external components that contribute to the function of the device and which may allow the computer 800 to function in accordance with the techniques discussed herein. It should further be noted that FIG. 8 depicts merely one example of a particular implementation and is intended to illustrate the types of components and functionalities that may be present in computer 800.

Computer 800 may include any combination of devices or software that may perform or otherwise provide for the performance of the techniques described herein. For example, computer 800 may include a tablet, a mobile phone, such as a smartphone, a video game device, and other hand-held networked computing devices, a desktop user device, a server, or other computing devices. Computer 800 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

In addition, the computer 800 may allow a user to connect to and communicate through a network (e.g., the Internet, a local area network, a wide area network, etc.) and may provide communication over a satellite-based positioning system (e.g., GPS). For example, the computer 800 may allow a user to communicate using e-mail, text messaging, instant messaging, or using other forms of electronic communication, and may allow a user to obtain the location of the device from the satellite-based positioning system, such as the location on an interactive map.

As shown in FIG. 8, the computer 800 may include a processor 802 (e.g., one or more processors) coupled to a memory 804, a display 806, and a network interface 808 via an interface 810. It should be appreciated the computer 800 may include other components not shown in FIG. 8, such as a power source (e.g., a battery), I/O ports, expansion card interfaces, hardware buttons, etc. In some embodiments, the display 806 may include a liquid crystal display (LCD) or an organic light emitting diode (OLED) display. The display 806 may display a user interface (e.g., a graphical user interface), and may also display various function and system indicators to provide feedback to a user, such as power status, call status, memory status, etc. These indicators may be in be incorporated into the user interface displayed on the display 806. In accordance with some embodiments, the display 806 may include or be provided in conjunction with touch sensitive elements through which a user may interact with the user interface. Such a touch-sensitive display may be referred to as a "touchscreen" and may also be referred to as a touch-sensitive display. In such embodiments, the display 806 may include a capacitive touchscreen, a resistive touchscreen, or any other suitable touchscreen technology.

The processor 802 may provide the processing capability required to execute the operating system, programs, user interface, and any functions of the computer 800. The processor 802 may include one or more processors that may include "general-purpose" microprocessors and special purpose microprocessors, such as one or more reduced instruction set (RISC) processors, such as those implementing the Advanced RISC Machine (ARM) instruction set. Additionally, the processor 802 may include single-core processors and multicore processors and may include graphics processors, video processors, and related chip sets. A processor may receive instructions and data from a memory (e.g., system memory 804). Processes, such as those described herein may be performed by one or more programmable processors executing computer code to perform functions by operating on input data and generating corresponding output.

The memory 804 (which may include tangible non-transitory computer readable storage mediums) may include volatile memory and non-volatile memory accessible by the processor 802 and other components of the computer 800. The memory 804 may include volatile memory, such as random access memory (RAM), and non-volatile memory, such as ROM, flash memory, a hard drive, any other suitable optical, magnetic, or solid-state storage medium, or a combination thereof. The memory 804 may store a variety of information and may be used for a variety of purposes. For example, the memory 804 may store executable code, such as the firmware for the computer 800, an operating system for the computer 800, and any other programs. The executable computer code may include instructions executable by a processor, such as processor 802, and the computer may include instructions for implementing one or more techniques described herein with regard to various processes. For example, the memory 804 may store an application 812. For example, if the computer 800 represents a user device, the application 812 may include a web browser and may enable a user to view offers, such as online coupons, and select and redeem online coupons using the user actions described above. In other embodiments, for example, the computer 800 may represent a server and the application 812 may implement some or all of steps of the process 500 described above and illustrated in FIG. 5. The executable code may be written in a programming language, including compiled or interpreted languages, or declarative or procedural language, and may be composed into a unit suitable for use in a computing environment, including as a stand-alone program, a module, a component, a subroutine. Such code program may be stored in a section of a file that holds other programs or data (e.g., one or more scripts stored in a markup language document), in a single file dedicated to the program in question, or in multiple coordinated files (e.g., files that store one or more modules, sub programs, or sections of code). Additionally, the copies of the executable code may be stored in both non-volatile and volatile memories, such as in a non-volatile memory for long-term storage and a volatile memory during execution of the code.

The interface 810 may include multiple interfaces and may couple various components of the computer 800 to the processor 802 and memory 804. In some embodiments, the interface 810, the processor 802, memory 804, and one or more other components of the computer 800 may be implemented on a single chip, such as a system-on-a-chip (SOC). In other embodiments, these components, their functionalities, or both may be implemented on separate chips. The interface 810 may be configured to coordinate I/O traffic between processor 802, memory 804, network interface 806, and other internal and external components of the computer 800. The interface 810 may include functionality for interfacing via various types of peripheral buses, such as a variant of the Peripheral Component Interconnect (PCI) bus standard, the Universal Serial Bus (USB) standard, and the like.

The computer 800 depicted in FIG. 8 also includes a network interface 808, such as a wired network interface, wireless (e.g., radio frequency) receivers, etc. For example, the network interface 808 may receive and send electromagnetic signals and communicate with communications networks and other communications devices via the electromagnetic signals. The network interface 808 may include known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The network interface 804 may communicate with networks, such as the Internet, an intranet, a cellular telephone network, a wireless local area network (LAN), a metropolitan area network (MAN), or other devices by wireless communication. The network interface 808 may suitable any suitable communications standard, protocol and technology, including Ethernet, Global System for Mobile Communications (GSM), Enhanced Data GSM Environment (EDGE), a 4G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11a, IEEE 802.11b, IEEE 802.11g or IEEE 802.11n), voice over Internet Protocol (VoIP), Wi-MAX, a protocol for email (e.g., Internet message access protocol (IMAP) or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), Short Message Service (SMS), or any other suitable communication protocol.

Those skilled in the art will also appreciate that, while various items are illustrated as being stored in memory or on storage while being used, these items or sections of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-readable medium or a portable article to be read by an appropriate drive, various examples of which are described above. In some embodiments, instructions stored on a computer-readable medium separate from computer 800 may be transmitted to computer 800 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc.

Figure 9:
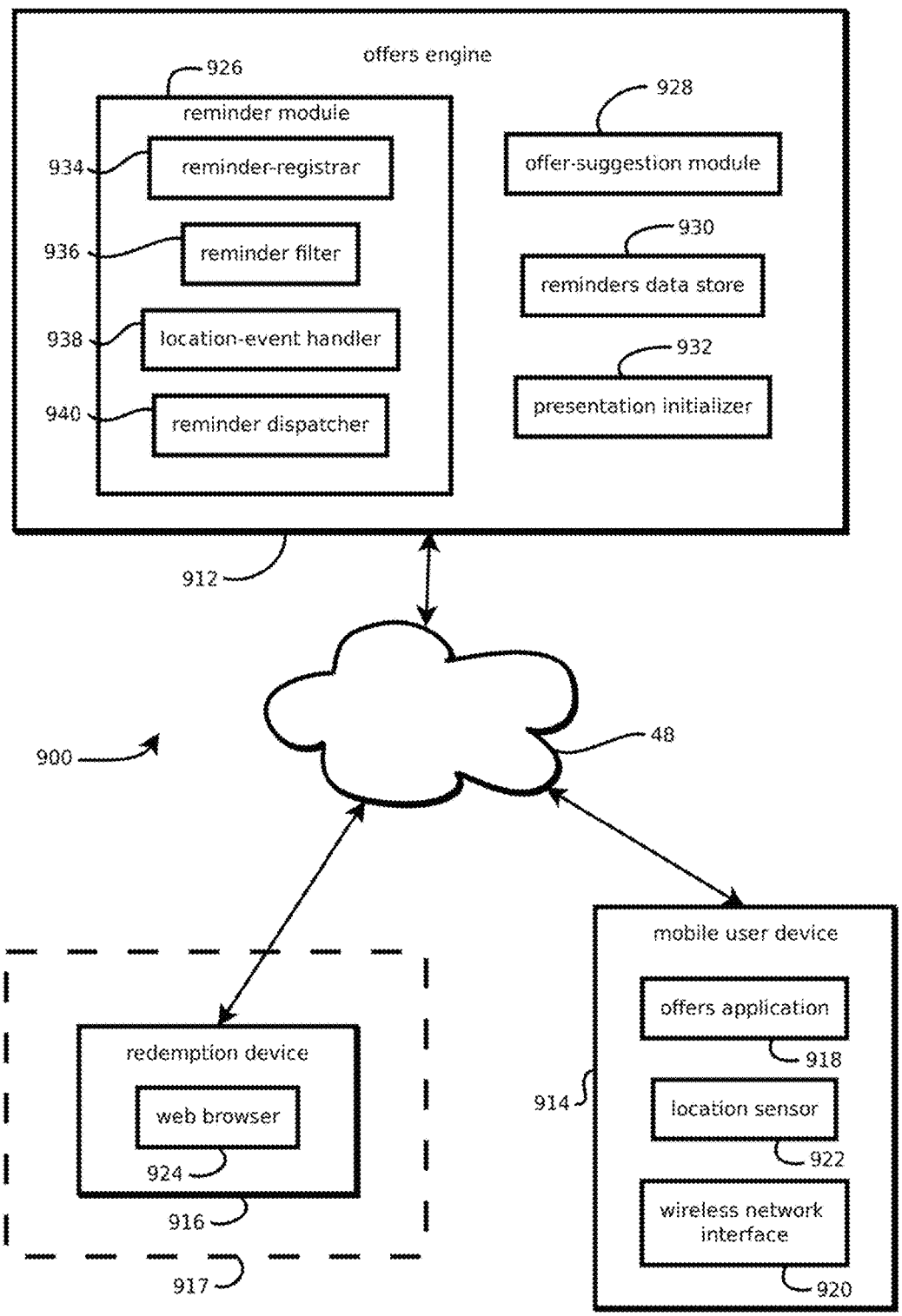
FIG. 9 is an example of an offer-discovery system operative to remind users of offers in accordance with some embodiments.

FIG. 9 shows an example of an offer-discovery system 900 that, in some embodiments, may remind users to redeem offers on a particular device or near a particular geographic location, e.g., when near a device or location at which redemption is more convenient or is permissible, after such a reminder is requested on another device or at another location. The broad applicability of the present technique is illustrated by the following exemplary use-cases which are described in greater detail with reference to subsequent figures:

a) In some cases, users of the offer-discovery system 900 may browse offers on their cell phone (or other mobile device) using techniques like those described above and, when the user discovers an offer for which they wish to be reminded, the user may request such a reminder with the mobile device. Some embodiments detect, with the user's mobile device, when the user is near their home, for example, based on geolocation or the presence of a home wireless network, and in response, remind the user to use the offer, for instance, by vibrating the cell phone or presenting some other alert. Further, some embodiments convey reminders from one user to others (or themselves) of offers when those other users are in an appropriate location to use the offer, for example, near a store at which the offer is redeemable, using similar techniques for determining location.

b) In another example, a user may discover an in-store offer on a publisher's website or native mobile application and save the offer to their user profile. The saved offer may then be cached on the user's mobile device, and a native mobile application on the mobile device may alert the user of the saved offer when the user crosses a geofence (or receives wireless networking signals) associated with a merchant's physical site where the offer is redeemable.

c) In some cases, after a reminder is requested, the reminder recipient may be reminded of the offer when the recipient, using a different computer, logs in to an account for viewing offers, such as on a webpage or native mobile application operative to display offers hosted by the offer-discovery system 900.

d) Some embodiments may cache reminders on a computing device executing a native application for viewing offers. For instance, after a reminder is requested on a mobile device, a native application executing on a different device (e.g., a tablet computer at home) may periodically poll other components of the offer-discovery system 900 for pending reminders and present responsive reminders after a user begins interacting with the computing device, e.g., when a user wakes their tablet computer from a sleep state.

e) In some cases, reminders are conveyed between a mobile device and a redemption device, such as a desktop computer, directly, such as via a Bluetooth™ pairing (or similar wireless protocol for computing-device-to-computing-device direct communication), near-field communication, or WiFi Direct™ (or similar wireless protocol for computing-device-to-computing-device direct communication). A user may request a reminder on their mobile device, and the mobile device may convey the reminder to a native offers application executing on a desktop computer when the mobile device comes in wireless range of the desktop computer, which may then present the reminder or present an interface for redeeming the offer based on the reminder request.

f) Some embodiments may distribute the functions of discovering offers, determining that the user is near a location for redeeming the offer (e.g., at home, at work, or at a particular store), reminding the user of the offer, and redeeming the offer among separate computing devices: for example, a user may discover the offer and request a reminder using their cell phone; an application executing on a user's wireless router may detect that the user's cell phone medium-access control (MAC) address is present on the home wireless network to determine that the user is home; the router may instruct a gaming console to display a reminder of the offer to the user on the user's television; and the user may then redeem the offer on a desktop computer with a webpage that is initialized to display the offer for which a reminder was presented based on a shared public Internet Protocol (IP) address of the computing devices in the home network. In other examples, each of these functions may be grouped or distributed among a variety of different types of devices with which consumers interact, including in-dash computers of automobiles; wearable computing devices like smart watches and head-mounted displays; smart home appliances like networked refrigerators and home automation equipment with embedded computers, like networked thermostats; entertainment devices, like set-top boxes, gaming consoles, optical media players; and general purpose computing devices, like smart phones, tablet computers, laptop computers, and desktop computers. In some cases, some of the functions are performed by computing devices operated by different entities, for instance, a user may discover or be reminded of an offer on a public kiosk computer provided by a merchant (like a consumer-facing tablet computer at a point of sale or near merchandise), or one user may discover an offer and request that another user, for example a family member, be reminded of the offer on that other user's mobile device.

These and other examples are described in greater detail with reference to FIGS. 9-19.

The illustrated offer-discovery system 900, in some embodiments, may include an offers engine 912, a mobile user device 914, and a redemption device 916 within a geofence 917. The offers engine 900, in some cases, may include some or all of the features of the offers engine 12 described above with reference to FIG. 1. Some embodiments of the offers engine 900 may publish offers to consumers, such as a consumer operating the mobile user device 914, for instance, within a mobile webpage for viewing offers or a special-purpose native application for viewing offers executing on the mobile user device 914. Examples of displays having an interface by which the user views offers are described below with reference to FIGS. 10 and 11. In some cases, upon viewing an offer, the user may request a reminder for the offer using the interface of FIG. 11. That reminder may be implemented on the mobile user device 914, for example, by native application 918 determining that the mobile user device 914 has crossed geofence 917 based on a location sensor 922 of the mobile user device 914, or (i.e. and/or) the reminder request may be communicated to the offers engine 912 over the Internet 48, which may coordinate reminders and location sensing by the mobile user device 914 or other devices.

Upon the user crossing the geofence 917, or entering a broadcast region of a local wireless network on which the redemption device 916 is resident, the user may be presented with the requested reminder, for example, with haptic feedback (e.g. vibrating) from the mobile user device 914, an audible alert (like a beep on the mobile user device 914), a visual indication on the mobile user device 914 (like an alert message text on a lock screen or in a header portion of a home screen of the user device 914), or on some other device.

Upon being reminded, the user may choose to interact with the redemption device 916, which may be, for example, their home desktop of laptop computer, to redeem the offer, in which case some embodiments of the offers engine 912 send the redemption device instructions to present an interface for redeeming the offer (e.g., a webpage for the offer with a description of the offer, a coupon code, and hyperlinks to an affiliate network that redirect the consumer to the merchant's website). Thus, in this use case, the user may be reminded of the offer when near their home computer, and the user may redeem the offer using, for instance, a larger screen and physical keyboard of a desktop computer. Embodiments, however, are not limited to this use case, and a variety of other use cases are envisioned, as described below.

In some embodiments, the mobile user device 914 may be a hand-held mobile device having a portable power supply, such as a lithium-ion battery. The mobile user device 914 may be a cell phone, tablet computer, smart watch, or other wearable computing device by which the user views offers from the offers engine 912 and request reminders of those offers. The mobile user device 914 may include memory and a processor executing an operating system, examples of which are described above with reference to FIG. 8. The mobile user device 914 may further include a wireless network interface 920, such as one or more of a cellular radio, a wireless local area network interface, a personal area network interface (like an interface for Bluetooth™ or near field communication networking), or combinations thereof. In this example, the mobile user device 914 executes a special-purpose native offers application 918, such as a native application hosted by a maker of mobile user devices and preapproved by that provider as meeting various security requirements (e.g., in an app store). Embodiments are described below with reference to the native offers application 918, but in some cases, the interactions described may be implemented in a web browser executing on the mobile user device with mobile webpages.

The mobile user device 914 may further include a location sensor 922, which may be polled by the offers application 918 to determine the geographic location of the mobile user device 914. Locations may be determined based on the current wireless environment of the mobile user device 914, for example, based on signals from a satellite navigation system (like the Global Positioning System, GLONASS, or GNSS systems), with cell tower triangulation based on the identity of cell towers, based on identifiers of local area networks within range, or by sending information about the current wireless environment over the Internet 48 to a remote server that determines location based on attributes of the current wireless environment.

In some cases, the mobile user device 914 is not as well-suited for redeeming an offer as the redemption device 916. For example, the redemption device 916 may have a larger display and a larger set of user interfaces, for example, a physical keyboard and a mouse, that are absent from the mobile user device 914. In some cases, the redemption device 916 is a home desktop or laptop computer of the user of the mobile user device 914. Or in some cases, the redemption device 916 is some other device selected by the user for redeeming offers, such as a tablet computer, a set-top box connected to a television, like a gaming console. In some cases, the redemption device is a device having a display screen larger than 6 inches diagonally to facilitate user-friendly redemptions of offers, though embodiments are not limited to this size range, as some consumers may wish to use devices with smaller screens to redeem offers.

Like the mobile user device 914, the redemption device 916 may include memory and a processor executing an operating system, such as those described above with reference to FIG. 8. In some cases, the redemption device 916 is a home desktop computer without a portable power supply. In this example, the redemption device 916 executes a web browser 924 by which a user may redeem offers after being reminded of those offers. For example, users may be reminded of offers on the mobile user device 914, and in response, a user may request a webpage for offers from the offers engine 912 using the web browser 924. In some cases, the offers engine 912 returns a webpage that is initialized to present the offer for which a reminder was presented to the user, as described below.

In some embodiments, the redemption device 916 is disposed within a geofence 917. The geofence 917 may be a virtual, computer-recognized perimeter corresponding to a real-world geographic area. In some cases, the geofence 917 is associated with the user of the mobile device 914, for example, in a user profile accessible by the offers engine 912, or the geofence 917 may be stored locally on the mobile user device 914 to enhance privacy. The geofence 917 may be a geofence around a home address of the user, which may be provided by the user in a sign-up webpage (or other interface) for creating a user profile.

In some embodiments, the offers application 918 may accumulate a location history of the user and infer a home address or work address of the user based on cluster analysis of locations and time of day of those locations, for instance, based on the user being within a threshold radius of a location more than a threshold amount of time for more than a threshold number of days of the week. Clusters corresponding to daytime locations may be inferred to be work locations, and clusters corresponding to nighttime locations may be inferred to be home locations. In some cases, users are associated with multiple locations, for example a work location and a home location, or multiple instances of such locations, like alternate office locations. The geofence may be a predetermined threshold distance around one of the locations, for example, a geofence around the user's home geolocation or a geofence around the user's work geolocation. In some cases, the offers engine 912 selects among multiple candidate geolocations based on user interactions with the redemption device 916, for example, the work geolocation may be selected over the home geolocation in response to webpage requests from the redemption device 916 while the location sensor 922 indicates to the offers application 918 that the user is at or near the work geolocation. Some embodiments of the offers engine 912 or offers application 918 may infer these geofences and present them in a menu to a user to customize the user's profile. Some embodiments may present user-profile configuration interfaces with options by which users opt in or opt out of collection of geolocation data. In some cases, the size of the geofence 917 is selected based on the accuracy with which geolocations are sensed with an eye towards trade-offs between false positives and false negatives of determining the user is at a location. In one example, the size of the geofence 917 is smaller than or approximately equal to a 500-meter radius around the user's home geolocation.

In some cases, the geofence 917 is specified by a bounding polygon, or center point and radius, that is stored in memory accessible to the offers application 918, and the offers application 918 periodically (or in response to exceeding a threshold change in position, such as in response to changing cellular towers) polls the location sensor 922 to determine whether the mobile user device 914 is within the geofence 917. Upon determining that the mobile user device 914 is within the geofence 917, embodiments of the offers application may retrieve from memory a previously requested reminder or send a request for such reminders to the offers engine 912. Responsive reminders may be presented to the user, for example, by vibrating the mobile user device, displaying a reminder on a lock screen of the mobile user device, displaying a reminder in a header notification bar of an operating system of the mobile user device, or sending an indication to the offers engine 912 or another device that the location criterion of a reminder is satisfied, so that other devices may effectuate the reminder.

Alternatively, or additionally, some embodiments may detect the location of the mobile user device 914 based on the presence of a wireless area network associated with the redemption device 916 or a location at which the user otherwise wishes to be reminded of an offer. For example, the offers application 918 may periodically poll the wireless network interface 920 and determine whether the wireless network interface is receiving signals, such as IEEE 802.11 wireless beacons or Bluetooth™ beacons, from a wireless network associated with the redemption device 916, for example, by comparing a home wireless network SSID (short service set identifier) designated in memory of the offers application 918 with a list of SSIDs of networks currently in range and as detected by the wireless interface 920; device IDs of transmitters associated with the user's home or the redemption device 916, like Bluetooth™ device identifiers; or near-field communication device identifiers associated with the user's home, such as an identifier of a smart lock (e.g., the Locktron™ mobile-device controllable lock from Apigy of Mounterview, Calif.) at the user's home. In response to determining that criteria indicating the user is home (or is at work, or at a merchant's site, if such a location is relevant to the reminder request) have been met, the offers application 918 may effectuate steps described herein as being responsive to crossing the geofence 917.

The components of the offer-discovery system 900 may communicate with one another via the Internet 48 and various other networks, examples of which are described above. Further, components of the offer-discovery system 900 may be geographically distributed, for example, in different states or countries.

As noted above, the offers engine 912 may include the attributes and features of the above described offers engine 12 of FIG. 1, though many of those features are not illustrated in FIG. 9 to highlight components relating to reminders of offers. In this example, the offers engine 912 may include a reminder module 926, an offer-suggestion module 928, a reminders data store 930, and a presentation initializer 932. These components are illustrated as discrete functional blocks, but it should be understood that hardware or software by which this functionality is provided may be subdivided, conjoined, intermingled, co-located, distributed, or otherwise differently arranged. Further, to accommodate relatively large numbers of users (for instance, in the hundreds of thousands or millions) and relatively large numbers of offers (for instance, in the thousands or tens of thousands), some embodiments may include multiple instances of some components and load balancers to balance computing loads there-between, as well as content delivery networks to deliver resources used in the presentation of offers from geographically distributed locations likely to be closer to end-users. In some embodiments, the reminder module 926 may manage the creation and execution of reminders, the offer-suggestion module 928 may suggest alternate offers to users based on offers for which reminders were requested, the reminders data store 930 may store information about reminder requests, and the presentation initializer 932 may initialize the presentation of webpages or state of offers applications on redemption devices after the presentation of a reminder to display the offer for which a reminder was presented, including reminders presented on another device. In some cases some or all of these components may be instantiated on the mobile user device 914, for example, as part of the offers application 918, or some components may be instantiated on the redemption device 916 or other computing device.

In this example, the reminder module 926 includes a reminder registrar 934, a reminder filter 936, a location-event handler 938, and a reminder dispatcher 940. The reminder registrar 934, in some embodiments, may create new reminder records in the reminder data store 930, examples of which are described below, in response to requests from the mobile user device 914 or other devices for such a reminder.

Figure 11:
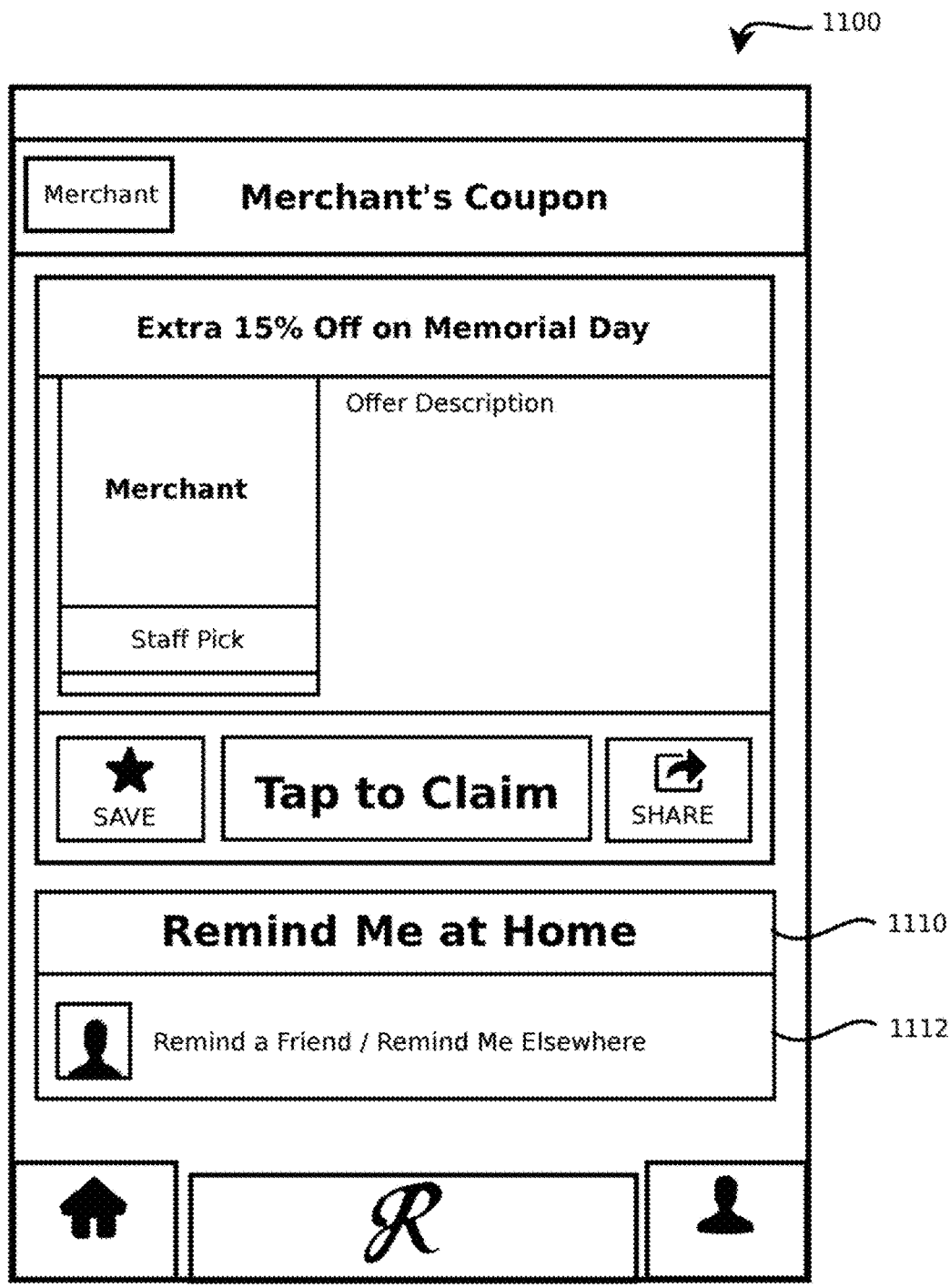

For example, the reminder registrar 934 may parse reminder parameters from reminder requests sent by the offers application 918 in response to a user requesting a reminder using the interface of FIG. 11 to create a corresponding reminder record. In some cases, this request is encoded in a transport protocol (e.g., hypertext transport protocol or SPDY) GET or POST command, or the request may be encoded in accordance with an API supported by the API server 16 described above with reference to FIG. 1, which may support a command to create a reminder. In some cases, the reminder registrar 934 may send the mobile user device 914 instructions to display a reminder configuration interface by which the user further configures reminders, for example, by selecting the recipient of a reminder from among a social network of the user, by selecting among reminders for alternate offers identified by the offer suggestion module 928, by selecting reminder time periods (e.g., by specifying that a reminder should be presented later than a first threshold time and before a second threshold time, or only during certain days of the week or times of year, or in response to the weather changing in a geographic area associated with the user, such as more than a threshold chance of rain or above or below a threshold temperature), by selecting a context in which the user wishes to be reminded (e.g., by specifying a home or work geolocation or a geolocation associated with the merchant issuing the offer), and in some cases, by providing a message to the reminder recipient (e.g., a text, audio, image, or video message, such as "please use this store-wide 20% off coupon to purchase vanilla ice cream") to be presented with the reminder. The reminder registrar 934 may receive responsive data from the mobile user device 914 (or other devices) and augment the created reminder record. Or some embodiments may create a default reminder record specific to the user's home and an offer identified in the request, without soliciting further information from users, which is not to suggest that other features described herein may not also be omitted in some embodiments.

In some cases, users may inadvertently request reminders for offers that expire before the reminder is presented. The reminder filter 936, in some embodiments, may filter reminders according to whether the offer has expired, has less than a threshold user rating based on historical feedback on the offer from other users (e.g., aggregate statistics of up-votes or down-votes, or a zero to four star rating), or has otherwise changed. For example, the reminder filter 936 may periodically (e.g., daily or hourly) query the reminder data store 930 for pending reminders for which a reminder will potentially be sent in the future and compare the current date to an expiration date of an offer associated with the reminder. Upon determining that an offer associated with the reminder has expired, or has a user rating below a threshold, some embodiments of the reminder filter 936 may flag the reminder record as relating to an expired or low-quality offer, thereby causing some embodiments of the offers engine 912 and mobile user device 914 to not present a reminder of the offer or suggest another offer. In some cases, the reminder filter 936 may be configured to determine that an offer is set to expire within some threshold time in the future, for example, within the next day or week, and a reminder may be sent to the operator of the mobile user device 914 (or other reminder recipient) regardless of whether the recipient is within the geofence 917.

In some embodiments, the location-event handler 938 determines whether any reminders are pending for a geographic location when (e.g., in response to) a user enters the geographic location specified in a reminder record, e.g., an area specified by a geofence. In some embodiments, the offers application 918 on mobile user device 914 determines that the user has entered the geofence 917 (which may include becoming in-range of a wireless network that is not necessarily defined by known geographic coordinates specifying a perimeter), and in response, the offers application 918 may send a reminder request to the offers engine 912 indicating the geofence 917 that was entered, for instance, whether the user entered the geofence for their home, their work, or a merchant. In some cases, a plurality of geofence descriptions (e.g., polygons or GPS coordinates and radius along with corresponding identifiers, or wireless network or device identifiers) are stored on the mobile user device 914 for determining when to submit such a request for reminders by the application 918. The request for reminders may be received by the location-event handler 938, which may query the reminders data store 930 for pending reminder records corresponding to the location of the geofence in the request. Upon (e.g., in response to) determining that responsive reminder records are pending (e.g., the records pertain to offers that have not expired, the records pertain to the geographic location specified in the request, and a reminder has not been sent or has not been sent more frequently or often than specified), the location-event handler 938 may cause the reminder dispatcher 940 to send a command to the mobile user device 914 for the offers application 918 to present the reminder. Presenting the reminder may include vibrating the mobile user device 914, displaying data indicative of the offer on a display of the mobile user device 914, or presenting an audible signal, among other options. Or in some cases, the mobile user device 914 may be instructed to convey a reminder to another device by bypassing the offers engine 912, for example, via a local area network, WiFi Direct™, or a personal area network (such as via Bluetooth™ or near field communication) to another device to present reminder, for instance, on the redemption device 916.

In some cases, the location-event handler 938 may update the corresponding reminder record upon the command being sent with, for instance, a Boolean value indicating that the reminder has been sent, a timestamp indicating a time at which reminder was sent, or incrementing or decrementing a counter of a number of reminders sent. Some embodiments of the location-event handler 938 may throttle reminders sent to a given mobile user device 914 to budget the user's attention and avoid annoying the user with excessive reminders in a short duration. Or in embodiments where reminders are presented potentially on multiple computing devices to the same recipient, presentation across multiple devices may be similarly throttled. To this end, some embodiments may update records in a user profile of the reminder recipient to indicate that a reminder was sent and the time at which the reminder was sent. In some embodiments, the location-event handler 938 queries these records before sending a reminder to determine whether to delay the reminder because the user has recently received more than a threshold amount of reminders or reminders at greater than a threshold rate within some trailing duration. In some cases, upon determining that a user is at the geographic location, some embodiments may add the reminder to a first-in-first-out buffer of pending reminders from which the location-event handler pulls reminders at a predetermined rate (e.g., one every 15 minutes) to be sent to the reminder recipient to avoid annoying recipients with excessive alerts. In some cases, the location-event handler 938 is configured to bundle reminders, such that reminders for multiple offers, which may be requested through multiple interactions at different times, are sent to the reminder recipient and presented with a single alert.

In some embodiments, the location-event handler 938 may be instantiated on the mobile user device 914 as part of the offers application 918, and relevant reminders may be stored locally. In these embodiments, reminders from third parties may be pushed to the offers application 918 or pulled from the offers engine 912 by the offers application 918 making API requests for such transactions.

The reminder dispatcher 940, in some embodiments, may be operative to send reminders to the appropriate device for a reminder recipient. In some cases, the reminder dispatcher 940 receives instructions from the location-event handler 938 indicating that a reminder is to be sent and identifying the reminder recipient. In response, the reminder dispatcher 940 may retrieve a user profile to identify a network address of a reminder recipient device, for example, an IP address of the mobile user device 914, or a device or account identifier of the mobile user device 914 (e.g., a cell phone number for sending a text message conveying the reminder). Or the reminder dispatcher 940 may determine based on the user profile of the recipient that the user or the reminder request designates a different device.

Examples of devices with which a reminder may be presented include various networked devices likely to be in the presence of the reminder recipient and capable of conveying information through a user interface, including an in-dash vehicle navigation system, a networked television, an Internet-enabled set-top box like a gaming console connected to a television, an optical media player connected to the Internet, a smart-appliance (like an Internet-enabled refrigerator), home-automation equipment (such as an Internet-enabled thermostat), or a wearable computing device (such as a smart watch or head-mounted display). Embodiments may send reminders by pushing those reminders to a designated IP address or other network address (e.g., a phone number), or in some embodiments, reminders may be pulled from the offers engine 912 by a reminder recipient's computing device executing a special-purpose native application that periodically queries the offers engine 912 for reminders to be presented to the reminder recipient. In some cases, requests for reminders may include a device identifier or account identifier by which the reminder recipient or device is identified to the offers engine, such that corresponding reminders can be identified by the reminder dispatcher 940 and returned.

The content of the reminder may include instructions to a computing device of the recipient to present a visual, audible, or haptic alert. In some cases, the content includes a summary of the offer and an indication of who requested the reminder and when the reminder was requested. Presenting a summary of an offer does not require that all terms of the offer be presented in a single display, such that the offer can, with only the summary, be accepted. Rather, presenting a summary of an offer may include describing some terms and, in some cases, providing a hyperlink to a fuller description of the offer.

In some embodiments, the offers engine 912 may further include an offer-suggestion module 928 configured to suggest offers to reminder recipients, e.g., based on offers in requested reminders, a user's profile, or a combination thereof. For example, a user may request a reminder for a given offer on a given good or service with a given discount off of a base price, and the offer-suggestion module 928 may determine that another offer has a greater discount than the given offer and identify the other offer as a suggestion in the reminder. Or embodiments may determine that another offer is better or is likely to be attractive to the reminder recipient based on other criteria, such as a later expiration date, a product with better specifications, or an offer with otherwise more favorable terms.

In some cases, the offer-suggestion module 928 may store in memory a taxonomy of products or services to which offers pertain and a weighted, directed product-or-service graph with edges indicative of the degree to which products or services are substitutes for one another and other edges indicative of the degree to which products or services are complements for one another. Upon determining that the reminder request has been received, the offer-suggestion module 928 may query the taxonomy to identify the type of the product or service to which the offer pertains and the weighted, directed graph to identify other products or services that are likely to be substitutes or complements to the product or service of an offer for which a reminder was requested. In some cases, upon determining that a weighted edge of the graph exceeds a threshold for a complement or for a substitute, embodiments may query the offers data store 60 of FIG. 1 for additional offers for that product or service of the adjacent node, and those offers may be bundled with the reminder or sent instead of the reminder upon determining that the offer for which the reminder was requested has expired.

Weightings for edges of the graph for complements may be determined empirically, for example, based on merchant feedback from redeemed offers indicative of products or services that were purchased together. Counts of purchase pairs may be incremented and normalized based on the total number of purchases, and the normalized values may be used as edges of the weighted directed graph for identifying offers to be suggested as complements. Similarly, weightings for edges of a graph relating to substitutes may be determined empirically based on pairs of user interactions with offers for different items where the user ultimately purchases only one of the items in the pair, for example, as often occurs during comparison-shopping where users may click-through on offers for competing products before ultimately purchasing one of the two competing products.

Upon identifying an offer to be suggested with a requested reminder, the offer-suggestion module 928 may update a reminder record corresponding to the reminder at issue to include instructions to alert the reminder recipient of the suggested offer. In some cases, a determination to suggest offers is made based on a weighted score based on (e.g., a weighted sum) the degree to which one offer has a greater discount than the other, the degree to which a good or service is a complement, and the degree to which a good or service is a substitute. Some embodiments may determine whether the weighted score exceeds a threshold before making a suggestion, and weightings and the thresholds may be dynamically adjusted based on feedback from whether users accept the suggestions.

Some embodiments further include the reminders data store 930 which may be configured to store records about reminders requested by users. In some cases, the reminders data store 930 includes a plurality of reminder records, each reminder record including an identifier of the reminder record that is unique within the reminders data store 930, an identifier of the user account of the user requesting the reminder, an identifier of the user account or device of the reminder recipient, an identifier of a geolocation at which the reminder is to be presented, an identifier of the device upon which the reminder is to be presented, a time at which the reminder was requested, an IP address to which a reminder was sent for presentation or from which data indicating such a presentation was received, a time after which the reminder is requested to be sent, a time before which the reminders requested to be sent, a list of reminder instances indicative of times at which a reminder was presented or sent, an identifier of an offer record in the offers data store 60 for which a reminder was requested, and identifiers of offer records of offers suggested by the offer-suggestion module 928.

In some embodiments, the presentation initializer 932 is configured to initialize a webpage or state of a native application on the redemption device 916 to display an offer (e.g., a summary of an offer) for which a reminder was sent to the mobile user device 914 (or other device upon which a reminder is presented). Initializing a webpage or native application may include receiving from the redemption device a request for data relating to offers, such as a GET request for an offers webpage or some other API request for data in offer records. In response to the request, the presentation initializer 932 may determine whether the request relates to a reminder that was recently sent, for example, whether the request relates to a reminder that was sent within some threshold duration of time, like within the previous hour or previous week.

Requests may be correlated with sent reminders by the presentation initializer 932 with a variety of techniques. For example, the received requests following a reminder may be conveyed in a transport protocol that includes an Internet Protocol address of the sender, and in response to a request, the presentation initializer 932 may query the reminders data store 930 for reminders sent to the same Internet Protocol address, which for public IP addresses may be shared by multiple computing devices in the user's home or work. Multiple computing devices within a local area network may share a single public IP address, with network address translation occurring within a router in the home or work network. As such, multiple devices within a local area network may appear to the outside world to have the same IP address, and the shared IP address may be used by the presentation initializer 932 to customize data for one computing device based on reminders sent to another device sharing the same public address.

In another example, the redemption device 916 may be correlated with a reminder sent to another device based on a user profile of the user to which the reminder was sent, for example, based on a list of device identifiers stored in the user profile. In some such embodiments, the presentation initializer 932 may parse a device identifier from the request (or request such an identifier, for example, stored in LocalStorage or a cookie) from the redemption device 916, and the presentation initializer 932 may then query user profiles for profiles associated with that device identifier. From the responsive profiles, the presentation initializer 932 may extract a list or lists of device identifiers, and each of those device identifiers may be submitted to the reminders data store 930 in a query for reminders sent to those corresponding device identifiers, thereby correlating the device to which a reminder was sent with the redemption device 916 based on both appearing in a user profile. User profiles may be associated with device identifiers with a variety of techniques, including users manually updating their profile to add such information, or correlating previous interactions with the offers engine 912 by a logged-in user operating various devices from which device identifiers are retrieved or otherwise obtained, the logged-in sessions being used to match different computing devices to a single user profile.

Initializing the presentation may include retrieving an offer record from the offers data store 60 of FIG. 1 corresponding to the offer that was the subject of an identified reminder and, in some cases, offer records of offers identified by the offer-suggestion module 928. Initializing the presentation may further include sending a webpage that includes only the identified offers (e.g., a summary of the offers) that were subject to a reminder or were identified by the offer-suggestion module 928. Or in some cases, a plurality of offers may be sent, including offers unrelated to the reminder, and the plurality of offers may be sent with instructions to the redemption device 916 to display the offers in reminders with a different visual weight, different layout, different interfaces, different content, or the like to indicate that the offer is one for which a reminder was sent. Initializing the presentation of offers may reduce the number of steps taken by a user to redeem an offer relative to steps taken to redeem other offers not subject to a reminder. Reducing the steps and visually emphasizing such offers is expected to lower the cognitive burden on users by making it easier to identify and redeem offers in which they are likely interested, as indicated by the request for a reminder, relative to systems that display offers without regard to whether reminders have been sent. It should be emphasized, however, that not all embodiments necessarily provide this benefit, as various other aspects of the present techniques are independently useful.

Some embodiments of the offer-discovery system 900 include a distributed computing environment with multiple devices with which the users interact that collectively provide a consistent workflow from offer discovery, to offer reminder, to offer redemption, in some case spanning multiple user devices. The above examples are described with reference to a mobile user device 914 on which offers are discovered and reminders are triggered and presented and a separate redemption device 916 with which offers are redeemed. These functions, however, may be further divided among additional computing devices, as described below, and in some cases offer reminders may be implemented with some or all of the functionality of the offers engine 912 relating to offer reminders being implemented in the mobile user device 914, the redemption device 916, or other computing devices, as is also described in examples below. Before addressing these other embodiments, it is helpful to consider examples of interfaces by which offers are discovered and reminders are requested, for example, on the mobile user device 914, and examples of processes performed by the offer-discovery system 900 and other embodiments.

Figure 10:
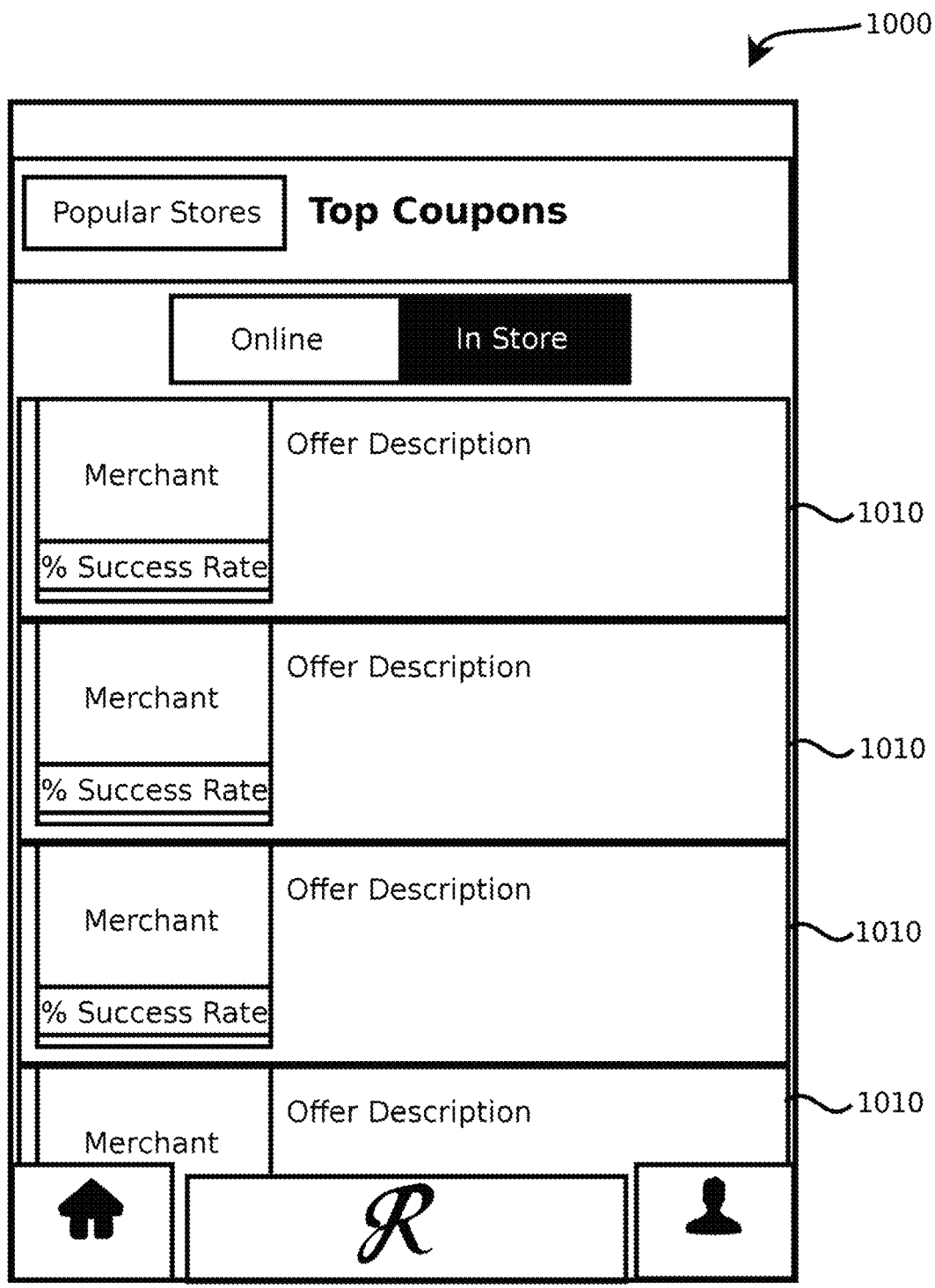
FIGS. 10-11 are examples of display screens of mobile user devices upon which a user browses offers and requests a reminder of a selected offer in accordance with some embodiments.

FIG. 10 shows an example of a display 1000 on the mobile user device 914 in which a plurality of offers 1010 are displayed. The display 1000 may be, for instance, a display screen of a mobile phone executing a web browser displaying a webpage, such as a mobile-formatted version of a webpage, of the offers engine 912, or a display screen of a tablet computer executing a native mobile application for discovering offers hosted by the offers engine 912. Each displayed offer 1010 may include an offer summary, such as a description of the offer, an identifier of the merchant, and statistical information indicative of user feedback assessing the offer, such as statistics (for instance, averages or time series histograms) on user up-votes or down-votes for the offer or statistics on amounts saved using the offer as reported by other users. The illustrated display 1000 further includes interfaces for faceted requests for offers redeemable online and for offers redeemable in-store. The display 1000 further includes interfaces for navigating to other collections of offers and to a user profile.

Upon a user selecting one of the offers 1010 in the display 1000 of FIG. 10, e.g., on the mobile user device 914, the user device may present a display 1100 corresponding to the selected offer shown in FIG. 11. The display 1100 may include a superset of the data about an individual offer shown in FIG. 10, including a longer description of the offer and various user selectable interfaces, such as virtual buttons to search for additional offers by the corresponding merchant, virtual buttons to save the offer in a user profile such that the offer may be viewed later by requesting saved offers from the offers engine 912, virtual buttons to redeem the offer, and virtual buttons to share the offer with other users, such as other users within a social network graph that are adjacent the user operating the mobile device 914.

In some embodiments, the display 1100 includes an interface 1110 to request a reminder and an interface 1112 to configure a reminder request. Users may request reminders by touching, clicking on, or otherwise interacting with interfaces 1110 and 1112. For example, the offers application 918 or JavaScript™ executing in a webpage may include an event handler for touch events within the areas of display 1100 corresponding to interfaces 1110 and 1112, and those event handlers may execute scripts or other routines that effectuate the functionality that creates reminders in response to associated events.

For instance, upon a user selecting interface 1110, labeled "remind me at home," the offers application 918 may send a request to the offers engine 912 for the reminder registrar 934 to create a reminder record in the reminders data store 930. In some cases, the created record may be a default record for reminders at the user's home geolocation, and the sent request for the reminder may identify the user, such that the reminder request may be used to identify the user's home geolocation and the offer displayed on display 1100. In other embodiments, the reminder request may be stored locally on the mobile user device 914, which may execute an instance of the location-event handler 938 and reminder dispatcher 940 described above to present a reminder when the offers application 918 determines that the user has entered the geofence 917 or has otherwise satisfied a geographic constraint.

In some embodiments, upon a user selecting the interface 1112, the offers application 918 (or corresponding webpage) may present additional displays with interfaces by which the user may configure the reminder. For example, the user may be presented with a list of adjacent nodes in a social network graph by which the user may identify a different reminder recipient, for example, a request to remind the user's spouse to redeem an offer when at home, at work, or at a merchant site corresponding to the offer. In another example, the user may configure the offer reminder to be presented in a particular geographic location, such as the user's work geolocation or at some other geolocation. Upon configuring the reminder request, the reminder request may be sent to the reminder registrar 934 in the offers engine 912, or the reminder request may be stored locally on the mobile user device 914 for execution of the reminder by the mobile user device 914 without prompting from, or reminder-specific requests to, the offers engine 912.

Figure 12:
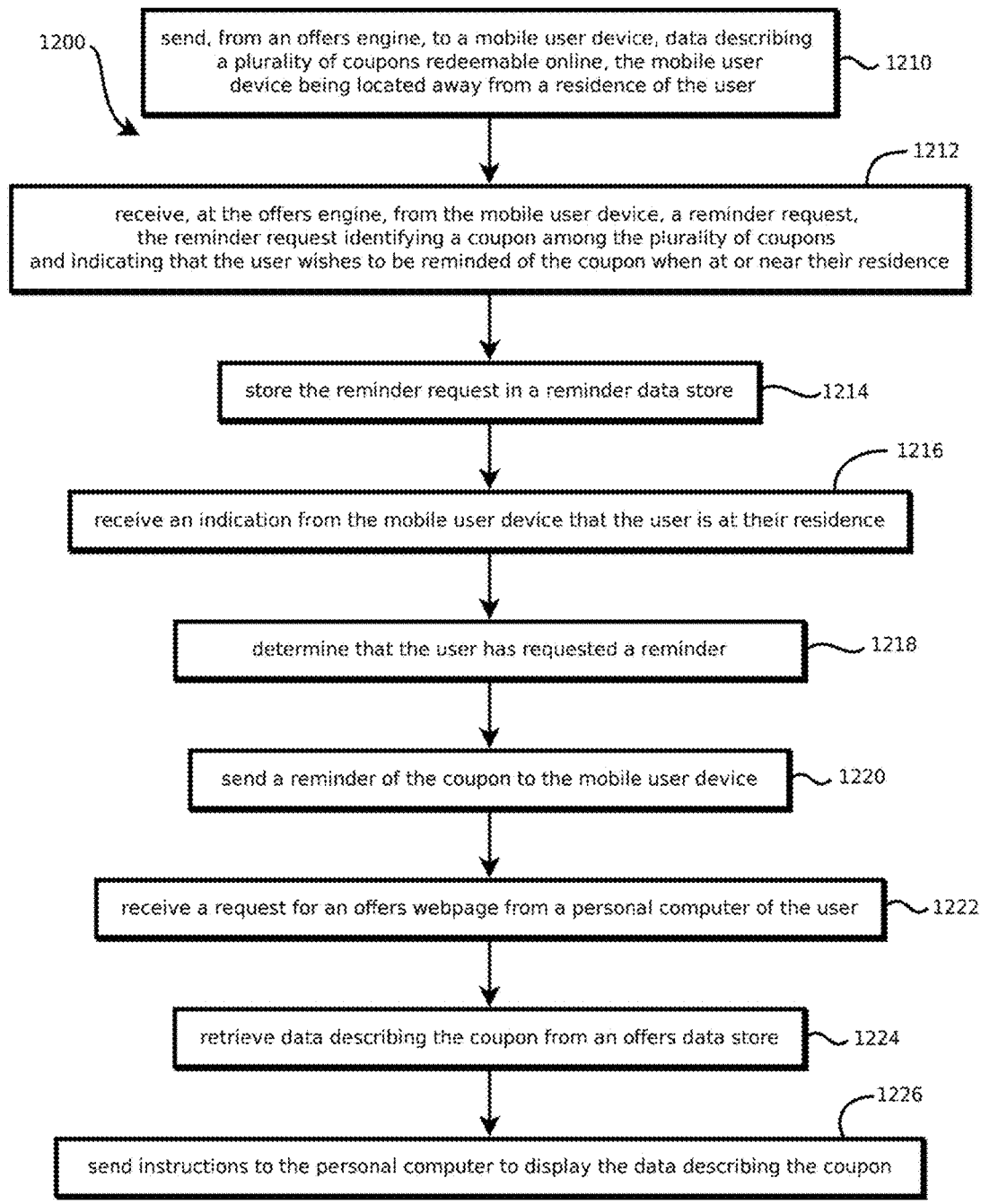
FIGS. 12-13 are examples of processes for reminding users of offers in accordance with some embodiments.

FIG. 12 shows an example of a process 1200 for reminding users of offers that may be executed by some embodiments of the offer-discovery system 900 of FIG. 9, but is not limited to the particular aspects of that implementation. Instructions, such as computer code, for executing the process 1200 may be stored on a tangible, non-transitory, machine-readable medium, which may include code stored in a single computing device or code distributed across multiple computing devices on multiple mediums, and those instructions, when executed may cause a data processing apparatus to effectuate the operations described with reference to FIG. 12 or other processes described herein. In another example, one or more processors may execute instructions stored in memory to effectuate these operations, though again it should be understood that some of the one or more processors may execute different portions of the instructions, and some of the one or more processors may be in different computing devices.

The process 1200 and other processes described herein, in some embodiments, may be performed concurrently for hundreds or thousands of different users across hundreds, thousands, or substantially more offers. Accordingly, to operate at such scales, some embodiments may include multiple instances of computing hardware for effectuating the same routines, along with load-balancing servers and content delivery networks to speed the delivery of resources to user devices that are potentially geographically distributed over a large area, such as North America and Europe or a substantial portion of the world.

In some embodiments, the process 1200 begins with sending, from an offers engine, to a mobile user device, data describing a plurality of coupons (or other offers, such as discount deals) redeemable online, the mobile user device being located away from a residence of the user, as indicated by block 1210. For example, the user may be waiting in line with time that is otherwise unoccupied, and the user may take advantage of the time to browse offers in which they may be interested later, but which they are not presently interested in redeeming on their mobile user device. Alternatively, the user may be "show-rooming" (e.g., browsing merchandise in a store and, at the same time, look for coupons in order to purchase online at a later time at a lower price.

Next, in some embodiments, the offers engine may receive from the mobile user device a reminder request, the reminder request identifying a coupon among the plurality of coupons and indicating that the user wishes to be reminded of the coupon when at or near their residence, as indicated by block 1212. As noted above, the reminder may also relate to other types of offers, and the reminder request may be a request to be reminded a different location, or a request for the reminder to be sent to a different user.

Next, embodiments may store the reminder request in a reminder data store, as indicated by block 1214. The reminder request may be stored in a reminder record in the above-described reminders data store 930 of FIG. 9, in some embodiments. In some cases, the reminder request may be stored locally on a mobile user device or other device.

In some embodiments, the offers engine may receive an indication from the mobile user device that the user is at their residence, as indicated by block 1216. In some cases, the indication is a request from the mobile user device for offer reminders associated with a geofence that the user crossed, or for offer reminders associated with a wireless network to which the mobile user device connected or is in broadcast range of. In other examples, the reminder request may be stored locally, and the mobile user device may send a signal to the offers engine indicating that the geographic criteria of a reminder request has been satisfied to track reminders on the offers engine in the reminders data store 930 and facilitate initialization of displays of offers following reminders.

Some embodiments include determining that the user has requested a reminder, as indicated by block 1218. Determining that the user has requested a reminder may be performed by the location event handler 938 described above with reference to FIG. 9, and the determination may be performed by the offers engine 912 or the offers application 918. In some cases, the determination includes determining that the offer reminder pertains to the current geographic location of the user, and in some cases, determining includes adding the offer reminder to a queue of reminders (e.g., a FIFO buffer) and determining that more than a threshold amount of time has passed since the last time a reminder was presented to the user to budget the user's attention.

Some embodiments include sending a reminder of the coupon (or other offer) to the mobile user device, as indicated by block 1220. In some embodiments, this step may be performed by the above-described reminder dispatcher 940, or the reminder may be resident on the mobile user device 914 or may have been pushed to (or pulled by) some other computing device by the offers engine or by the mobile user device. In cases in which the reminder is stored in advance on the computing device that will present the reminder, e.g., in a reminder cache, some embodiments may include instructions for that computing device to query the offers engine 912 to determine that the offer is still valid before presenting the reminder and, in some cases, to request offers identified by the offer-suggestion module 928.

Embodiments further include receiving a request for an offers webpage from a personal computer (or other computing device) of the user, as indicated by block 1222. In some embodiments, the request may come from a variety of different computing devices from the computing device upon which the offer was discovered or upon which a reminder of the offer was presented. In some cases, the request is for data to be presented by another instance of the offers application 918 executing on another user device.

In some cases, embodiments include retrieving data describing the coupon (or other offer) from an offers data store, as indicated by block 1224. This step may include determining that the request in block 1222 is from a user to whom the reminder is sent in block 1220 and, in response, initializing the offers webpage (or state of a native offers application) to display the offer that was the subject of the reminder. In some cases, initialization is performed by the above-described presentation initializer 932 of FIG. 9, though embodiments are not limited to that implementation. In some cases, data describing suggested offers from the offer-suggestion module 928 may also be retrieved.

Embodiments may further include sending instructions to the personal computer (or other computing device) to display the data describing the coupon, as indicated by block 1226. Sending instructions may include sending markup, styling, and scripting instructions to a web browser 924 executing on the redemption device 916 of FIG. 9, or sending instructions may include sending data describing the offer according to an API of the offers engine 912 to a native offers application executing on the redemption device 916.

Figure 13:
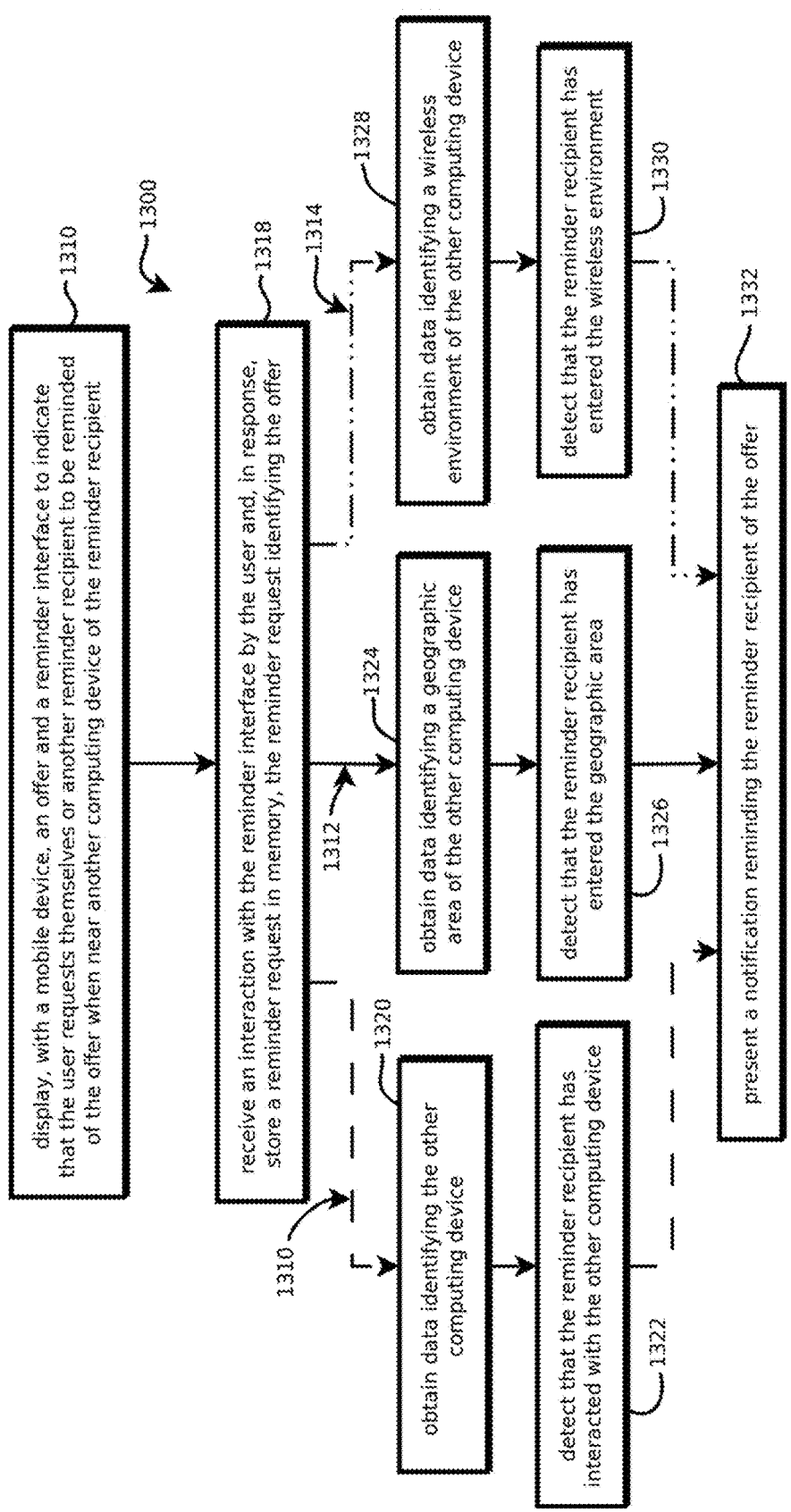

FIG. 13 shows another example of a process 1300 for reminding users of offers. In this case, the process 1300 includes three branches 1310, 1312, and 1314 that may be executed as alternatives or in addition to one another. Each branch 1310, 1312, and 1314 is an example of the process 1300 in which the location of the reminder recipient is determined with a different technique. In some cases, the process 1300 may be performed by embodiments of the above-described offer-discovery system 900 of FIG. 9, though embodiments of the process 1300 are not limited to those implementations.

In some embodiments, the process 1300 begins with displaying, with a mobile user device, an offer and a reminder interface to indicate that the user requests themselves or another reminder recipient to be reminded of the offer when near another computing device of the reminder recipient, as indicated by block 1316. Examples of displays of an offer and a reminder interface are described above with reference to FIGS. 10 and 11. In some cases, this step is performed by the above-described offers application 918 of mobile user device 914 of FIG. 9.

Next, embodiments of process 1300 include receiving an interaction with the reminder interface by the user and, in response, storing a reminder request in memory, the reminder request identifying the offer, as indicated by block 1318. In some cases, the interaction is received by an event handler executed by the offers application of FIG. 9. The reminder request may be stored locally, on the mobile user device, or remotely, for example, in the above-described offers engine 912. Identifying the offer may include storing an offer identifier corresponding to a record in the above-described offers data store 60 of FIG. 1.

Embodiments of process 1300 may proceed to one or more of three different branches 1310, 1312, and 1314 for determining that a reminder recipient is at a location (e.g., a geographic area) at which the reminder is to be presented to the recipient. In some cases, hardware and software for performing the method 1300 supports all three branches 1310, 1312, and 1314, or embodiments may support a subset of these branches.

As indicated in branch 1310, some embodiments include obtaining data identifying the other computing device, as indicated by block 1320. In some cases, the other computing device is identified by an IP address through which the other computing device exchanges data over the Internet, user agent information or data stored in cookies or LocalStorage of the other computing device, or a combination thereof. For example, some embodiments may store in a user profile of the reminder recipient a home IP address of the router through which the reminder recipient connects to the Internet through their home network (or their work network, for example). In some cases, the other computing device may be identified by a request for a webpage or an API request to the offers engine 912 of FIG. 9. Such a request may include the IP address in a header field of a packet conveying the request. Based on the IP address being so designated in a user profile, embodiments may determine that the request comes from the user's home or work. Further, embodiments may determine based on user agent information that the request comes from a desktop computer or a particular operating system associated with the other computing device. In some cases, embodiments of the offers engine may send JavaScript™ to be executed by the other computing device to return a window size or screen size indicative of the other computing device, such as a screen size larger than a threshold number of horizontal or vertical pixels. In another example, such scripts may be sent and executed by a client to return to the offers engine an identifier of the user and the device from a cookie or LocalStorage, or the user may log in with a user-name and password on the other computing device, thereby self-identifying such that corresponding reminders may be retrieved. In some cases, the other computing device may be identified with specificity that is unique to that computing device, such as a MAC address or other device identifier (like an advertiser-specific device ID), or the other computing device may be identified based on capabilities, such as a computing device having a window or screen size larger than some threshold or a particular operating system, such as a operating system known to be used primarily by desktop computers.

Some embodiments of process 1300, in branch 1310, detect that the reminder recipient has interacted with the other computing device, as indicated by block 1322. Detecting the interaction may occur concurrently with obtaining data identifying the other computing device, for example, concurrent with receiving a GET request or API request indicative of interaction received at an offers engine. In another example, a native offers application may execute on the other computing device and upon the user interacting with the other computing device, for example, waking it from a sleep state, the offers application may detect that the reminder recipient has interacted with the other computing device and report the interaction to the above-described offers engine, such that reminders may be retrieved or locally cached reminders may be presented.

Branch 1312 illustrates another example of determining the location of the user in process 1300. In this example, some embodiments obtain data identifying a geographic area of the other computing device, as indicated by block 1324. Obtaining data identifying the geographic area may include inferring a home address or a work address or both of the reminder recipient based on accumulated location histories acquired by a mobile user device of the reminder recipient. For example, a reminder recipient's home address or home geographic area may be inferred based on a cluster analysis of timestamped geolocations accumulated over some duration of time, such as a month, by a native offers application. In some cases, multiple clusters may be detected, for instance, one corresponding to a likely home address and one corresponding to a likely work address. In another example, users may specify the geographic area for their home, for their work, or for a particular reminder manually by interacting with the offers engine 912 of FIG. 9, for instance, by drawing a box on a map interface area corresponding to their home or placing a pin icon on a map location corresponding to their home.

Geographic areas may be described with a variety of data structures. In some cases, a geographic area may be described by a bounding box or other polygon having vertices of latitude and longitude coordinates stored in a list in memory. In another example, a geographic area may be described with one or more identifiers of unit tiles corresponding to unit geographic areas, for example, unit squares of a rectangular lattice or unit hexagons of a hexagonal lattice. In another example, a geographic area may be described by a center point latitude and longitude coordinate and a radius. The geographic area may be obtained by retrieving such geographic areas from a user profile of the reminder recipient in the offers engine 900 described above, or such geographic areas may be maintained exclusively on a mobile user device (or other computing device) of the reminder recipient for enhanced privacy.

In some cases, the other computing device is a specifically identified other computing device known to be in the geographic area, for example, a specific home desktop computer. Or the other computing device may be any of a plurality of other computing devices within a home or work environment, and the geographic area is not specific to one of these devices.

Some embodiments of process 1300 in branch 1312, further include detecting that the reminder recipient has entered the geographic area, as indicated by block 1326. Examples of such detection are described above with reference to FIG. 9. For example, a location sensor in a mobile user device may be used to determine by a native offers application that the user has traversed (e.g., is within) a geofence corresponding to the geographic area of a reminder. In some cases, the mobile user device may periodically query the offers engine for geographic areas corresponding to reminders, or the mobile user device may infer and store a list of such geographic areas locally. In some embodiments, the mobile user device compares the current location of the mobile user device to the geographic area or areas periodically or in response to a change in location of the mobile user devices larger than some threshold, for example, in response to the mobile user device changing cell towers to reduce the power draw from frequent periodic checks when no change in position has occurred.

Branch 1314 of process 1300 illustrates another example of an embodiment by which the process 1300 may determine the location of the reminder recipient (e.g., determine whether a location criterion of a reminder request has been satisfied). In some embodiments, branch 1314 includes obtaining data identifying a wireless environment of the other computing device, as indicated by block 1328. Such data may include one or more SSIDs of a home wireless local area network.

In some cases, a home wireless network is inferred based on an analysis by which a history of connections to (or beacons from) wireless area networks is ranked by frequency, duration, or both during evening hours, for example, to identify a home network by a native offers application. A similar analysis may by executed by the native offers application to identify a work wireless network using connections during work hours. In other examples, the user may manually identify the SSID of their home wireless local area network and their work wireless area network.

Other examples of data identifying a wireless environment includes identifiers of a Bluetooth™ transmitter of the other computing device or a near field communication identifier associated with the other computing device. In some cases, the user may designate such an identifier by using a configuration interface of native offers application on the mobile user device to select among such identifiers in range when proximate the other computing device to create such a designation in the mobile user device. In another example, the wireless environment is identified by a Bluetooth beacon, such as a Bluetooth Low Energy™ beacon that indicates proximity to the other computing device, such as an in-store Bluetooth beacon that indicates proximity to a point-of-sale terminal or kiosk, or an at-home beacon. In some cases, identifiers of such beacons and corresponding merchants or locations may be acquired from third parties, such as providers of location beacons hosting an API by which relevant data may be queried based on an identifier conveyed by the beacon signal. In some cases, the other computing device is a point-of-sale terminal, or in other cases, the other computing device is a specific home computer known to be on the same wireless network as the beaconing device.

In some embodiments, the data identifying a wireless environment includes a list of MAC addresses of other computing devices connected to the same local wireless area network as a mobile user device. In some cases, the other computing device may be identified by such a MAC address or other identifier, and the mobile user device may query a router or scan a network for a list of locally connected devices identified by MAC addresses to determine whether the other computing device is connected to the same router as the mobile user device.

Next, some embodiments may detect that the reminder recipient has entered (e.g., is in) the wireless environment, as indicated by block 1330. In some cases, the detection may be performed by the above-described mobile user device, which may, for example, compare an SSID received in a wireless beacon to an SSID correlated to a local network of the other computing device. In another example, specific device identifiers may be detected based on device identifiers available over local or personal networks, such as Bluetooth™ identifiers, near field communication identifiers, and MAC addresses. Entry to the wireless environment may be detected by matching received identifiers with identifiers stored in memory accessible to a native mobile offers application.

In some embodiments, a different computing device from the above-described mobile user device may detect that the reminder recipient has entered the wireless environment. For example, the other computing device may execute a native offers application that periodically senses whether a MAC address of the mobile user device is resident on a wireless area network or whether a Bluetooth™ or near field communication identifier of the mobile user device has been broadcast in range. In some cases, a third computing device determines that the reminder recipient has entered the wireless environment. For example, an application executing on a home router may determine that the MAC address of the mobile user device is resident on a home wireless area networks. Or personal area network identifiers may be used to detect entry, for instance, a Bluetooth™ or near field interface of a smart thermostat or electronic lock may be used to determine proximity of the mobile user device (e.g., based on the mobile user device broadcasting an identifier on such a network), in which case the third computing device may report the proximity to the mobile user device, the above-described offers engine, or the other computing device to initiate presentation of the reminder.

The process of 1300 further includes presenting a notification reminding the reminder recipient of the offer, as indicated by block 1332. Presenting the notification may include vibrating a user device, emitting an audible alert, or displaying a visual alert. The notification may be presented with a mobile user device, a wearable computing device, or a television through a network enabled set-top box, a gaming console, an optical media player, or the notification may be presented on a display on some other computing device, such as an Internet-enabled home automation system, refrigerator, thermostat, or the like. In some cases, the reminder is presented on an in-dash automotive computer, for example, when the user pulls into the driveway of their home, or on a public kiosk in a store, such as a networked display in a checkout line.

Thus, as illustrated in FIG. 13, the present techniques may be implemented in a variety of different ways with various devices serving different functions. As device makers increasingly offer richer APIs and open their systems to third-party developers, such interactions are expected to become increasingly common and expected by consumers, particularly as consumers engage with increasing numbers of offers of increasing complexity. Further, distributed native applications on multiple devices may facilitate reminders with direct device-to-device communications, without the communication being mediated by the offers engine 912. Some of these multi-device use cases are described by FIGS. 14 through 19.

Figure 14:
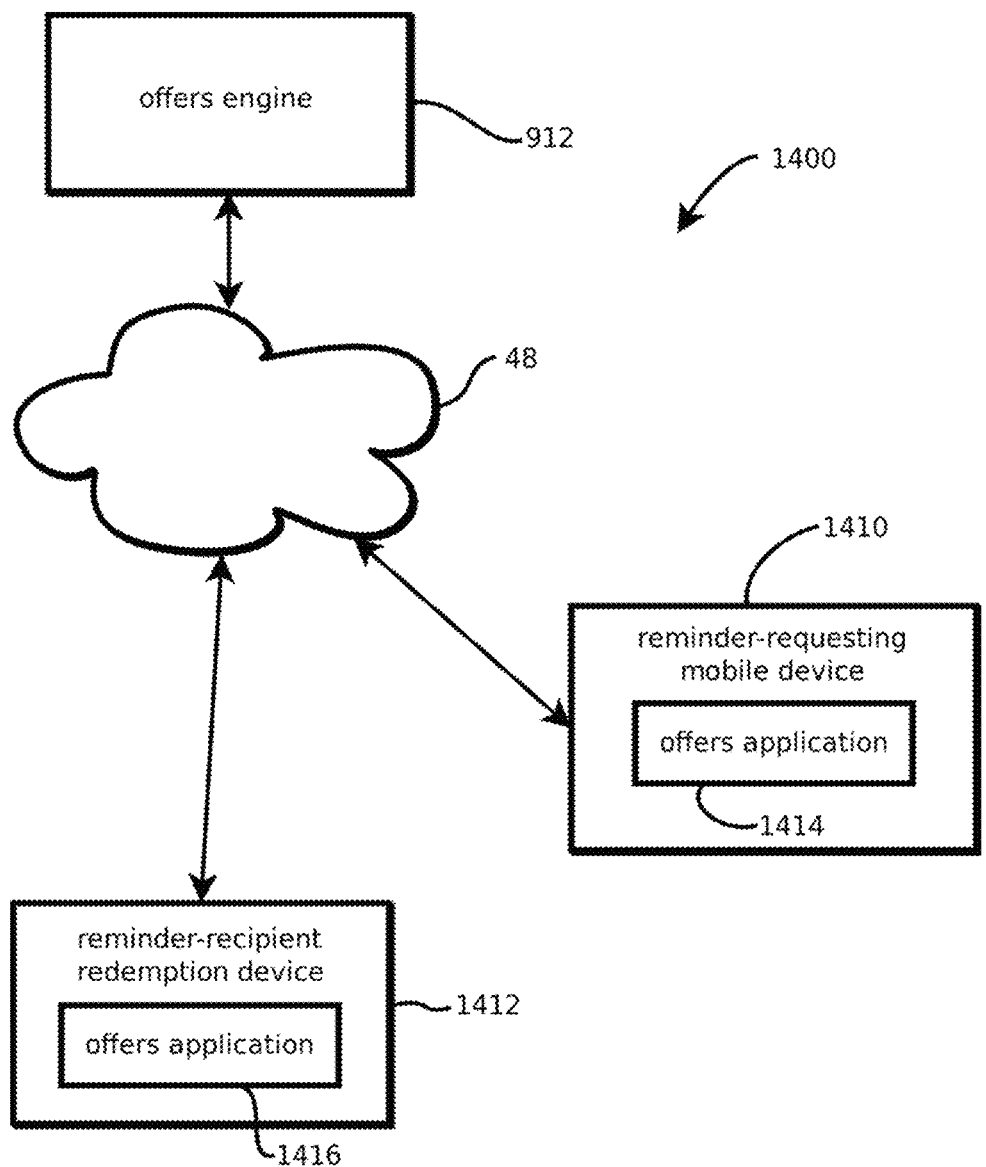
FIGS. 14-18 are additional examples of offer-discovery systems in accordance with some embodiments.

FIG. 14 shows an example of an offer-discovery system 1400 in which special purpose native applications for discovering and redeeming offers may be executing on both a reminder-requesting mobile device 1410 and a reminder-recipient redemption device 1412. The system 1400 may further include an example of the above-described offers engine 912 and the Internet 48. In some cases, a user may request an offer reminder with an offers application 1414 executing on the reminder-requesting mobile device 1410, for example, using the above-described mobile device 914. This reminder request may be sent to the offers engine 912 and stored in memory. In some embodiments, the reminder-recipient redemption device 1412, such as a home desktop or laptop computer, may execute a native offers application 1416. In some embodiments, the offers application 1416 executes as a background process at least some of the time on the redemption device 1412 and periodically queries the offers engine 912 for offer reminders. In some cases, reminder requests sent by the mobile device 1410 to the offers engine 912 may be conveyed to the redemption device 1412, which may present the reminder to a user when the user interacts with the redemption device 1412. Having a special-purpose offers application 1416 executing in this fashion on the redemption device 1412, in some embodiments, facilitates the transfer of data relating to offers to the redemption device 1412 prior to user interaction, thereby reducing latency when the user desires to interact with offers or a reminder is to be presented. It should be noted, though, that not all embodiments provide these benefits, as various other aspects are independently useful. In other examples, requests for reminders may be sent to the redemption device 1412 after the offers application 1416 determines that the user is interacting with the redemption device 1412, for instance, in response to such interaction.

Figure 15:
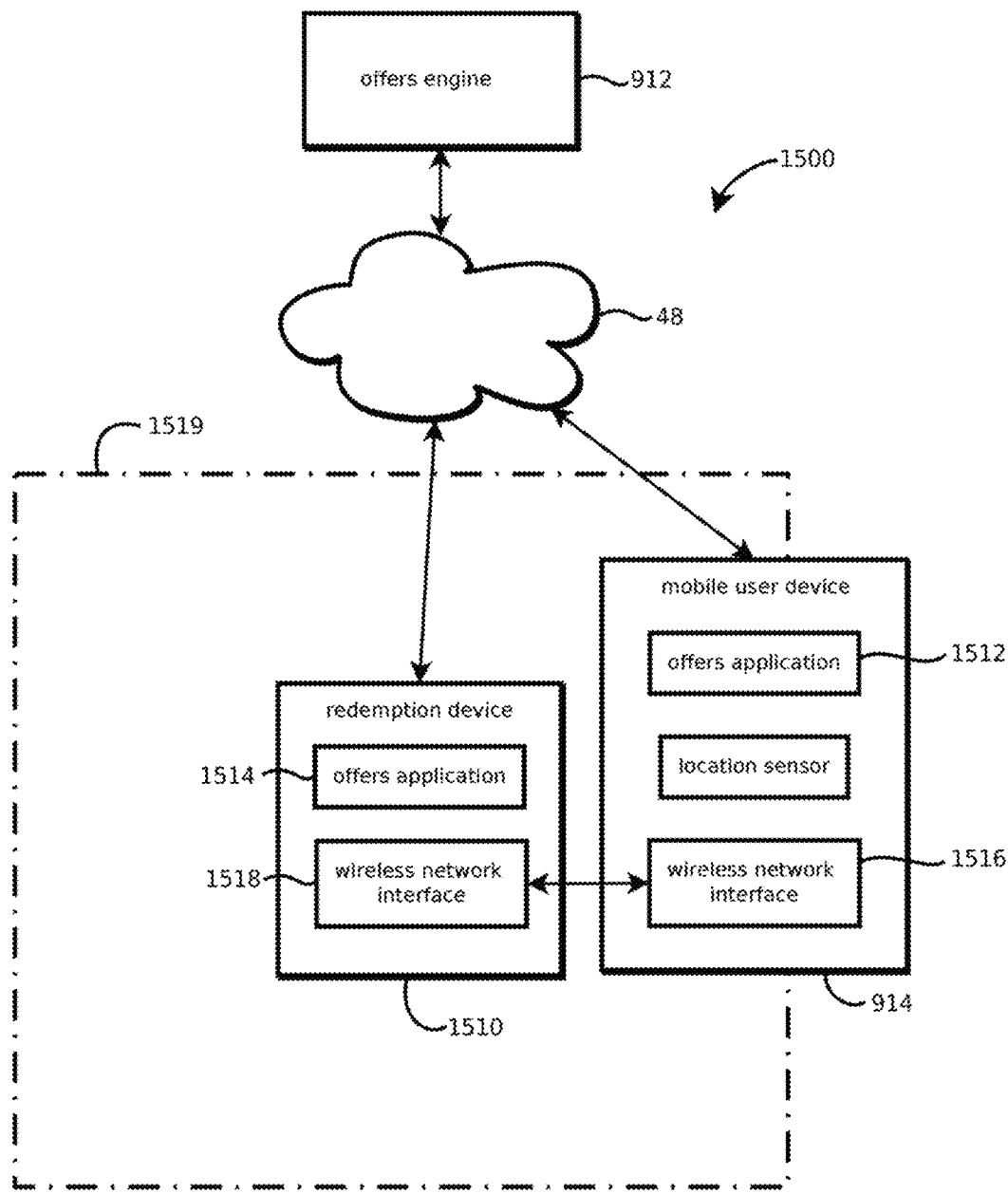

FIG. 15 shows another example of an offer-discovery system 1500 having the offers engine 912, the Internet 48, and the above-describe mobile user device 914. In this example, both the mobile user device 914 and a redemption device 1510 includes a special-purpose native offers application 1512 and 1514 like those described above, which is in contrast to webpages rendered in a web browser that may have more limited access to operating system resources. In some embodiments, reminder requests or identifiers of offers for which reminders of been received are conveyed directly from the mobile user device 914 to the redemption device 1510 using wireless network interfaces 1516 and 1518 like those described above. In some cases, the offers application 1514 on the redemption device 1510 may monitor the wireless network interface 1518 for offers or reminders being pushed from the mobile user device wireless network interface 1516 by the offers application 1512, or the redemption device 1510 may poll offers or reminders on the other device. In some cases, offers are conveyed directly through a local area network connected between the wireless network interfaces 1518 and 1516, such as through a wireless router, or a direct wireless connection is established between the redemption device 1510 and the mobile user device 914, for example, with a Bluetooth™ pairing or a near field communication connection. In another example, offers are exchanged with a WiFi Direct™ connection between devices. In some such implementations, offers are conveyed without leaving the local network. Conveying reminders or offer identifiers directly is expected to simplify the operation of the offers engine 912, as reminders or offers may be exchanged between devices without logic on the offers engine 912 being engaged to execute the exchange, and reduce latency. It should be noted, however, that not all embodiments provide these benefits, as various other aspects are independently useful.

Figure 16:
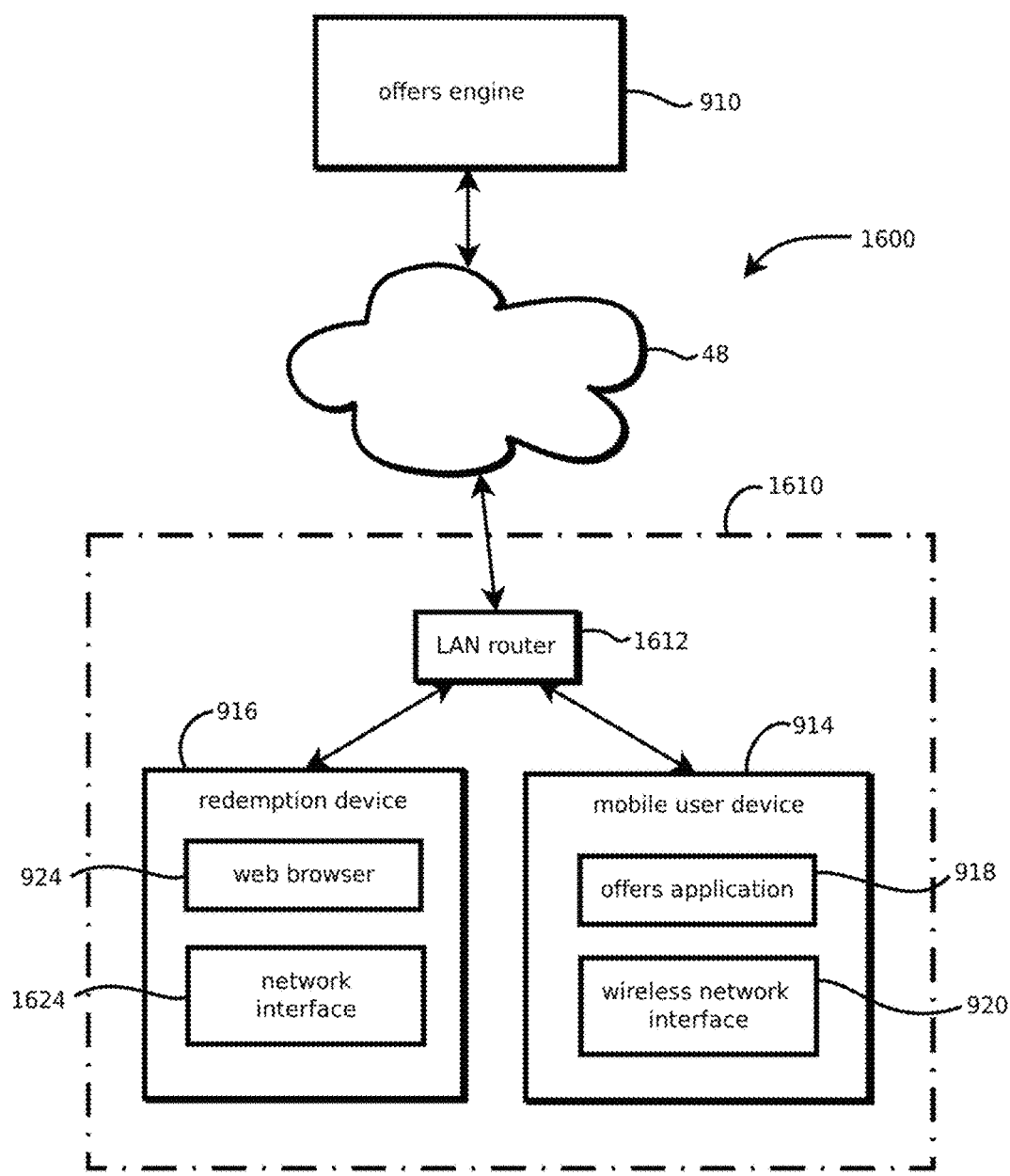

FIG. 16 shows an example of an offer-discovery system 1600 in which webpages to be rendered on the redemption device are initialized based on the redemption device sharing a public IP address with the mobile user device 914 to which a reminder was sent. In this example, the mobile user device 914 may execute the offers application 918, which may determine that the mobile user device is at the geographic location at which a reminder should be presented and effectuate the presentation, using the techniques described above. In the course of, or in response to presenting the reminder on the mobile user device 914, the mobile user device 914 may communicate with the offers engine 912 through a local area network router 1612 providing a wireless area network 1610. The mobile user device 914 and the redemption device 916 may each have unique private IP addresses within a local area network of the local area network router 1612. The local IP addresses may be translated with a network address translation table in the local area network router 1612, such that the mobile user device 914 and the redemption device 916 may share a public IP address that is used to communicate with the offers engine 912 over the public Internet 48. A network interface 1624 of the redemption device 916 may also connect to the local area network router 1612 through a wired or wireless connection.

After the reminder is presented on the mobile user device 914 and the mobile user device 914 communicates with the offers engine 912 through the local area network router's public IP address, the user may launch the web browser 924 on the redemption device 916 and request a webpage from the offers engine 912 through the same public IP address of the local area network router 1612. In some cases, the offers engine 912 may store the public IP address associated with the reminder in memory and match that address to the request for a webpage from the redemption device 916. Based on the match, the offers engine 912 may initialize the webpage sent to the redemption device 916 to display the offer that was the subject of the reminder sent to the mobile user device 914, thereby potentially reducing user interaction steps to redeem the offer relative to systems that do not initialize the webpage based on having sent a reminder. Not all embodiments, however, provide this benefit, as other aspects described herein are independently useful.

Figure 17:
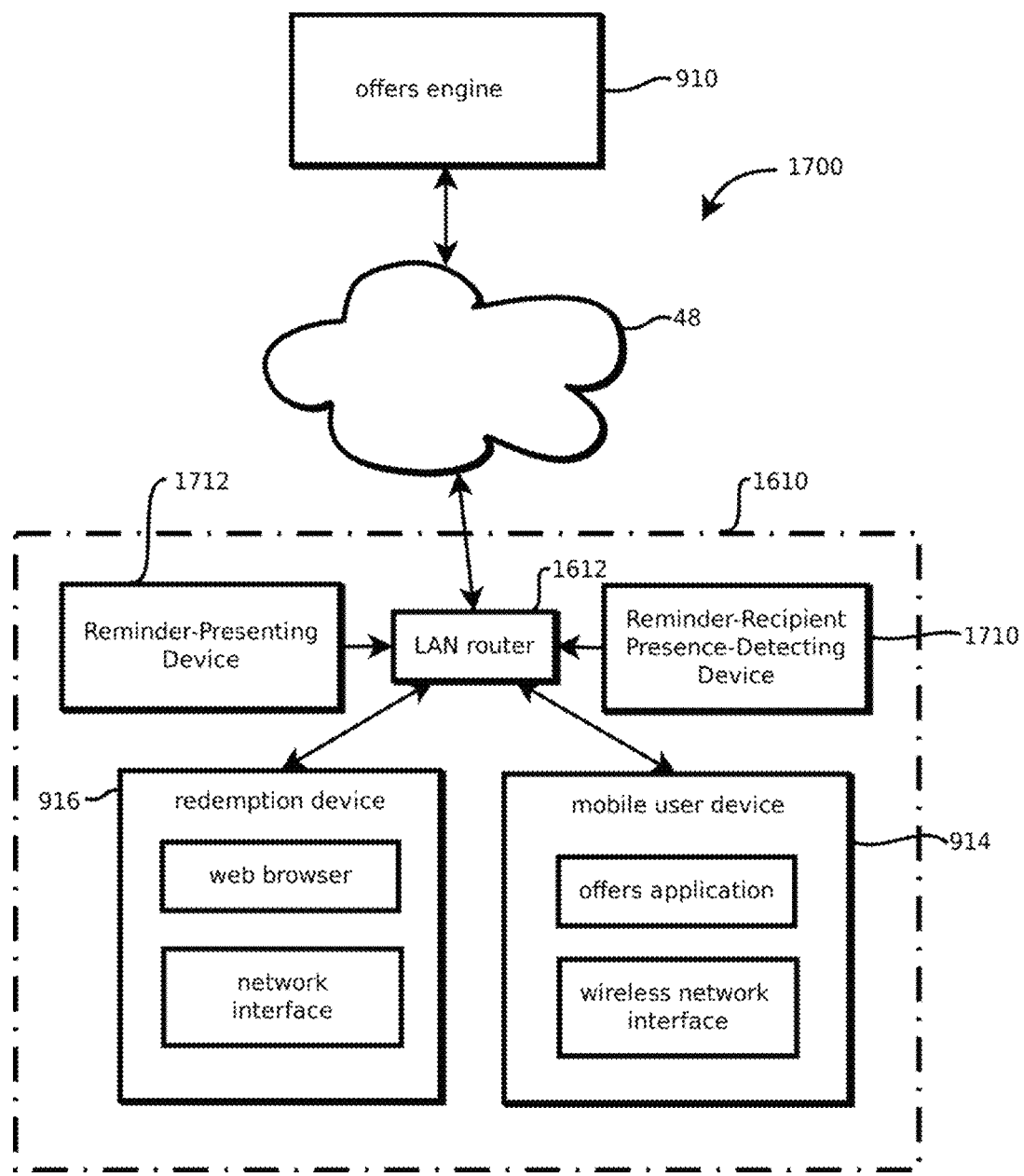

FIG. 17 shows another example of an offer-discovery system 1700 in which the function of requesting reminders, detecting proximity of the user in an area in which the reminder is to be presented, presenting the reminder, and redeeming an offer are distributed among separate computing devices connected to the local area network router 1612 (for example, directly connected with private IP addresses assigned by the local area network router 1612 within a home or work local area network). This example further includes a reminder-recipient presence-detecting device 1710, and a reminder-presenting device 1712. Examples of such devices are described above and include various computing devices present in a home or work environment. For example, many consumer devices are network enabled and support applications developed by third-party developers. Such third-party application developer support may be used to develop and install offers applications on these other devices 1710 and 1712 for providing the functionality described herein. In some cases, the offers application on the reminder-presenting device 1712 may present a reminder using techniques described above in response to the reminder-recipient presence-detecting device 1710 indicating the presence of the reminder recipient, e.g., with a broadcast on a local area network or a direct device-to-device communication coordinated according to a user configuration of the applications executing on each device. In some cases, the interactions between the devices on the local area network are coordinated by the offers engine 912, or in some cases, the devices communicate directly with one another to coordinate the presentation of reminders and redemption of offers. For example, the reminder-recipient presence-detecting device 1710 may, in response to detecting the recipient, broadcast a signal indicating the presence of the reminder recipient to all IP addresses on the local area network router, and the reminder-presenting device 1712 may receive such a broadcast and determine that a reminder is to be presented in response, e.g., upon the user interacting with the reminder-presenting device.

Figure 18:
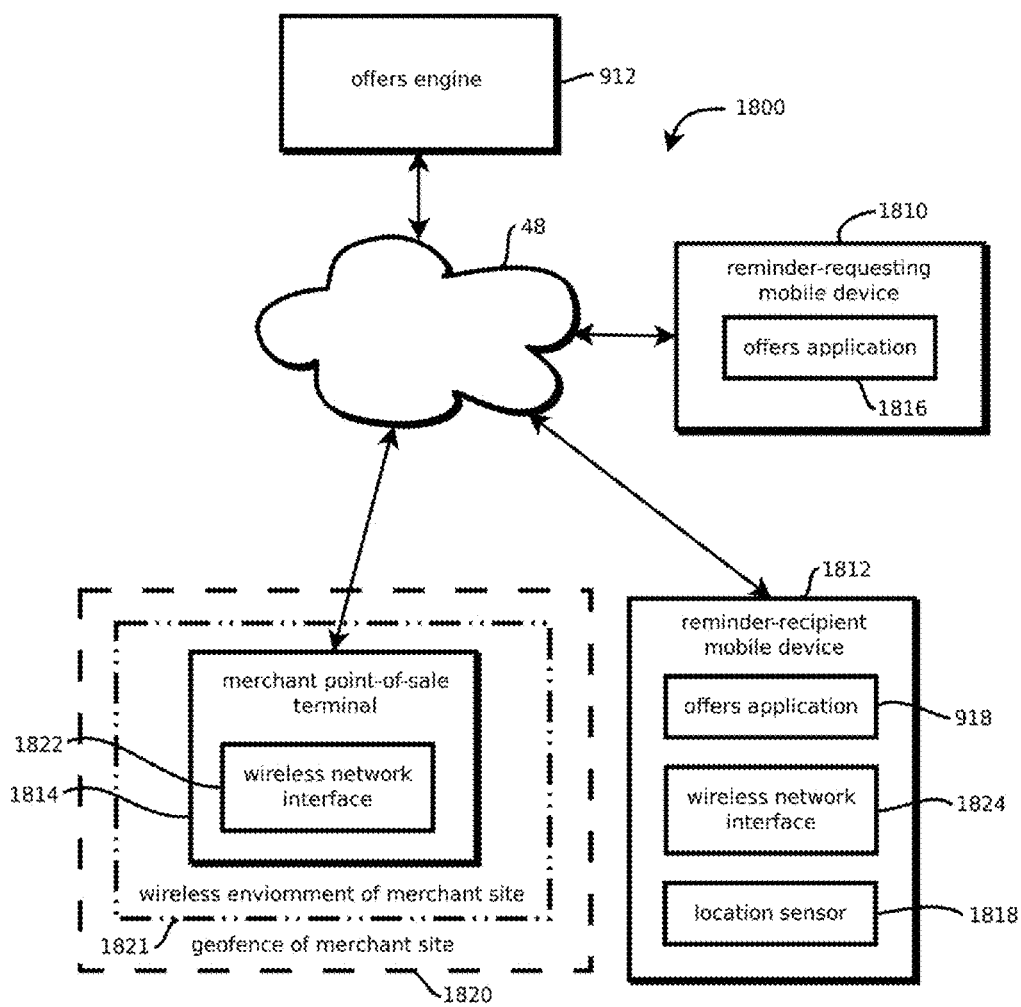

FIG. 18 illustrates another example of an offer-discovery system 1800 in which the reminder recipient mobile device 1812 is different from the reminder-requesting mobile device 1810 (for example, a device operated by a different user) and the offer is redeemed in-store at a merchant's point-of-sale terminal 1814. In some cases, the user of the reminder-requesting mobile device 1810 may execute an offers application 1816 like those described above to browse offers and request the reminder be sent to the reminder-recipient. To identify the recipient, the requester may use the offers application to browse contacts in their phone or contacts identified in a social network graph, such as a social network hosted by the offers engine 912 or to which the offers engine 912 has access through a third-party API. Upon requesting the reminder, the reminder may be stored in the offers engine 912 and sent by the offers engine 912 to the reminder-recipient mobile device 1812 with instructions to present the reminder upon the location sensor 1818 of the recipient mobile device 1812 indicating that the mobile device 1812 is within a geofence 1820 of a merchant that issued the offer, at which the offer is redeemable, or otherwise identified by the reminder-requesting user. In other embodiments, the presence of the reminder recipient at the merchant geolocation may be determined based on a wireless environment 1821 in a merchants store, such as a predetermined SSID broadcast by a merchant's wireless area network or a Bluetooth™ beacon identifier. In some cases, after presenting a reminder on the recipient mobile device 1812, the offers application of recipient device 1812 may convey the offer to the point-of-sale terminal using wireless network interfaces 1822 and 1824.

Figure 19:
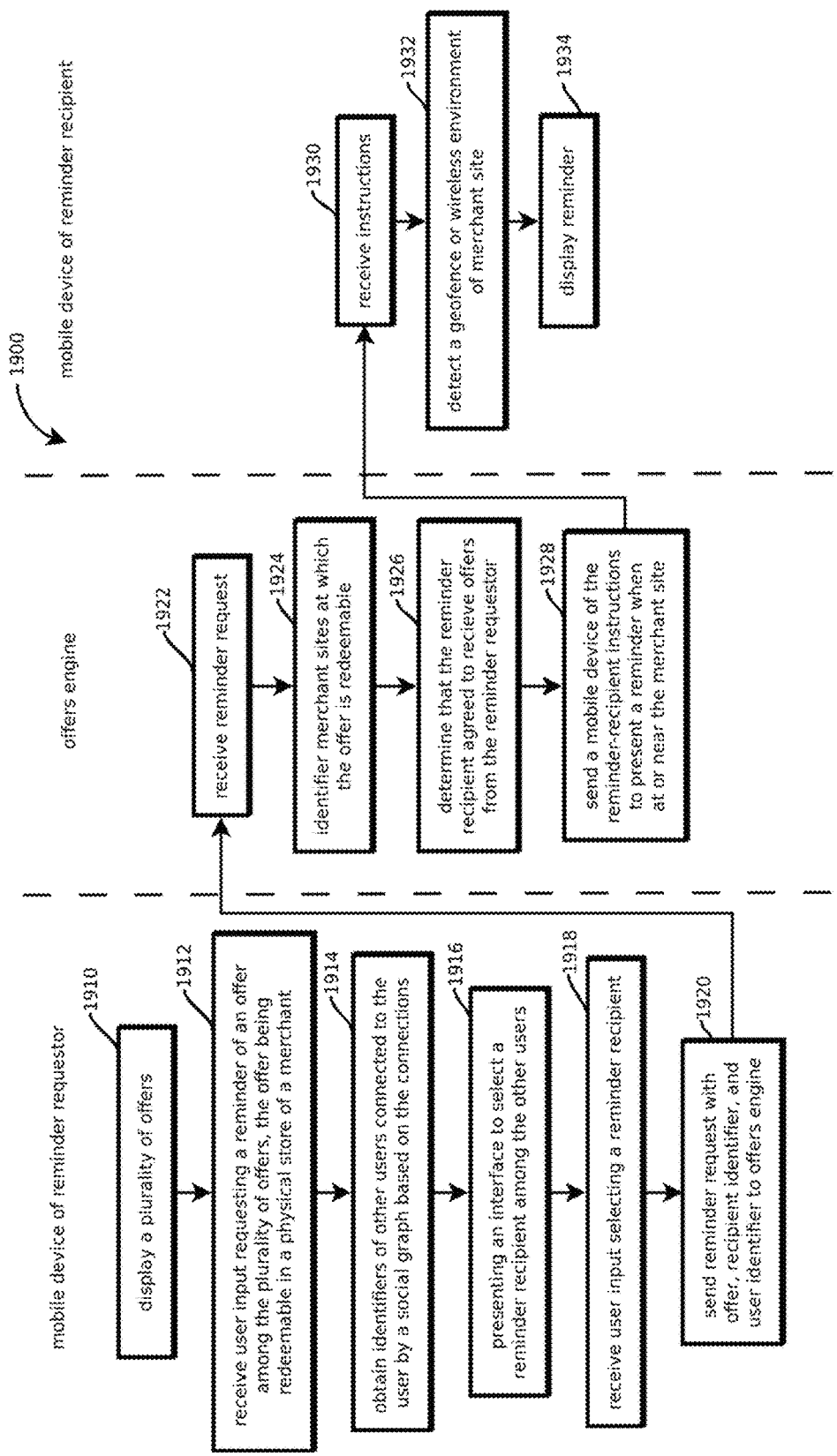
FIG. 19 is another example of a process for reminding users of offers in accordance with some embodiments.

FIG. 19 shows an embodiment of a process 1900 performed by some embodiments of the above-described offer-discovery system 1800 of FIG. 18, though embodiments of the process 1900 are not limited to that implementation. The process 1900, in some embodiments, begins with displaying a plurality of offers on a mobile device of a reminder requester, as indicated by block 1910, and then receiving user input requesting a reminder of an offer among the plurality of offers, the offer being redeemable at a physical store of a merchant, as indicated by block 1912. Next, some embodiments may obtain identifiers of users connected to the user by a social graph based on the connections, as indicated by block 1914, and then, present an interface to select a reminder recipient among the other users, as indicated by block 1916. Some embodiments further include receiving user input selecting a reminder recipient among those presented, as indicated by block 1918, and sending a reminder request with the offer, the recipient identifier, and a user identifier to an offers engine, as indicated by block 1920.

In some embodiments, an offers engine implementing part of the process 1900 may receive the reminder request, as indicated by block 1922, and identify merchant sites (e.g., brick-and-mortar stores) at which the offer is redeemable, as indicated by block 1924. Some embodiments may then determine that the reminder recipient agreed to receive offers from the reminder requester, as indicated by block 1926. Such agreements may be recorded in a user profile of the user and updated by users by interacting with the interface for changing settings in user profiles hosted by the offers engine. Some embodiments further include sending a mobile device of the reminder recipient instructions to present reminders when at or near the merchant site, as indicated by block 1928.

In some embodiments, a mobile device of the reminder recipient may receive the instructions, as indicated by block 1930, and detect the recipient mobile device being within a geofence or wireless environment of the merchant's physical site, as indicated by block 1932. In response to the detection, some embodiments may then display the reminder with the mobile device of the reminder recipient, as indicated by block 1934.

Some embodiments may use signals from a mobile user device to ascertain the geolocation of a user and recommend offers, or remind the users of offers, selected based on the geolocation on another user computing device that is not itself configured to provide fine-grained geolocation information. For instance, when a user is interacting with a desktop computer that lacks a GPS sensor, embodiments may select offers based on geolocation information from other user devices associated with the same user (e.g., a cell phone), such association being, for instance, in one of the above-mentioned user profiles (e.g., by a list of device identifiers or by a user logging into their account on both devices) to ascertain geolocation. Coarse-grained geolocation information from direct signals like the IP address of the desktop computer is often not sufficient, by itself, to precisely locate the user. But users often carry their mobile phone (or other GPS-capable devices) even when using a desktop computer. Thus, the user is often accompanied by a geolocation-sensing capable device, even when using a device that does not have this capability. Some embodiments leverage this geolocation-sensing-capable device to select content for another device that is not configured to sense geolocation, thereby providing locally-relevant offers even on devices that do not provide fine-grained location information.

It should be noted, though, that while some embodiments are described by way of example with reference to providing locally-relevant offers, the present techniques are not limited to offers. In some embodiments, the present techniques may be used to select and to send other types of information that might be relevant to a user based on their location. For example, embodiments may select based on location of one device and send to another device geographically-targeted advertisements, traffic updates, weather alerts, public safety alerts, news feeds, tourist information, and other content selected based on acquired geographic locations.

To select and provide content (like offers) to a non-geolocation capable device, embodiments may use indirect signals taken from another device, like a mobile phone. For instance, if the user is logged into an account (e.g., of one of the above-described offer-discovery systems) on a desktop computer web browser, and the user has previously logged into a corresponding native mobile application (e.g., of the same offer-discovery system) on their phone, some embodiments may tie the two data sources together, thereby matching the phone's geolocation to the desktop computer web browser. Thus, even if the user is not actively using their phone, some embodiments may use the phone's location as a proxy for the user's location when selecting and providing content to the other device.

For example, assume that a user has installed and logged into one of the above-described examples of a native mobile application on their phone in the past. That installed app may then, in response, send location data back to other components of the offer-discovery system. If that user then logs into a website interface of the offer-discovery system via their laptop, in response, embodiments may check where the user's phone is located based on data (pushed by or pulled from) the mobile app. For instance, if the phone is in a coffee shop in Seattle, embodiments may assume that the user and their laptop are in that same coffee shop. In response, embodiments may then customize the content that the user sees on the laptop based on that detailed location information from the phone.

In some cases, the two user devices (one being capable of sensing geolocation, and the other being the device upon which the user is requesting and viewing content) may be correlated based on a user logging into a user account on both devices. Logging in can include configuring a mobile app with a user's log-in credentials at the time the application is installed, or logging in on a website, thereby causing the offer-discovery system to set a cookie, or other client-side persistent (e.g., remaining when the device is turned off) storage, with a user identifier that may later be retrieved in a subsequent session to identify the user.

In another example, the two user devices may be correlated without a login on at least one device by determining that both devices have the same public IP address for a local area network, as often occurs with network address translation on home routers. In some cases, the two user devices are owned by the same person (and, for instance, associated with the same account), or in some cases, the two devices are owned by different people using the same local area network. For example, one person may be using a mobile phone on a coffee shop wireless network, and another person may be using a laptop on the same network. The two devices may be tied together by a single public IP address of a coffee-shop router using network-address translation to translate between distinct private IP addresses of the two devices and a single shared public IP address. A geolocation from a mobile device of one person may be used to select geographically-relevant offers for the other person on the same local-area network.

In some cases, as noted above, two user devices may be matched to a single user based on a shared account. It should be noted, however, that in some embodiments, neither device is associated with a user having a user account. Some embodiments may use third-party tracking services to identify users the two devices and tie the two devices together. For example, some embodiments may use such a service to tie a mobile device ID to an email address and tie the email address to a web browser, all of the same user. In some cases, as explained further below, this linking is done entirely or partially through other web sites or native mobile applications and, then, aggregated by third party solutions. As a result, in some embodiments, even though the user never logged into an offer-related service or gave an offer-related service their email address, embodiments may still tie the two devices together because the user gave their email address to another application running on the same mobile device and to another website that they accessed via the same desktop browser. In another scenario, the users may provide an offer-related service (examples of which are described below) their email address on one platform (e.g., sign up for an email newsletters without creating an account) and this email address may be tied to a browser ID or device ID using a third party matching solution. LiveRamp of San Francisco, Calif. is an example of a company that provides such third party matching solutions.

In another example, the two devices may be tied together based on single-use offer codes. Single-use offer codes associate a unique code with each instance of an offer such that multiple instances of an offer can be distinguished, thereby facilitating verification of whether a single-use offer code has already been redeemed. Before redeeming such an offer, some merchants may query a record of single-use codes (e.g., in the offer records described above) that have been issued and redeemed to condition redemption on the code having not been issued and not redeemed. When a user acquires such a code, e.g., on the user's mobile device, the offers engine may store in memory the device identifier in association with the code. When the user redeems the offer, the merchant may associate in memory both the single-use code and an identifier of the user, e.g., an email address or phone number. This association may be provided to the above-described offers engine. Some embodiments may acquire the same identifier of the user on a desktop computer via a log-in, email-signup, or third party identification. The identifier received via the user's desktop computer may be matched to the identifier conveyed via the merchant to tie the desktop computer to the mobile device to which the single-use offer code was provided.

In another example, the two devices may be tied together based on wireless identifiers conveyed at checkout in a brick and mortar store. For instance, a native application on the user's mobile device may monitor wireless signals for wireless beacons (e.g., low energy Bluetooth™ beacons) placed in range of a merchant checkout station. During checkout, the native application may record a beacon identifier (or other wireless identifier) and report the wireless identifier (and in some cases information about signal strength to estimate distance) with a time stamp to the offers engine. The merchant may also record the time of the transaction and a credit card number used in the transaction. The merchant may report the time and the credit card number to the offers engine, which may also store a copy of the user's credit card number. The credit card numbers and times may be matched to tie the mobile device to a user. The offers engine may also store in memory a record matching the credit card numbers to a browser of the user on a desktop computer. This record may be used to match the desktop to the mobile device based on credit card numbers associated with both devices, in the case of the mobile device, the association being formed by use of the credit card near a wireless beacon associated with a merchant who provides the credit card number to the offers engine.

In another example, the two devices may be tied together based on a physical token purchased on one device presented while in the presence of another device. For instance, a user may buy a concert wristband online with a desktop web browser, causing a cookie to be set on the browser or the browser to be profiled in the process. Later, the user may present the wristband to be scanned at concert and, at around the same time, a wireless beacon signal in range of the concert gate may be sensed by a native mobile application that reports a time-stamped beacon identifier to the offers engine. The entity scanning wristbands (e.g., a concert promoter) may send a time-stamped list of wristband identifiers to the offers engine, indicating when each wristband was scanned. Some embodiments may tie the browser to the wristband identifier (e.g., with a cookie or browser profile acquired at purchase) and the wristband identifier to the mobile device (e.g., with the promoter's list of scan times and time-stamped beacons), thereby correlating the mobile device and web browser.

Offers may be selected based on geolocation with a variety of techniques. In some cases, offers are selected based on a distance between a user's geolocation and a location of a merchant's store at which the offer is redeemable. For example, embodiments may determine which merchants have stores within a threshold distance to the user's geolocation (e.g., within one mile), retrieve offers by those merchants, and send the retrieved offers to a non-geolocation-sensing capable device of the user. In another example, offers may be ranked based on a geographic distance between a merchant's store and the user's geolocation, e.g., boosting the ranking of offers that are closer and suppressing the ranking of offers that are further.

Figure 20:
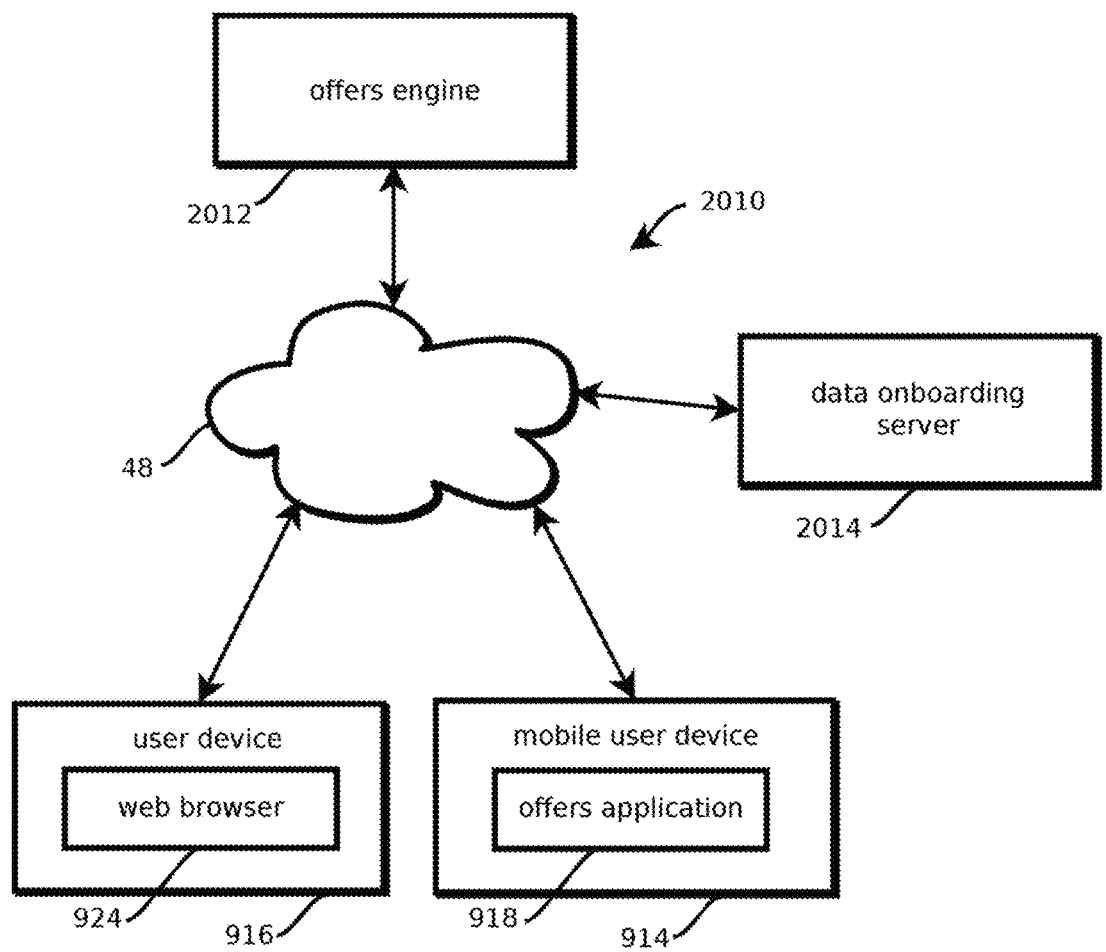
FIG. 20 is an example of an offer-discovery system operative to sense a user's geolocation with one device and use that geolocation to select offers for display on another user device.

FIG. 20 shows an example of an offer-discovery system 2010 configured to use cross-device geolocation sensing to customize the presentation of offers on user computing devices that do not have geolocation sensors. The illustrated offer-discovery system 2010 may include an offers engine 2012, a data onboarding server 2014, and the above-described network 48, user device 916 having web browser 924, and mobile user device 914 having offers application 918. The offers engine 2012 may include the features of the above-described offers engines, though not all components of the above-described offers engines are necessarily included in all embodiments, which is not to suggest that any other feature described herein may not also be omitted. In some cases, the offers engine 2012 is configured to perform a process described below with reference to FIG. 21 for cross-device geolocation sensing and offer selection.

As noted above, in some embodiments, a given user may have in their possession both the user device 916 and the mobile user device 914. For example, the mobile user device 914 may be a cellular phone, hand-held tablet computer, or wearable computing device (like a smart watch), and the user device 916 may be a laptop computer, a desktop computer, a set-top box media player, a gaming console, or the like. The mobile user device 914 may be configured to sense the geolocation of the mobile user device 914, for example, based on cellular tower wireless signal triangulation, global positioning system signals, wireless beacons (e.g., WiFi™ beacon service set identifiers (SSIDs) or low-energy Bluetooth™ beacons), or other aspects of the current wireless environment. The user device 916, in contrast, may be incapable of sensing the geolocation of the user device 916, for example, lacking in the appropriate wireless antennas, interfaces, radios, or other mechanisms for sensing wireless signals suitable to ascertain geolocation. Often, a given user may have in their possession the mobile user device 914, for example, a cell phone in their pocket, while using the user device 916, for example, while in a coffee shop using a laptop. In this example, some embodiments may use a geolocation sensed by the mobile user device 914 to select offers to be presented in the web browser 924 based on the geolocation, for example, to show offers relevant to the coffee shop or nearby businesses.

In some cases, an operating system of the user device 914 may provide an interface by which native offers application 918 obtains geolocations. For instance, such a native application may monitor the geolocation of the user with an object (in an object-oriented programming environment) that is an instance of a CLLocationManager class in the iOS™ operation system or an instance of the LocationProvider class in the Android™ operating system.

To select location-relevant offers, various techniques may be used to correlate the geolocation from the mobile user device 914 with networking sessions (e.g., requests for and responses with web page content) with the user device 916. For example, some embodiments may correlate a geolocation received from the mobile user device 914 with a hypertext transport protocol (HTTP) GET request for a webpage from the web browser 924 to determine that the user is at the mobile-device sensed geolocation and serve corresponding offers. Examples of such correlation techniques are described below. In some cases, the user may be logged in to a user account on both the offers application 918 executing in the background on mobile user device 914 and the web browser 924. Based on this dual logged-in state, the mobile user device 914 may report geolocations accompanied with a user identifier, and the web browser 924 may request offers with a corresponding (e.g. matching) user identifier (e.g., as a parameter in a request specifying a URL of the offers engine 2012). The offers engine 2012 may store the geolocation in memory in association with such an identifier (e.g., in a user profile) and retrieve the geolocation when the request for a webpage to display offers is received along with the same (or a corresponding) identifier.

In some cases, the offers application 918 may execute as a background process on the mobile user device 914 and report the geolocation of the user device 914 to the offers engine 912. In some cases, user-accessible privacy settings may disable or enable this feature. In some cases, the reporting may be periodic, for example every hour or every 10 minutes, depending upon the desired specificity in geolocation and trade-offs with battery life. In some cases, the reporting may be in response to some event. For instance, a background process on the mobile user device may include an event handler that receives location-related events detected by the operating system of the mobile user device indicative of some amount of movement by the user, for example, changing cellular towers or moving more than a threshold distance. In response to such an event, the offers application 918 may send the new geolocation to the offers engine 2012, thereby potentially reducing battery consumption relative to systems that sense and report geolocation without regard to whether geolocation has changed. The user's account information, such as username and password or other user identifier, may be stored in memory by the offers application 918 and reported to the offers engine 2012 in association with communications of the geolocations (e.g., as a parameter of an API request), such that the offers engine 2012 can associate the reported geolocation with the corresponding user account, such as a user account having a user profile in which the geolocation is stored.

In some cases, the geolocation may be expressed as a latitude and longitude, or other formats may be used. Some embodiments may report geolocation with a latitude, a longitude, and a confidence radius within which the mobile user device is able to ascertain the user's geolocation with some threshold level of confidence, such as 90% confidence that the user is within some distance of the latitude and longitude based on the quality of wireless signals received. In another example, the geolocation may be expressed as an identifier of a wireless beacon sensed by the mobile device 914, and the location corresponding to the beacon identifier may be accessible to the offers engine 2012 based on the identifier of the wireless beacon. For instance, the offers engine 2012 may maintain in memory a list of beacon identifiers and corresponding geolocations. In another example, a wireless beacon may periodically change the wireless beacon identifier to obfuscate location correlations, and the sensed beacon identifier may be sent by offers engine 2012 or application 918 to a third party server configured to return a geolocation in exchange for a subscription or per location service fee for translating obfuscated beacon identifiers into geolocations.

As noted, in some cases, the user may log in to their user account in the offers engine 2012 with the web browser 924 before a request for customized offers based on geolocation is sent, in which case an identifier of a session with the web browser 94 may be stored in memory of the offers engine 2012 in association with the user's account, such that subsequent requests for offers in the same session (e.g., an HTTP session) may be associated with the user account, and a geolocation stored in association with the user account may be retrieved.

In other cases, the user may have logged into their user account at some point in the past, and an identifier of the user account may be stored in client-side persistent storage accessible to the web browser 924, such that JavaScript™ sent by the offers engine 2012 in response to requests for offers may retrieve from memory of the user device 916 the identifier of the user account and return the identifier of the user account to the offers engine 2012. Again this returned identifier may be used to identify the geolocation received from the mobile user device 914. Various forms of client-side persistent storage may be used. In some cases, the client-side persistent storage may be inside a browser security sandbox, such that the web browser 924 can access the values, examples including cookies, local storage objects, and SQLite databases. In another example, an application having elevated security privileges, such as Adobe Flash™, may be called by the browser 924 to access persistent client-side storage outside the secure browser sandbox, for example, in Flash cookies, or local shared objects (LSO) accessible via a Flash player but not otherwise accessible to the web browser 924.

In some cases, information stored outside the user device 916 may be used to associate the user device 916 with the user account. For example, the offers engine 2012 may store in memory a browser fingerprint from a previous session with the web browser 924 in which the user was logged into their account, and subsequent requests for web content may include aspects of the browser fingerprint sufficient to uniquely identify the user's account by matching the browser fingerprint from a current request for web content to a previous browser fingerprint. In some cases, the browser fingerprint is stored in the above-mentioned user profiles. Examples of data constituting a browser agent include the information in the user agent field of HTTP requests, configuration information of the browser (such as add-ons installed and versions of the same) and the like. Some embodiments may use canvas fingerprinting, in which the offers engine instructs the web browser to draw a graphic that is converted into a digital token that documents variations in the graphics processing system of user device 916. The generated token may be stored and later retrieved to identify the browser.

Some embodiments may use cookies syncing to identify the user account from the request from web browser 924 based on information residing on other servers. For example, the offers engine 2012 may send to the web browser 924 web content that includes instructions (such as JavaScript™ or a URL for a resource, like a tracking pixel to be retrieved from another domain) for the web browser 924 to request content from a third party web domain. In response to the request, a server at the third-party web domain may send instructions to the web browser 924 to retrieve a user identifier (accessible to that third party) from persistent client-side storage (examples of which are described above), and the server at the third-party web domain may cause the user identifier to be sent to the offers engine 2012 along with an identifier of the current session between the web browser 924 and the offers engine 2012. For instance, the third-party web domain may respond to the request for content with a redirect command back to the offers engine 2012 with a URL containing as a parameter (e.g., delimited by a "?") an identifier of the user stored in memory of the third-party web domain server.

In another example, data onboarding may be used to identify the user account such that the geolocation in the user account may be used to customize offers sent to the web browser 924. User identifiers may be distributed with client-side distribution, for example using redirects, or with server-side distribution. For instance, when a user installs the offers application 918 or otherwise creates a user account, the user may submit an email address that is stored in the user profile in the offers engine 2012. The same email address may be stored in memory of a third-party data onboarding server 2014 in association with the third party's identifier of the user. The data onboarding server 2014 may obtain this association from some other user account associated with a different service or other commercially-available sources of user profiles. When the web browser 924 request content from the offers engine 2012, the offers engine 2012 may send instructions (such as a URL to retrieve a tracking pixel or JavaScript™) to request content from the data on boarding server 2014. The data on boarding server 2014 may receive such requests from users requesting content from a large number of different relatively large websites, for example, in advertising networks or social networks, and in response to such requests, the data onboarding server 2014 may send to the requesting web browser a JavaScript™ command to determine whether the data onboarding server 2014 has previously stored an identifier in persistent client-side storage, returning the user identifier if it has previously been stored, and storing such an identifier if the identifier has not previously been stored. If the data onboarding server 2014 has previously stored a client-side user identifier, when the web browser 924 request content from the offers engine 2012, which sends the instructions to request additional content from the data on boarding server 2014, the data onboarding server 2014 may cause an identifier of the email address to be sent to the offers engine 2012, which may use the email address to select the appropriate user account and corresponding geolocation from mobile user device 914. Other unique and relatively unique values may be used to identify the user other than email addresses, including phone numbers and mailing addresses.

The use of the data onboarding server 2014 or the cookies syncing techniques described above may be used to convey user identifiers across web domains as a workaround to barriers imposed by the same origin policy imposed by most web browsers. Generally, the same origin policy prevents content from one web domain from accessing content from another web domain, for example, preventing one website from retrieving cookies set by another website.

In another example, a public IP address of a local area network router shared by the mobile user device 914 and the user device 916 may be used to match a geolocation from the mobile user device 914 to a request for offers from the user device 916. Often home routers include a network address translation table by which multiple private IP addresses within the local area network, such as one private address for the user device 916 and another private address for the mobile user device 914, share a single public IP address. The offers engine 2012 may store the public IP address through which the mobile user device 914 communicates to the offers engine 2012 and then, later, match a request for offers from the web browser 924 from the same public IP address to a user account associated with this IP address and having a geolocation from the mobile user device 914. An example of such a router is described above with reference to router 1612 in FIG. 16.

In the present examples, the user device 916 is described as requesting and displaying offers in the web browser 924, but it should be noted that other client-side applications may request and display offers. For example, set-top boxes may run applications that display offers alongside streaming media, or gaming consoles may display offers alongside game menus.

In the above examples, the geolocation is stored in the user account prior to the web browser 924 requesting offers, but in some cases, the geolocation may be retrieved after such a request. For example, in some embodiments, the web browser 94 may request offers from the offers engine 2012; the offers engine 2012 may then determine that a difference in time between a time-stamped geolocation in the corresponding user account and the current time exceeds a threshold; and in response, the offers engine 2012 may send a request to mobile user device 914 to retrieve an updated geolocation. In some cases, the offers engine 2012 may send offers for display to the user device 916 without waiting for the geolocation to be retrieved, and then subsequently supply geo-targeted offers after the geolocation is retrieved from the mobile user device 914 to avoid delay. The offers application 918 may include an event handler configured to receive such requests for geolocation, query the operating system of the mobile user device 914 for the corresponding geolocation, and return the geolocation to the offers engine 2012.

The obtained geolocations may be used for a variety of purposes, examples of which are described above with reference to FIGS. 1 through 19. For example, the offers engine 2012 may determine that the user is to be reminded of a particular offer in content sent to the web browser 924 based on the geolocation retrieved from the mobile user device 914. In another example, embodiments of the offers engine 2012 may determine that the user has crossed a geofence associated with a particular offer, and in response, send that particular offer to the web browser 924 to be displayed. In some cases, offers may be selected for display by the offers engine 2012 based on a distance between the geolocation sent by the mobile user device 914 and geolocations of offers, for example, ranking offers for display based on distance.

In some cases, user profiles may be associated with a location history including a plurality of time-stamped geolocations obtained from mobile user device 914 over some trailing duration of time, such as over a preceding week or month. In such embodiments, in some use cases, the offers engine 2012 may select offers to be sent to web browser 924 based on patterns in user geolocation. For example, the offers engine 2012 may calculate a measure of central tendency of some of the geolocations, such as a centroid geolocation during nighttime hours, and the measure of central tendency of the geolocation may be used to select offers. Or embodiments may cluster the geolocations and select offers based on centroids of the clusters to identify offers relevant to places that the user frequents.

Applicants have observed that users of offer-discovery systems are often relatively sensitive to even relatively small increases in latency (such as increases on the order of 100 ms) when responding to requests for offers. Accordingly, while the data described herein may be stored in a variety of different data structures and formats, some data structures and formats may cause the computer systems upon which the offers engine 2012 is built to respond more quickly. In some cases, user accounts may be indexed by the data from the web browser 924 (such as user identifiers in cookies or browser fingerprints) with which the user accounts are identified, for example, in a hash table having key values calculated from such data from the web browser 924, or in a list of key-value pairs pre-sorted by the data from the web browser 924 to facilitate relatively fast binary searches. In some cases, to facilitate relatively prompt selection of relevant offers, some embodiments may select offers corresponding to geolocations received from mobile user device 914 before a request for offers is received from the web browser 924, thereby pre-selecting the offer to be displayed and expediting the presentation of the offer.

Figure 21:
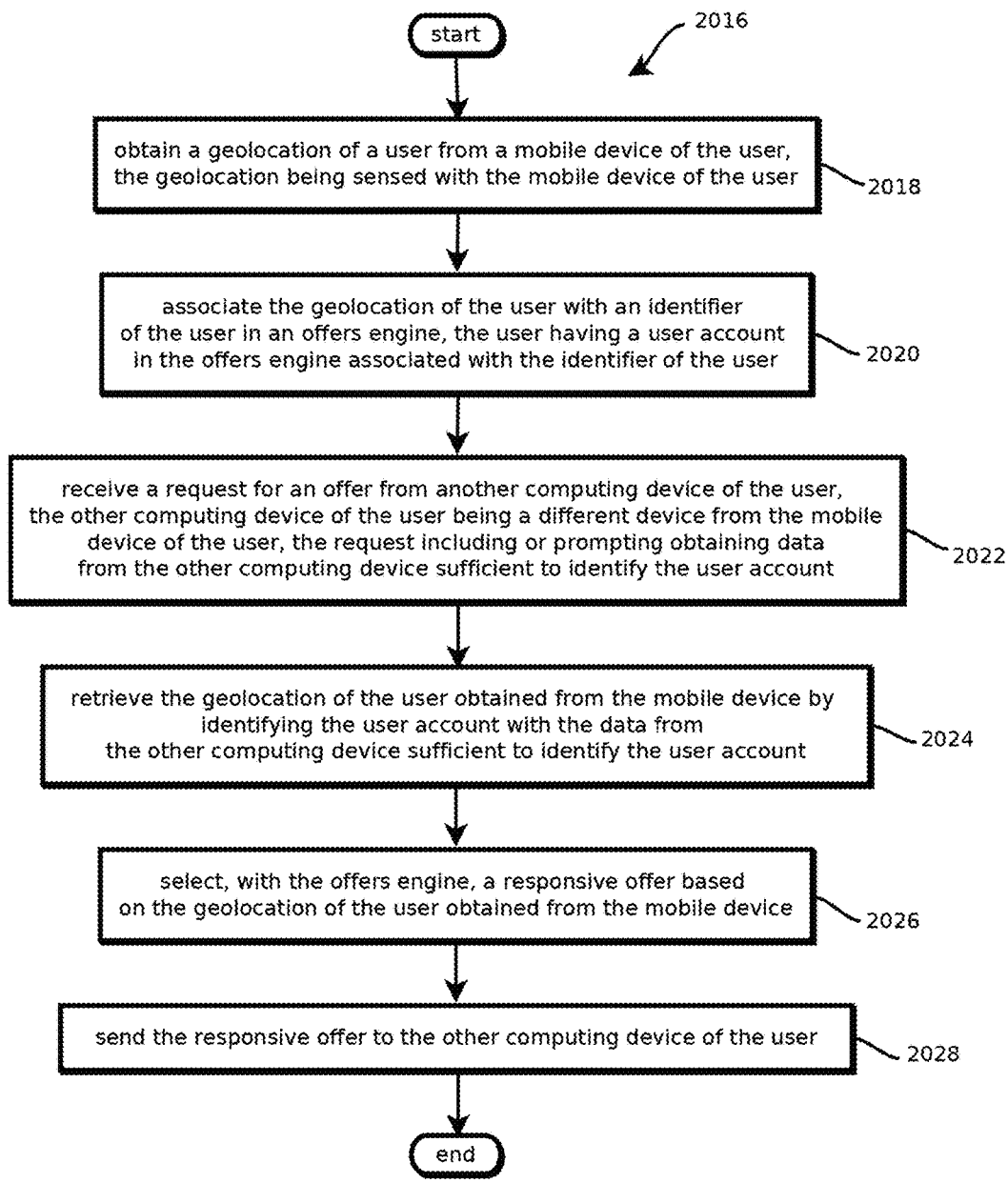
FIG. 21 is an example of a process for sensing a user's geolocation with one device and using that geolocation to select offers for display on another user device.

FIG. 21 shows an example of a cross-device geolocation and offer presentation process 2016 that may be performed by some embodiments of the offers engine 2012 described above. It should be noted, however, that embodiments are not limited to the architecture described above. In some cases, the process 2016 includes obtaining a geolocation of a user from a mobile device of the user, where the geolocation is sensed with the mobile device of the user, as indicated by block 2018. In some cases, the geolocation may be reported by a native mobile application executing on a hand-held mobile device carried by the user. Next, the process includes associating the geolocation of the user with an identifier of the user in an offers engine, where the user has a user account in the offers engine associated with the identifier of the user, as indicated by block 2020. Some embodiments may further include receiving a request for an offer from another computing device of the user, where the other computing device of the user is a different device from the mobile device of the user, and where the request includes or prompts obtainment of, data from the other computing device sufficient to identify the user account, as indicated by block 2022. Embodiments may further include retrieving the geolocation of the user obtained from the mobile device by identifying the user account with the data from the other computing device sufficient to identify the user account, as indicated by block 2024. Some embodiments may include selecting, with the offers engine, a responsive offer based on the geolocation of the user obtained from the mobile device, as indicated by block 2026. Finally, some embodiments may send the responsive offer to the other computing device of the user, as indicated by block 2028.

Thus, embodiments may provide higher-resolution geo-targeting of offers on non-geolocation-sensing capable devices, like many desktop computers, by recognizing that geolocation-sensing capable devices, like mobile phones, often accompany users in these situations and providing software and hardware to correlate signals from one with the content to be provided to the other device.

The present application will be better understood with reference to the following enumerated examples of embodiments:

1. A method of distributing coupons or other offers to non-location-sensing devices based on a geolocation sensed by another device, the method comprising: obtaining a geolocation of a user from a mobile device of the user, the geolocation being sensed with the mobile device of the user; associating the geolocation of the user with an identifier of the user in an offers engine, the user having a user account in the offers engine associated with the identifier of the user; receiving a request for an offer from another computing device of the user, the other computing device of the user being a different device from the mobile device of the user, the request including or prompting obtaining data from the other computing device sufficient to identify the user account; retrieving the geolocation of the user obtained from the mobile device by identifying the user account with the data from the other computing device sufficient to identify the user account; selecting, with the offers engine, a responsive offer based on the geolocation of the user obtained from the mobile device, wherein the responsive offer is responsive to the request for an offer from the other computing device; and sending the responsive offer to the other computing device of the user.

2. The method of embodiment 1, comprising: receiving credentials of the user for accessing the user account from the mobile device of the user; receiving the credentials of the user for accessing the user account from the other computing device.

3. The method of embodiment 2, wherein both the mobile device of the user and the other computing device are logged in to the user account in the offers engine at the same time, before receiving the request for an offer from the other computing device.

4. The method of any of embodiments 1-3, comprising: sending to the other computing device a log-in interface configured to return the credentials of the user for accessing the user account to the offers engine; receiving the credentials of the user for accessing the user account from the other computing device; determining that the credentials match the user account; and after determining that the credentials match the user account, sending the other computing device instructions to store the data from the other computing device sufficient to identify the user account in persistent storage that retains data when the other computing device is turned off.

5. The method of embodiment 4, comprising: after receiving the request for an offer from the other computing device, sending the other computing device instructions that when executed cause the other computing device to perform operations comprising: retrieving from persistent storage the data from the other computing device sufficient to identify the user account; and sending to the offers engine the data from the other computing device sufficient to identify the user account.

6. The method of embodiment 4, wherein the instructions to store the data include an instruction to store a value in a cookie, a client-side structured-query language (SQL) database accessible by a web browser executing on the other computing device, or a localstorage object instantiated by a web browser executing on the other computing device.

7. The method of embodiment 1, wherein the data from the other computing device sufficient to identify the user account includes a web browser fingerprint of a web browser executing on the other computing device.

8. The method of embodiment 1, wherein the data from the other computing device sufficient to identify the user account includes a public IP address of a router through which the mobile user device has communicated with the offers engine.

9. The method of embodiment 1, wherein the data from the other computing device sufficient to identify the user account comprises a local shared object (LSO) accessible via a Flash player executing on the other computing device and stored outside of a browser sandbox of a web browser executing on the other computing device.

10. The method of embodiment 1, wherein the data from the other computing device sufficient to identify the user account comprises a canvas fingerprint of a web browser executing on the other computing device.

11. The method of embodiment 1, comprising: retrieving the data from the other computing device sufficient to identify the user account by cookie-syncing with a web domain different from a web domain of the offers engine.

12. The method of embodiment 1, comprising retrieving the data from the other computing device sufficient to identify the user account by cookie-syncing by: obtaining an email address of the user when the user account is created during installation of a native mobile application on the mobile device of the user; and sending a web browser of the other computing device instructions to retrieve content from another web domain different from a web domain of the offers engine, the other web domain being configured to respond to a request to retrieve the content from the web browser by causing an identifier of the email address to be sent to the offers engine.

13. The method of any of embodiments 1-12, wherein selecting, with the offers engine, a responsive offer based on the geolocation of the user obtained from the mobile device comprises: selecting from a plurality of offer records, each offer record describing an offer and being associated with an offer geolocation, one or more offer records having an offer geolocation including the geolocation of the user or having an offer geolocation within a threshold distance to the geolocation of the user.

14. The method of any of embodiments 1-12, comprising obtaining a plurality of time-stamped geolocations of the user are obtained from the mobile device, wherein selecting, with the offers engine, a responsive offer based on the geolocation of the user obtained from the mobile device comprises: determining a measure of central tendency of user geolocations of at least some of the time-stamped geolocations; and selecting from a plurality of offer records, each offer record describing an offer and being associated with an offer geolocation, one or more offer records having an offer geolocation including the measure of central tendency of user geolocations or having an offer geolocation within a threshold distance to the measure of central tendency of user geolocations.

15. The method of embodiment 1, comprising creating the user account, the user account tying the mobile device to the other computing device, the user account being either created at the instruction of the user or being created as a profile of the user without the user having to provide an instruction to create the user account.

16. The method of embodiment 15, wherein the user mobile device is tied to the other computing device based on a wireless beacon sensed by the mobile device.

17. The method of embodiment 16, wherein the user mobile device is tied to the other computing device based on a credit card associated with the other user device and presented by a user to a merchant while the mobile device is in range of the wireless beacon.

18. The method of embodiment 16, wherein the user mobile device is tied to the other computing device based on a scannable physical token purchased with the other computing device and presented by a user to a merchant while the mobile device is in range of the wireless beacon.

19. The method of embodiment 15, wherein the mobile device is tied to the other computing device based on a single-use offer code.

20. A system, comprising: one or more processors; and memory storing instructions that when executed by at least some of the one or more processors causes operations comprising: the steps of any of embodiments 1-19.

21. A tangible, non-transitory, machine-readable medium storing instructions that when executed by a data processing apparatus cause operations comprising: the steps of any of embodiments 1-20.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms relating to causal relationships, e.g., "in response to," "upon," "when," and the like, encompass causal relationships having both causes that are a necessary causal condition and causes that are a sufficient causal condition, e.g., "state X occurs upon condition Y obtaining" is generic to "X occurs solely upon Y" and "X occurs upon Y and Z." Similarly, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing or computing device is capable of manipulating or transforming signals, for instance signals represented as physical electronic, optical, or magnetic quantities within memories, registers, or other information storage devices, transmission devices, or display devices of the special purpose computer or similar special purpose processing or computing device.

What is claimed is:

1. A method of distributing coupons or other offers to non-location-sensing devices based on a geolocation sensed by another device, the method comprising:

obtaining a geolocation of a user from a mobile device of the user, the geolocation being sensed with the mobile device of the user;

associating the geolocation of the user with an identifier of the user in an offers engine, the user having a user account in the offers engine associated with the identifier of the user;

receiving a request for an offer from another computing device of the user, the other computing device of the user being a different device from the mobile device of the user, the request including or prompting obtaining data from the other computing device sufficient to identify the user account;

retrieving the geolocation of the user obtained from the mobile device by identifying the user account with the data from the other computing device sufficient to identify the user account;

selecting, with the offers engine, a responsive offer based on the geolocation of the user obtained from the mobile device, wherein the responsive offer is responsive to the request for an offer from the other computing device, wherein the selection uses cross-device geolocation sensing to customize the presentation of offers on the other computing device of the user without requiring the other computing device of the user to have a geolocation sensor; and sending the responsive offer to the other computing device of the user.

2. The method of claim 1, comprising:

receiving credentials of the user for accessing the user account from the mobile device of the user;

receiving the credentials of the user for accessing the user account from the other computing device.

3. The method of claim 2, wherein both the mobile device of the user and the other computing device are logged in to the user account in the offers engine at the same time, before receiving the request for an offer from the other computing device.

4. The method of claim 1, comprising:

sending to the other computing device a log-in interface configured to return the credentials of the user for accessing the user account to the offers engine;

receiving the credentials of the user for accessing the user account from the other computing device;

determining that the credentials match the user account; and after determining that the credentials match the user account, sending the other computing device instructions to store the data from the other computing device sufficient to identify the user account in persistent storage that retains data when the other computing device is turned off.

5. The method of claim 4, comprising:

after receiving the request for an offer from the other computing device, sending the other computing device instructions that when executed cause the other computing device to perform operations comprising:
retrieving from persistent storage the data from the other computing device sufficient to identify the user account; and
sending to the offers engine the data from the other computing device sufficient to identify the user account.

6. The method of claim 4, wherein the instructions to store the data include an instruction to store a value in a cookie, a client-side structured-query language (SQL) database accessible by a web browser executing on the other computing device, or a localstorage object instantiated by a web browser executing on the other computing device.

7. The method of claim 1, wherein the data from the other computing device sufficient to identify the user account includes a web browser fingerprint of a web browser executing on the other computing device.

8. The method of claim 1, wherein the data from the other computing device sufficient to identify the user account includes a public IP address of a router through which the mobile user device has communicated with the offers engine.

9. The method of claim 1, wherein the data from the other computing device sufficient to identify the user account comprises a local shared object (LSO) accessible via a Flash player executing on the other computing device and stored outside of a browser sandbox of a web browser executing on the other computing device.

10. The method of claim 1, wherein the data from the other computing device sufficient to identify the user account comprises a canvas fingerprint of a web browser executing on the other computing device.

11. The method of claim 1, comprising:
retrieving the data from the other computing device sufficient to identify the user account by cookie-syncing with a web domain different from a web domain of the offers engine.

12. The method of claim 1, retrieving the data from the other computing device sufficient to identify the user account by cookie-syncing by:
obtaining an email address of the user when the user account is created during installation of a native mobile application on the mobile device of the user; and
sending a web browser of the other computing device instructions to retrieve content from another web domain different from a web domain of the offers engine, the other web domain being configured to respond to a request to retrieve the content from the web browser by causing an identifier of the email address to be sent to the offers engine.

13. The method of claim 1, wherein selecting, with the offers engine, a responsive offer based on the geolocation of the user obtained from the mobile device comprises:
selecting from a plurality of offer records, each offer record describing an offer and being associated with an offer geolocation, one or more offer records having an offer geolocation including the geolocation of the user or having an offer geolocation within a threshold distance to the geolocation of the user.

14. The method of claim 1, comprising obtaining a plurality of time-stamped geolocations of the user are obtained from the mobile device, wherein selecting, with the offers engine, a responsive offer based on the geolocation of the user obtained from the mobile device comprises:
determining a measure of central tendency of user geolocations of at least some of the time-stamped geolocations; and
selecting from a plurality of offer records, each offer record describing an offer and being associated with an offer geolocation, one or more offer records having an offer geolocation including the measure of central tendency of user geolocations or having an offer geolocation within a threshold distance to the measure of central tendency of user geolocations.

15. The method of claim 1, wherein:
the geolocation specifies a latitude and longitude of the user;
the mobile device of the user is a cell phone;
the geolocation of the user is obtained by a native application executing on the mobile device, the native application storing in memory of the mobile device user credentials by which the native application accesses the user account in the offers engine, wherein the native application monitors the geolocation of the user with an object that is an instance of a class of an operating system of the mobile device and sends the geolocation to the offers engine over the Internet with data from the mobile device sufficient to identify the user account;
associating the geolocation of the user with the identifier of the user comprises matching the data from the mobile device sufficient to identify the user account with the user account of the user and storing the geolocation of the user in the user account of the user with a time-stamp indicative of when the geolocation was obtained;
the identifier of the user uniquely identifies the user among a plurality of users having user accounts in the offers engine;
receiving a request for an offer from another computing device of the user comprises receiving a transport protocol request over the Internet for markup language content describing an offer from a web browser executing on a desktop or laptop computer of the user;
obtaining the data from the other computing device sufficient to identify the user account comprises sending, after receiving the transport protocol request, a script that when executed by the web browser causes the web browser to retrieve from memory of the other computing device of the user an identifier of the user account and send the identifier of the user account to the offer discovery system over the Internet;
retrieving the geolocation of the user obtained from the mobile device comprises determining a difference between a current time and the time-stamp to base the selection of the offer on a duration of elapsed time since the geolocation was obtained; and
sending the responsive offer to the other computing device comprises:
sending the other computing device instructions to present a web page to redeem the responsive offer, the web page including a description of the offer, a coupon code, and hyperlinks to an affiliate network that redirect the web browser to a website of a merchant issuing the responsive offer.

16. A system, comprising
one or more processors; and
memory storing instructions that when executed by at least some of the one or more processors cause operations comprising:

obtaining a geolocation of a user from a mobile device of the user, the geolocation being sensed with the mobile device of the user;

associating the geolocation of the user with an identifier of the user in an offers engine, the user having a user account in the offers engine associated with the identifier of the user;

receiving a request for an offer from another computing device of the user, the other computing device of the user being a different device from the mobile device of the user, the request including or prompting obtaining data from the other computing device sufficient to identify the user account;

retrieving the geolocation of the user obtained from the mobile device by identifying the user account with the data from the other computing device sufficient to identify the user account;

selecting, with the offers engine, a responsive offer based on the geolocation of the user obtained from the mobile device, wherein the responsive offer is responsive to the request for an offer from the other computing device, wherein the selection uses cross-device geolocation sensing to customize the presentation of offers on the other computing device of the user without requiring the other computing device of the user to have a geolocation sensor; and sending the responsive offer to the other computing device of the user.

17. The system of claim 16, wherein the operations comprise:
receiving credentials of the user for accessing the user account from the mobile device of the user;
receiving the credentials of the user for accessing the user account from the other computing device.

18. The system of claim 17, wherein both the mobile device of the user and the other computing device are logged in to the user account in the offers engine at the same time, before receiving the request for an offer from the other computing device.

19. The system of claim 16, wherein the operations comprise:
sending to the other computing device a log-in interface configured to return the credentials of the user for accessing the user account to the offers engine;
receiving the credentials of the user for accessing the user account from the other computing device;
determining that the credentials match the user account; and
after determining that the credentials match the user account, sending the other computing device instructions to store the data from the other computing device sufficient to identify the user account in persistent storage that retains data when the other computing device is turned off.

20. The system of claim 19, wherein the operations comprise:
after receiving the request for an offer from the other computing device, sending the other computing device instructions that when executed cause the other computing device to perform operations comprising:
retrieving from persistent storage the data from the other computing device sufficient to identify the user account; and
sending to the offers engine the data from the other computing device sufficient to identify the user account.

21. The system of claim 19, wherein the instructions to store the data include an instruction to store a value in a cookie, a client-side structured-query language (SQL) database accessible by a web browser executing on the other computing device, or a localstorage object instantiated by a web browser executing on the other computing device.

22. The system of claim 16, wherein the data from the other computing device sufficient to identify the user account includes a web browser fingerprint of a web browser executing on the other computing device.

23. The system of claim 16, wherein the data from the other computing device sufficient to identify the user account includes a public IP address of a router through which the mobile user device has communicated with the offers engine.

24. The system of claim 16, wherein the data from the other computing device sufficient to identify the user account comprises a local shared object (LSO) accessible via a Flash player executing on the other computing device and stored outside of a browser sandbox of a web browser executing on the other computing device.

25. The system of claim 16, wherein the data from the other computing device sufficient to identify the user account comprises a canvas fingerprint of a web browser executing on the other computing device.

26. The system of claim 16, wherein the operations comprise:
retrieving the data from the other computing device sufficient to identify the user account by cookie syncing with a web domain different from a web domain of the offers engine.

27. The system of claim 16, wherein the operations comprise retrieving the data from the other computing device sufficient to identify the user account by cookie-syncing by:
obtaining an email address of the user when the user account is created during installation of a native mobile application on the mobile device of the user; and
sending a web browser of the other computing device instructions to retrieve content from another web domain different from a web domain of the offers engine, the other web domain being configured to respond to a request to retrieve the content from the web browser by causing an identifier of the email address to be sent to the offers engine.

28. The system of claim 16, wherein selecting, with the offers engine, a responsive offer based on the geolocation of the user obtained from the mobile device comprises:
selecting from a plurality of offer records, each offer record describing an offer and being associated with an offer geolocation, one or more offer records having an offer geolocation including the geolocation of the user or having an offer geolocation within a threshold distance to the geolocation of the user.

29. The system of claim 16, wherein the operations comprise obtaining a plurality of time-stamped geolocations of the user are obtained from the mobile device, wherein selecting, with the offers engine, a responsive offer based on the geolocation of the user obtained from the mobile device comprises:
determining a measure of central tendency of user geolocations of at least some of the time-stamped geolocations; and
selecting from a plurality of offer records, each offer record describing an offer and being associated with an offer geolocation, one or more offer records having an offer geolocation including the measure of central tendency of user geolocations or having an offer geolocation within a threshold distance to the measure of central tendency of user geolocations.

30. The system of claim 16, wherein:
the geolocation specifies a latitude and longitude of the user;
the mobile device of the user is a cell phone;
the geolocation of the user is obtained by a native application executing on the mobile device, the native application storing in memory of the mobile device user credentials by which the native application accesses the user account in the offers engine, wherein the native application monitors the geolocation of the user with an object that is an instance of a class of an operating system of the mobile device and sends the geolocation to the offers engine over the Internet with data from the mobile device sufficient to identify the user account;
associating the geolocation of the user with the identifier of the user comprises matching the data from the mobile device sufficient to identify the user account with the user account of the user and storing the geolocation of the user in the user account of the user with a time-stamp indicative of when the geolocation was obtained;
the identifier of the user uniquely identifies the user among a plurality of users having user accounts in the offers engine;
receiving a request for an offer from another computing device of the user comprises receiving a transport protocol request over the Internet for markup language content describing an offer from a web browser executing on a desktop or laptop computer of the user;
obtaining the data from the other computing device sufficient to identify the user account comprises sending, after receiving the transport protocol request, a script that when executed by the web browser causes the web browser to retrieve from memory of the other computing device of the user an identifier of the user account and send the identifier of the user account to the offer discovery system over the Internet;
retrieving the geolocation of the user obtained from the mobile device comprises determining a difference between a current time and the time-stamp to base the selection of the offer on a duration of elapsed time since the geolocation was obtained; and
sending the responsive offer to the other computing device comprises:
sending the other computing device instructions to present a web page to redeem the responsive offer, the web page including a description of the offer, a coupon code, and hyperlinks to an affiliate network that redirect the web browser to a website of a merchant issuing the responsive offer.

\* \* \* \* \*